US012001362B2

(12) United States Patent
Shahramian et al.

(10) Patent No.: US 12,001,362 B2
(45) Date of Patent: Jun. 4, 2024

(54) DYNAMICALLY REPROGRAMMABLE TOPOLOGICALLY UNIQUE INTEGRATED CIRCUIT IDENTIFICATION

(71) Applicant: Nokia Technologies Oy, Espoo (FI)

(72) Inventors: Shahriar Shahramian, Warren, NJ (US); David Skoglund, San Francisco, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/394,536

(22) Filed: Aug. 5, 2021

(65) Prior Publication Data

US 2022/0050798 A1    Feb. 17, 2022

(30) Foreign Application Priority Data

Aug. 17, 2020   (EP) .................................... 20191261

(51) Int. Cl.
  *G06F 13/36*   (2006.01)
  *G06F 1/10*    (2006.01)
(52) U.S. Cl.
  CPC ................ *G06F 13/36* (2013.01); *G06F 1/10* (2013.01)
(58) Field of Classification Search
  CPC .................................. G06F 13/36; G06F 1/10
  USPC ............................................. 710/105; 713/1
  See application file for complete search history.

(56) References Cited

U.S. PATENT DOCUMENTS

| | | | | |
|---|---|---|---|---|
| 4,773,005 A | * | 9/1988 | Sullivan | H04L 61/5038 711/E12.086 |
| 4,885,770 A | * | 12/1989 | Croll | G06F 9/4416 379/269 |
| 5,101,480 A | * | 3/1992 | Shin | G06F 15/17343 709/224 |
| 5,422,631 A | * | 6/1995 | Gertz | H04Q 9/14 370/449 |
| 5,636,342 A | * | 6/1997 | Jeffries | G06F 13/4081 711/E12.086 |
| 5,914,957 A | * | 6/1999 | Dean | G06F 13/4256 370/364 |

(Continued)

FOREIGN PATENT DOCUMENTS

EP    2521041 A2    11/2012

OTHER PUBLICATIONS

"I²C", Wikipedia, Retrieved on Jul. 5, 2021, Webpage available at : https://en.wikipedia.org/wiki/I%C2%B2C#Limitations.

(Continued)

*Primary Examiner* — Paul R. Myers
(74) *Attorney, Agent, or Firm* — ALSTON & BIRD LLP

(57) ABSTRACT

A method, apparatus, and computer program product provide for dynamically reprogrammable topologically unique integrated circuit identification. In an example embodiment, an integrated circuit may be arranged among multiple integrated circuits. The integrated circuit may be configured to derive a topologically unique identifier by performing input measurements of stimuli provided by a host circuit. The integrated circuit may be topologically indistinguishable from at least one other integrated circuit of the multiple integrated circuits from a perspective of the host circuit.

20 Claims, 93 Drawing Sheets

(56) References Cited

U.S. PATENT DOCUMENTS

| | | | | |
|---|---|---|---|---|
| 6,286,067 | B1* | 9/2001 | James | H04L 61/5076 |
| | | | | 710/104 |
| 6,754,720 | B1* | 6/2004 | Packer | G06F 12/0661 |
| | | | | 711/E12.086 |
| 6,804,727 | B1* | 10/2004 | Rademacher | G06F 3/1284 |
| | | | | 710/305 |
| 6,977,924 | B1* | 12/2005 | Skoog | H04L 45/02 |
| | | | | 370/359 |
| 7,017,043 | B1* | 3/2006 | Potkonjak | H04L 9/3247 |
| | | | | 713/181 |
| 7,249,209 | B2* | 7/2007 | Yang | G06F 13/4291 |
| | | | | 710/110 |
| 7,409,561 | B1* | 8/2008 | Kolli | G06F 21/62 |
| | | | | 713/1 |
| 7,426,592 | B2* | 9/2008 | Chen | G06F 9/44505 |
| | | | | 713/1 |
| 10,116,739 | B2* | 10/2018 | Kuo | H04L 67/104 |
| 2001/0042141 | A1* | 11/2001 | Matsunaga | H04L 12/40123 |
| | | | | 710/1 |
| 2002/0029287 | A1* | 3/2002 | Yemini | H04L 45/34 |
| | | | | 709/238 |
| 2002/0049822 | A1* | 4/2002 | Burkhardt | G06F 15/17 |
| | | | | 709/208 |
| 2002/0184385 | A1* | 12/2002 | Kato | H04L 67/04 |
| | | | | 709/218 |
| 2003/0023753 | A1* | 1/2003 | Rychlicki | H04L 61/00 |
| | | | | 709/245 |
| 2003/0023777 | A1* | 1/2003 | Fields | H04L 61/5038 |
| | | | | 710/3 |
| 2003/0093642 | A1 | 5/2003 | Smith et al. | |
| 2004/0064594 | A1* | 4/2004 | Pooni | G06F 13/423 |
| | | | | 710/1 |
| 2004/0081193 | A1* | 4/2004 | Forest | H03M 13/43 |
| | | | | 370/458 |
| 2004/0093450 | A1 | 5/2004 | Andreas | |
| 2004/0166881 | A1* | 8/2004 | Farchmin | G01S 5/0252 |
| | | | | 455/457 |
| 2006/0080417 | A1* | 4/2006 | Boutboul | H04L 45/00 |
| | | | | 709/220 |
| 2006/0087474 | A1* | 4/2006 | Do | G01S 1/7038 |
| | | | | 342/386 |
| 2008/0040515 | A1* | 2/2008 | Schaetzle | G05B 19/0421 |
| | | | | 710/3 |
| 2008/0114814 | A1* | 5/2008 | Vellanki | H04W 8/22 |
| 2008/0250190 | A1* | 10/2008 | Johnson | G06F 3/0486 |
| | | | | 711/103 |
| 2009/0157854 | A1* | 6/2009 | Balandin | H04L 45/00 |
| | | | | 370/254 |
| 2012/0030408 | A1* | 2/2012 | Flynn | G06F 12/0815 |
| | | | | 711/E12.001 |
| 2014/0266417 | A1* | 9/2014 | Dally | H01L 23/535 |
| | | | | 327/564 |
| 2014/0281079 | A1* | 9/2014 | Biskup | G06F 11/2007 |
| | | | | 710/110 |
| 2014/0359266 | A1* | 12/2014 | Madhusudana | G06F 1/24 |
| | | | | 713/2 |
| 2016/0209827 | A1 | 7/2016 | Baba et al. | |
| 2017/0083468 | A1 | 3/2017 | Sengoku | |
| 2018/0034767 | A1* | 2/2018 | Mishra | H04L 12/40013 |
| 2018/0083797 | A1* | 3/2018 | Gang | H04L 12/40013 |
| 2018/0173665 | A1 | 6/2018 | Mishra et al. | |
| 2019/0012574 | A1* | 1/2019 | Anthony | B60W 30/00 |
| 2019/0108149 | A1 | 4/2019 | Graif et al. | |
| 2019/0149808 | A1* | 5/2019 | Ng | H04N 13/307 |
| | | | | 348/59 |
| 2019/0239068 | A1* | 8/2019 | Mudulodu | H04L 9/3226 |
| 2019/0302861 | A1 | 10/2019 | Desai et al. | |
| 2019/0385057 | A1* | 12/2019 | Litichever | H04L 63/14 |

OTHER PUBLICATIONS

"I3C (bus)", Wikipedia, Retrieved on Jul. 5, 2021, Webpage available at : https://en.wikipedia.org/wiki/I3C_(bus).

"System Management Bus (SMBus) Specification", System Management Interface Forum, Version 3.0, Dec. 20, 2014, pp. 1-85.

"CAN bus", Wikipedia, Retrieved on Jul. 5, 2021, Webpage available at : https://en.wikipedia.org/wiki/CAN_bus#ID_allocation.

"Medium Access Control", Wikipedia, Retrieved on Jul. 5, 2021, Webpage available at : https://en.wikipedia.org/wiki/Medium_access_control.

"Serial Peripheral Interface", Wikipedia, Retrieved on Jul. 5, 2021, Webpage available at : https://en.wikipedia.org/wiki/Serial_Peripheral_Interface.

"Using Encryption to Secure a 7 Series FPGA Bitstream", Xilinx, XAPP1239 (v1.2), Mar. 26, 2021, pp. 1-17.

"JTAG", Wikipedia, Retrieved on Jul. 5, 2021, Webpage available at : https://en.wikipedia.org/wiki/JTAG.

"Local Interconnect Network", Wikipedia, Retrieved on Jul. 5, 2021, Webpage available at : https://en.wikipedia.org/wiki/Local_Interconnect_Network.

"BCM2711 ARM Peripherals", Raspberry Pi, Retrieved on Jul. 5, 2021, Webpage available at : https://www.raspberrypi.org/documentation/hardware/raspberrypi/bcm2711/rpi_DATA_2711_1p0_preliminary.pdf.

"Atmel 8-bit AVR Microcontroller with 2/4/8K Bytes In-System Programmable Flash", Atmel, Rev. 2586Q-AVR-Aug. 2013, Aug. 2013, 234 pages.

"Serial Flash Reset Signaling Protocol", Jedec, JESD252.01, Apr. 2021, 2 pages.

"Improving Inter Integrated Circuits—From Sensor Hubs to Platform Management Solutions", Design & Reuse, Retrieved on Jul. 5, 2021, Webpage available at : https://www.design-reuse.com/articles/41906/improving-inter-integrated-circuits-from-sensor-hubs-to-platform-management-solutions.html.

"Juno r2 ARM Development Platform SoC", ARM, Technical Reference Manual, Revision: r2p0, 2014-2016, 223 pages.

Extended European Search Report received for corresponding European Patent Application No. 20191261.5, dated Jan. 21, 2021, 7 pages.

Office Action for European Application No. 20191261.5 dated Nov. 15, 2023, 4 pages.

* cited by examiner

DYNAMICALLY REPROGRAMMABLE TOPOLOGICALLY UNIQUE INTEGRATED CIRCUIT IDENTIFICATION

TECHNOLOGICAL FIELD

Various example embodiments relate generally to techniques in integrated circuits, and, more particularly, to techniques for dynamically reprogrammable topologically unique integrated circuit identification.

BACKGROUND

In integrated circuit (IC) systems, a controlling host may be associated with a communication bus, and the communication bus may be connected to an arbitrary number of integrated circuits (ICs), sometimes referred to as targets. In such existing systems, the targets may be identical, or the targets may be different with different functions. Without a method to topologically distinguish the targets on the communication bus, the host cannot communicate topologically unique data with them.

BRIEF SUMMARY

A method, apparatus, and computer program product provide for dynamically reprogrammable topologically unique integrated circuit identification. In an example embodiment, an integrated circuit may be arranged among multiple integrated circuits. The integrated circuit may be configured to derive a topologically unique identifier by performing input measurements of stimuli provided by a host circuit. The integrated circuit may be topologically indistinguishable from at least one other integrated circuit of the multiple integrated circuits from a perspective of the host circuit.

BRIEF DESCRIPTION OF THE DRAWINGS

Figure 1:
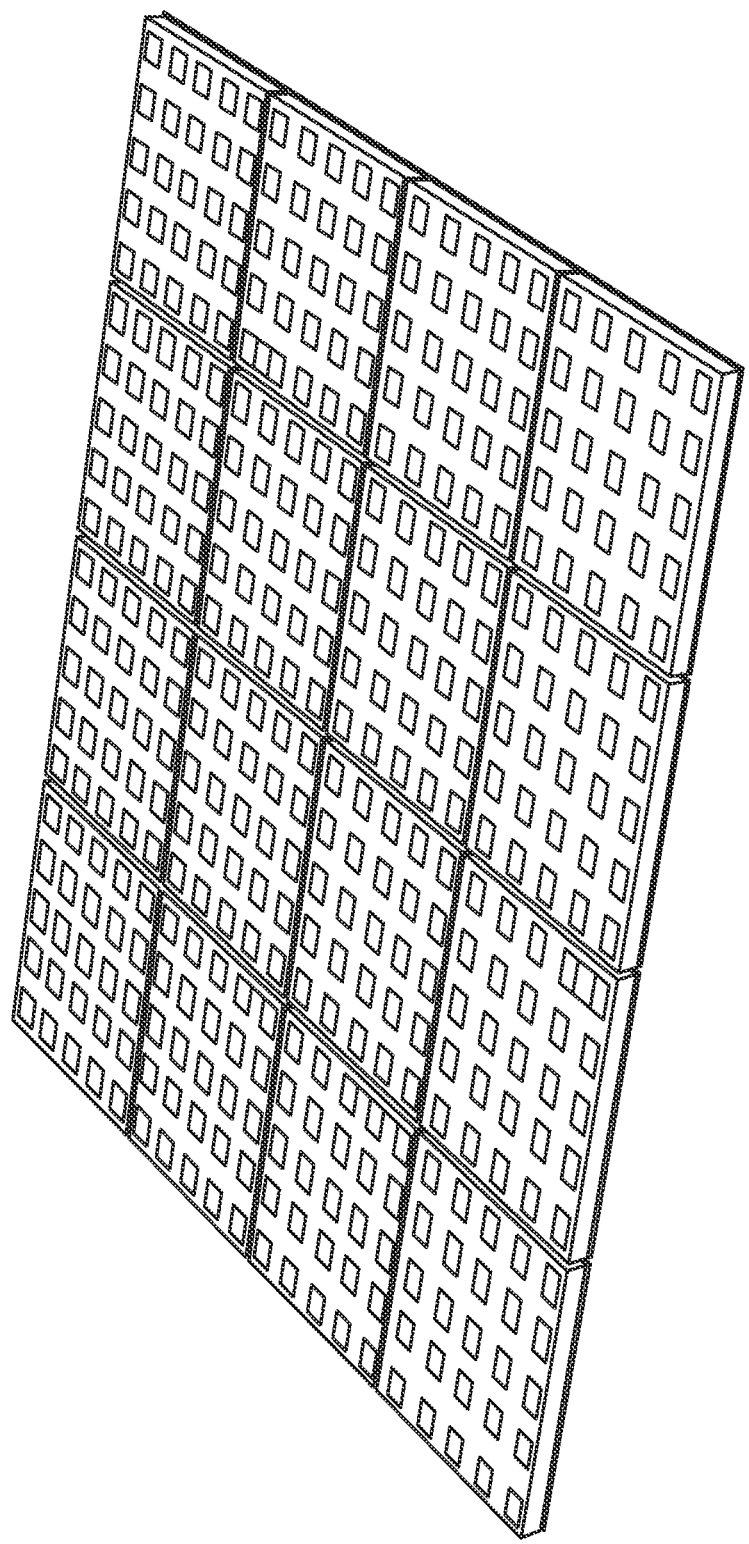

Having thus described certain example embodiments of the present disclosure in general terms, reference will hereinafter be made to the accompanying drawings, which are not necessarily drawn to scale, and wherein:

FIG. 1 illustrates a controlling host attached to an arbitrary number of integrated circuits.

Figures 2A, 2B:
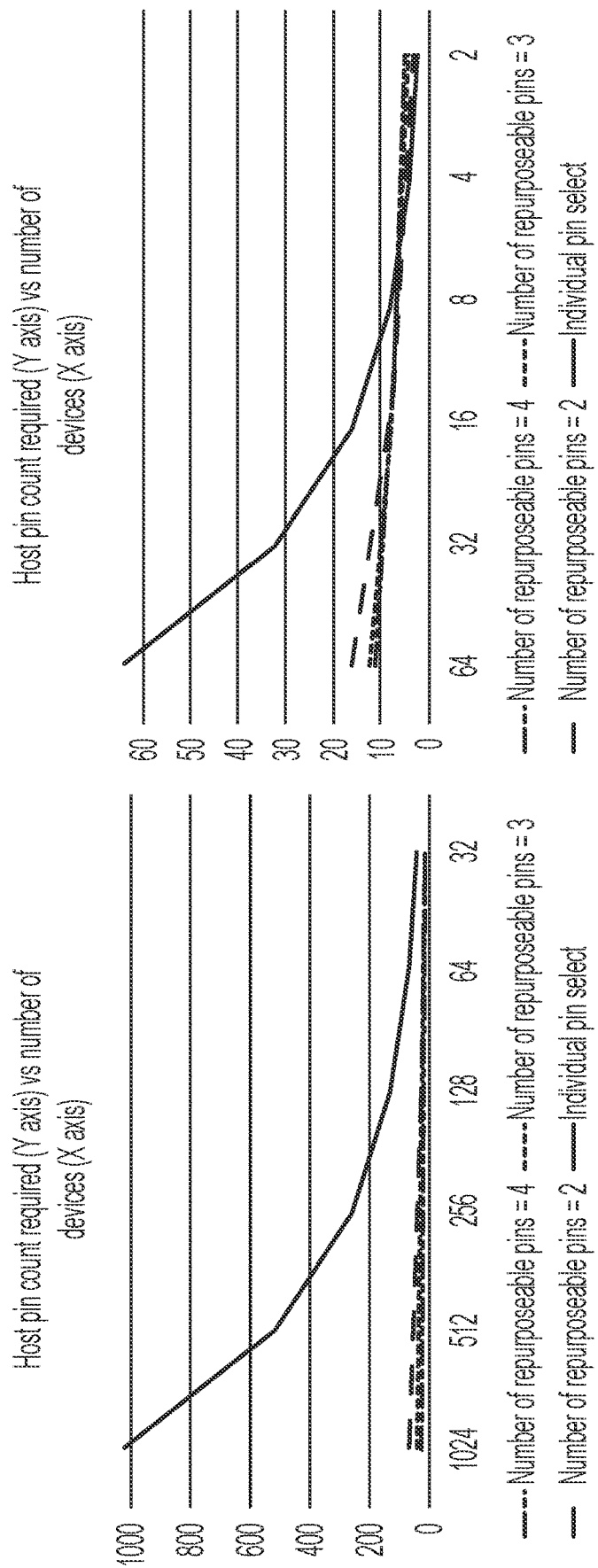
Figure 2C:
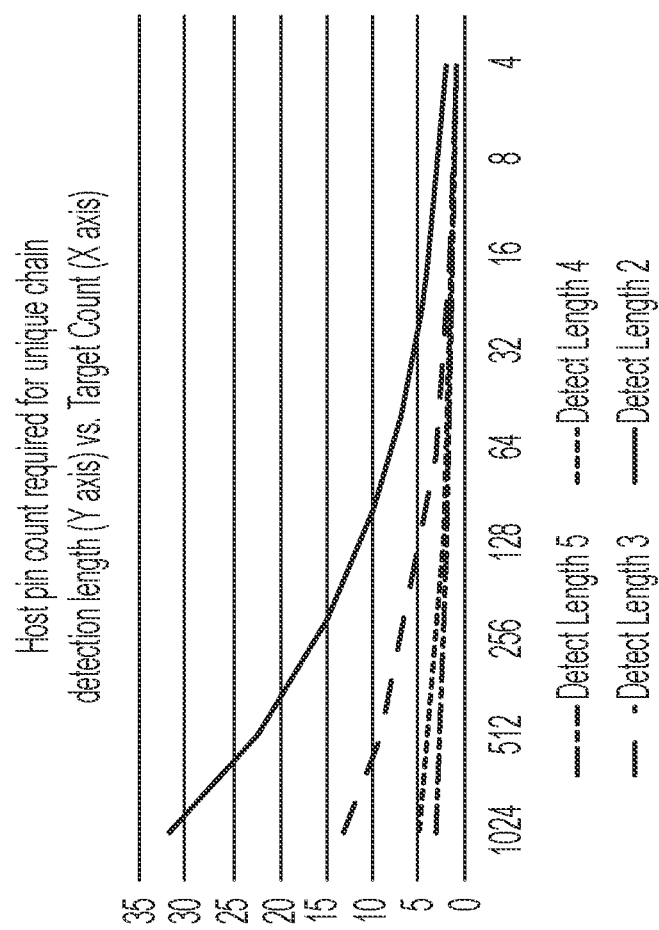

FIGS. 2A, 2B, and 2C illustrate host pin requirements for supporting a given number of topologically indistinguishable devices.

FIGS. 3A, 3B, 3C, 3D, 3E, 3F, 3G, and 3H illustrate example embodiments of the subject matter described herein.

Figure 4A:
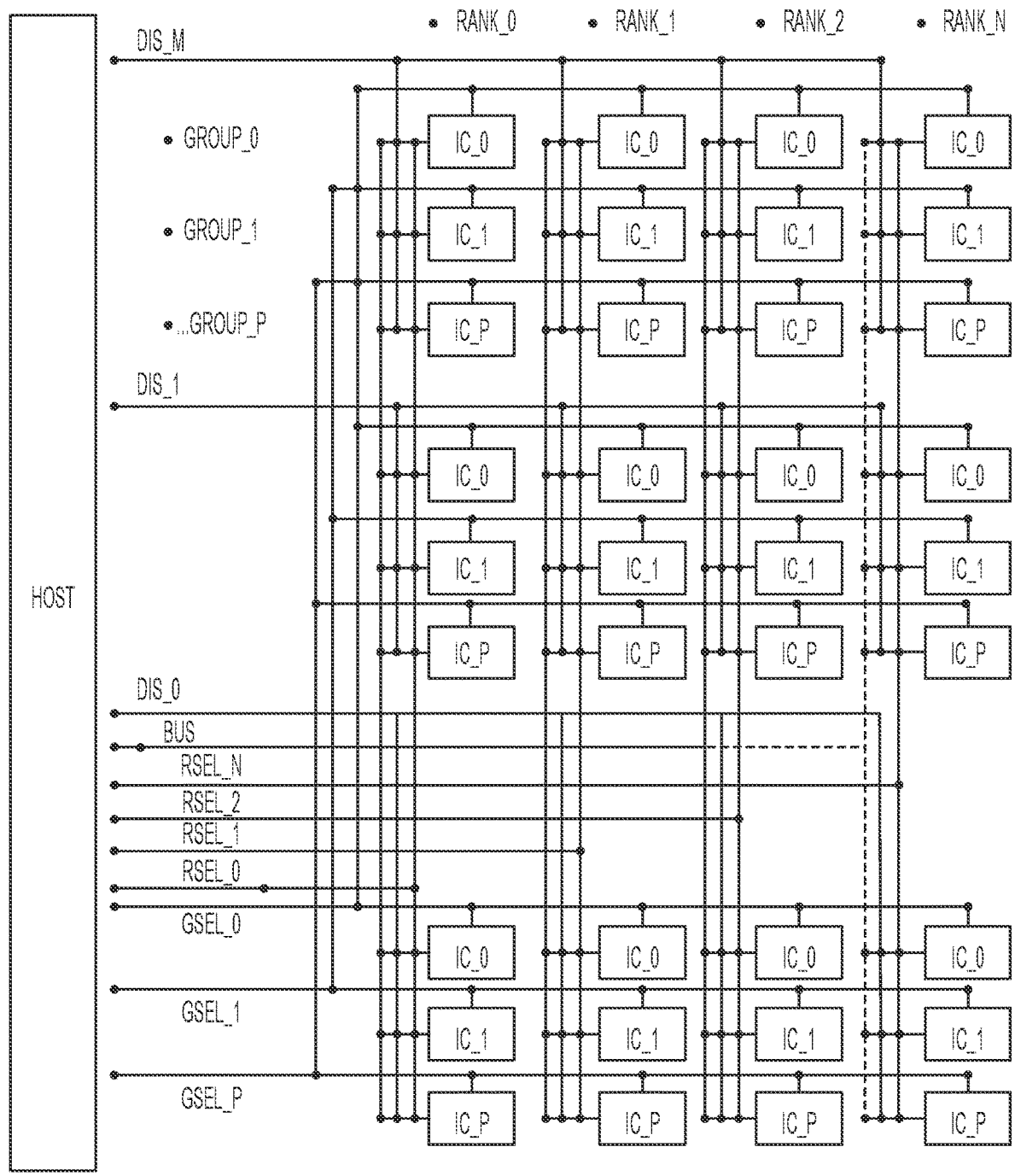
Figure 4B:
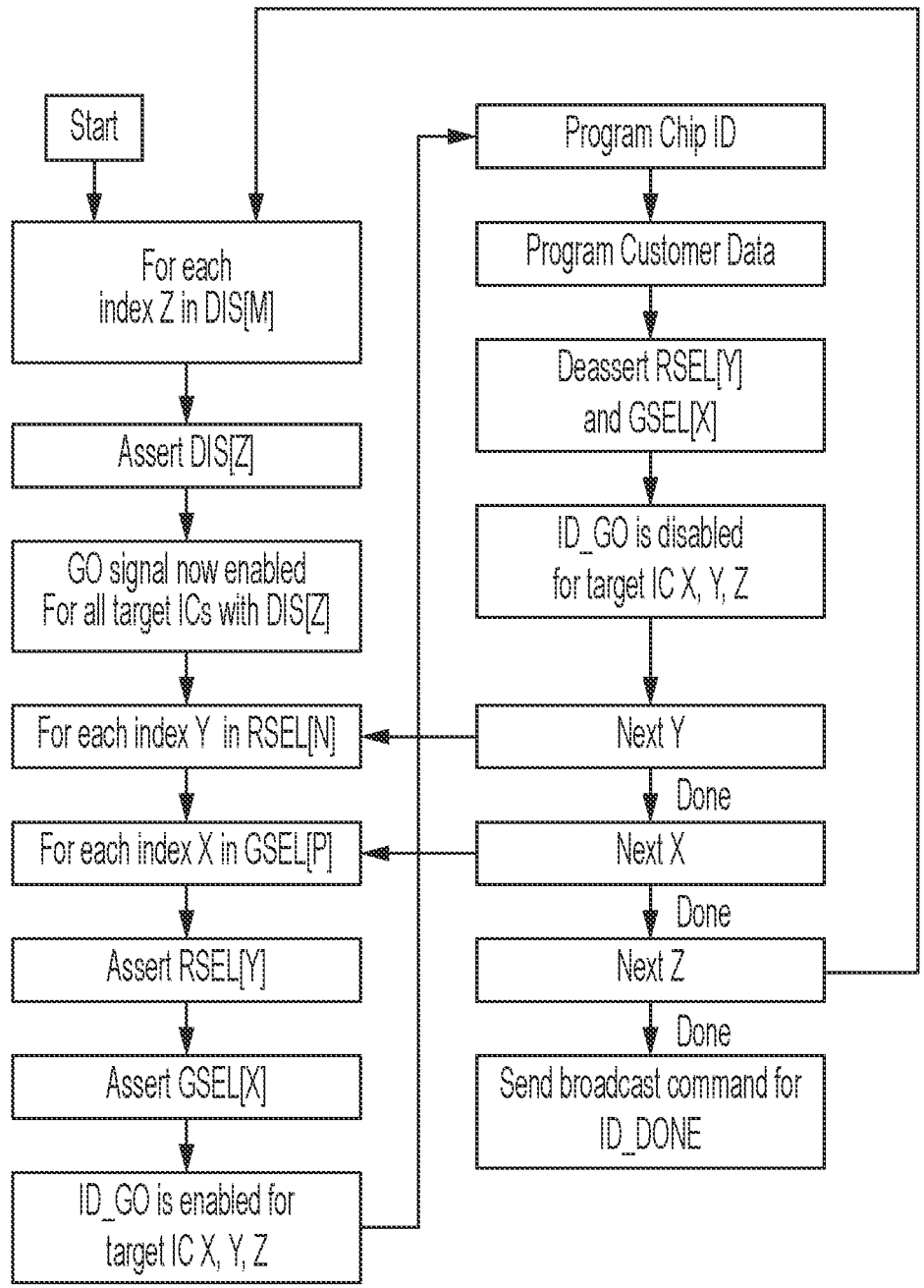

FIGS. 4A and 4B illustrate example operations performed using various embodiments of the present disclosure.

Figure 5A:
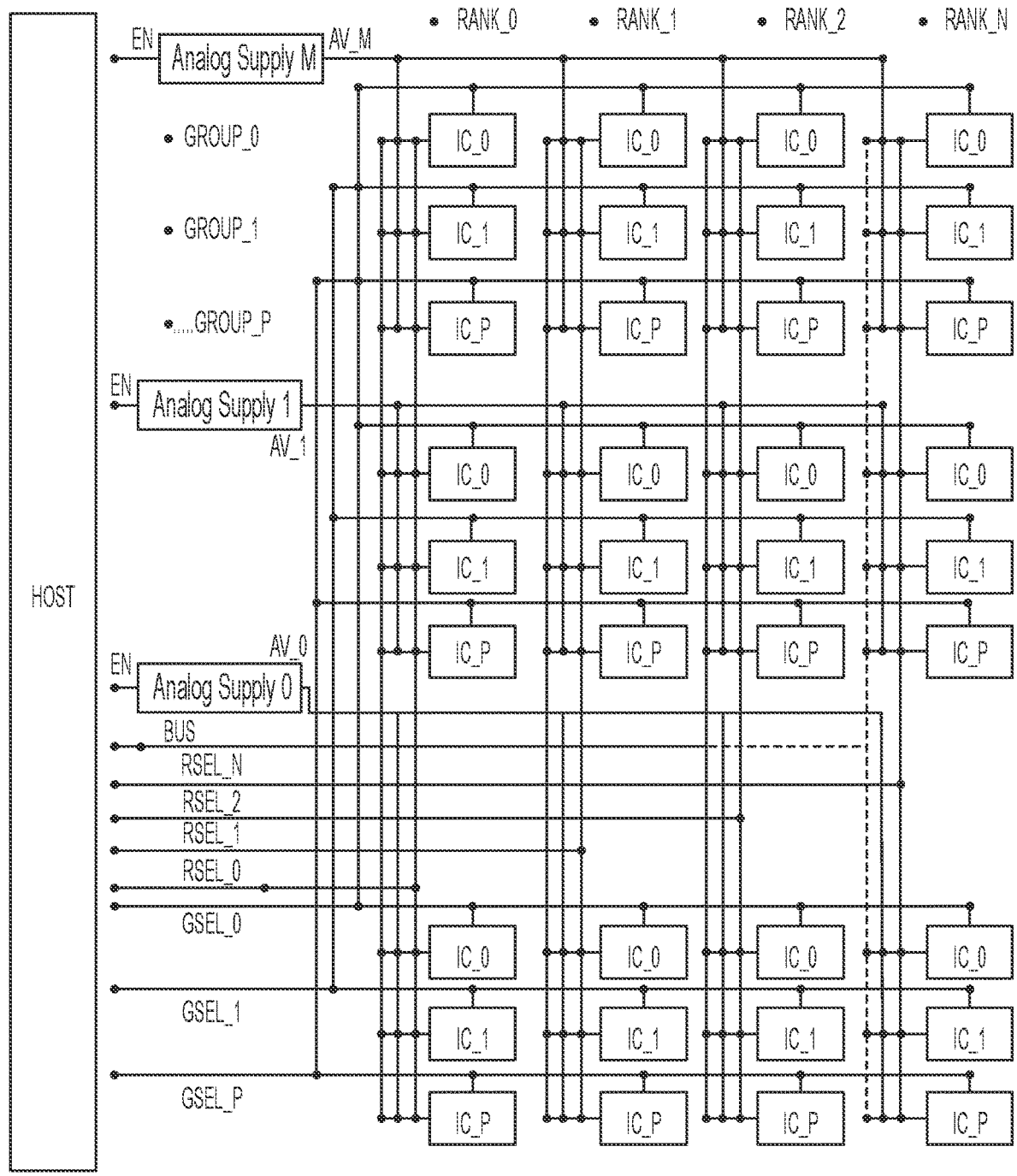
Figure 5B:
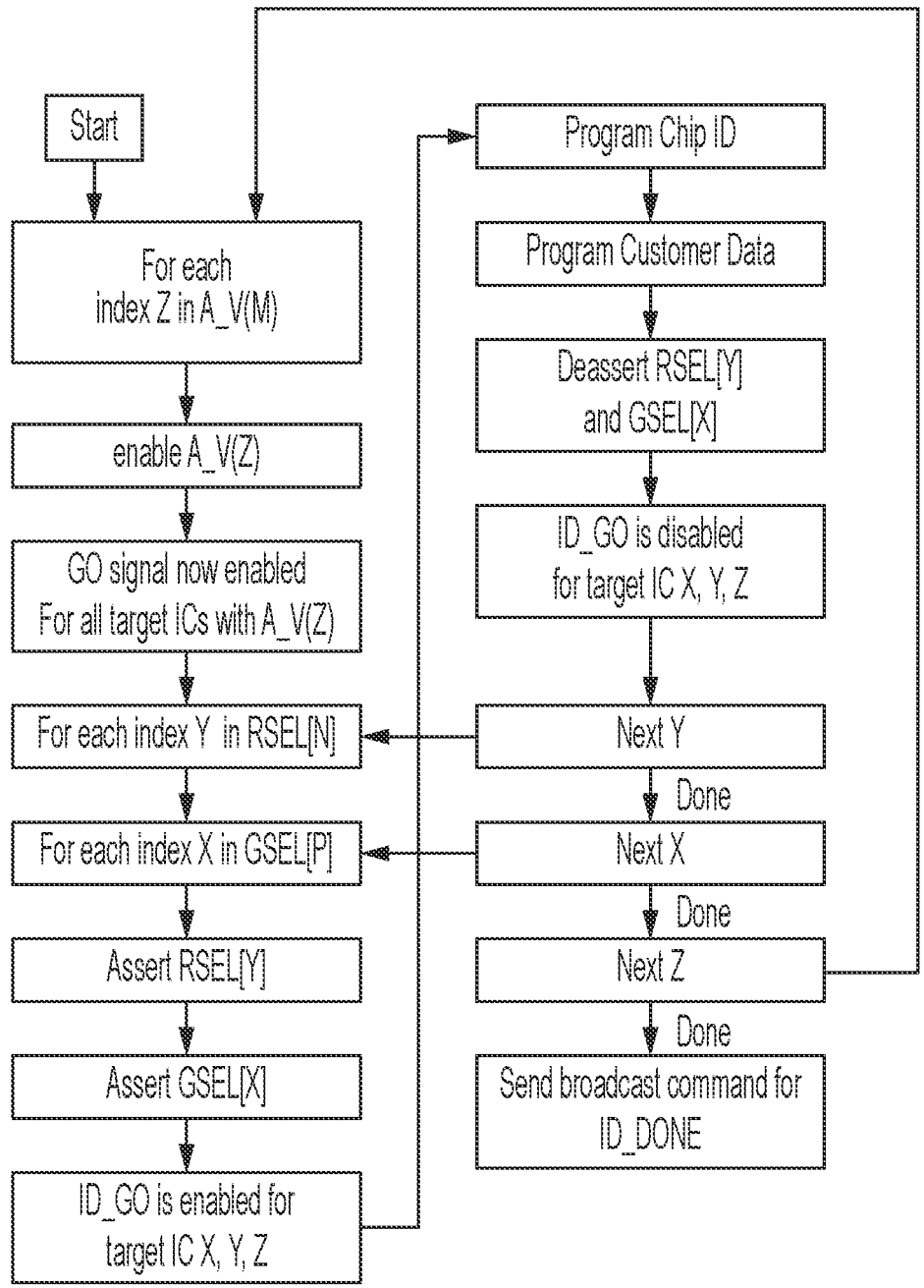

FIGS. 5A and 5B illustrate example operations performed using various embodiments of the present disclosure.

Figure 6:
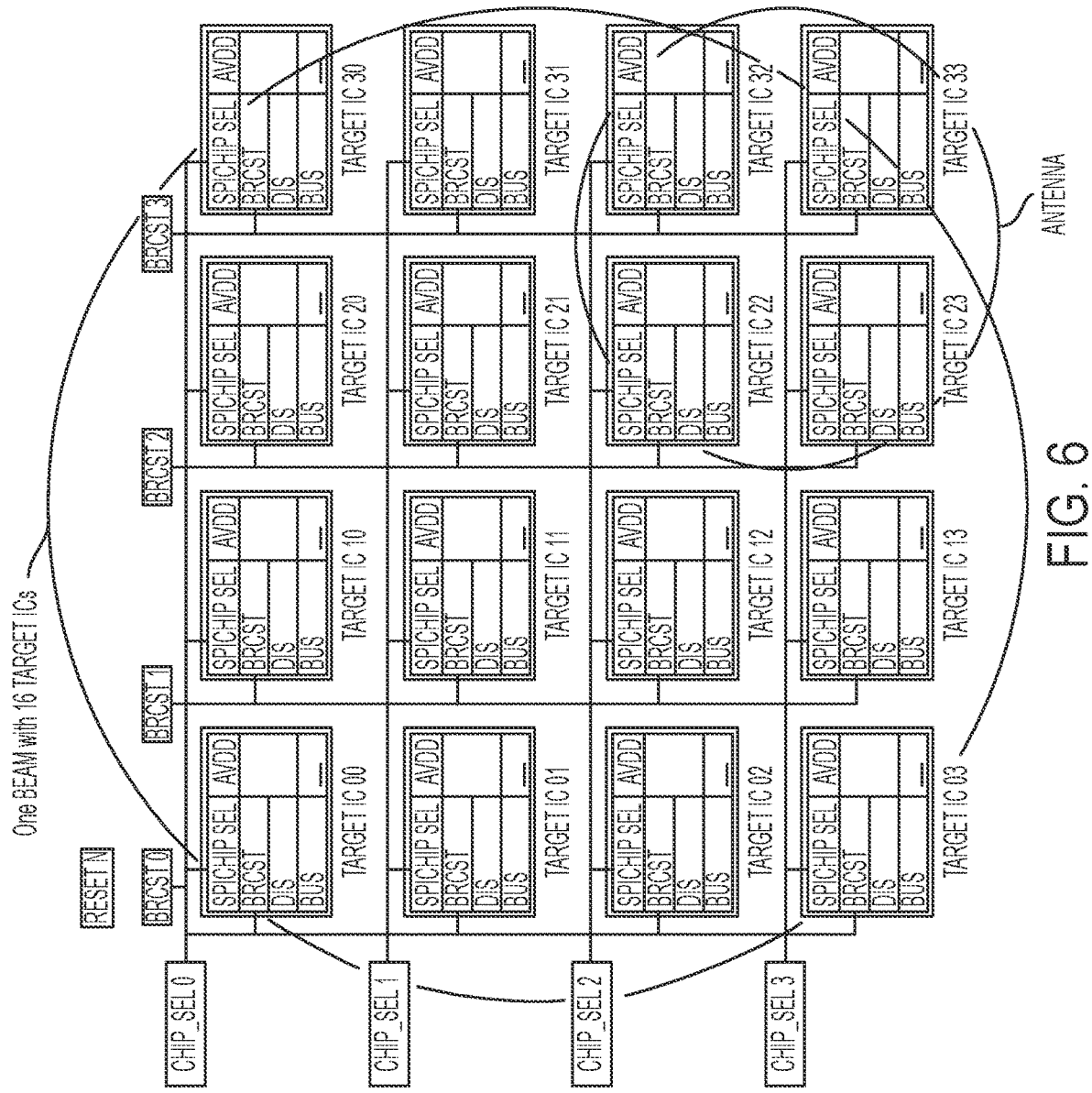

FIG. 6 illustrates an example embodiment of the subject matter described herein.

Figure 7:
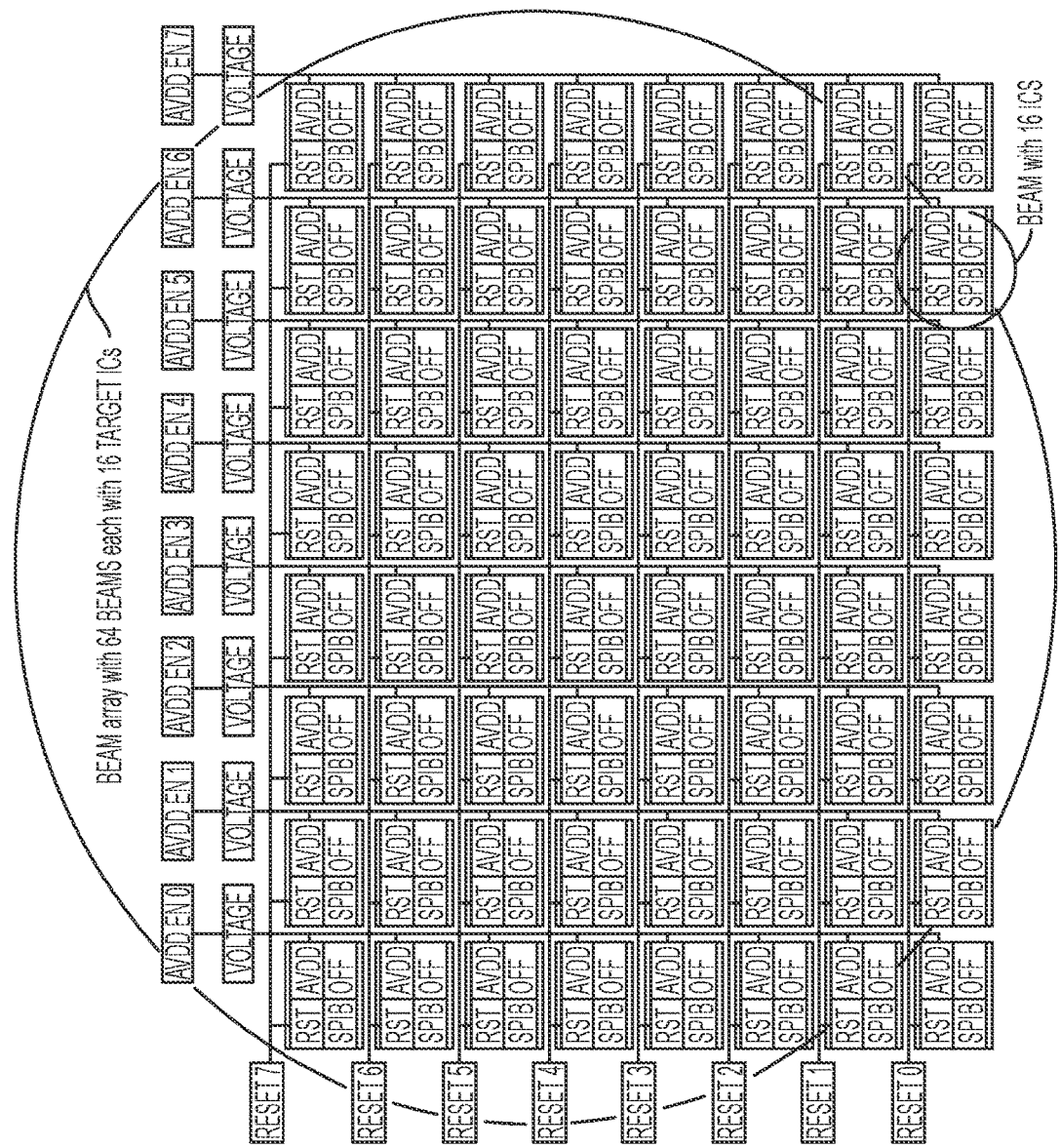

FIG. 7 illustrates an example embodiment of the subject matter described herein.

Figure 8:
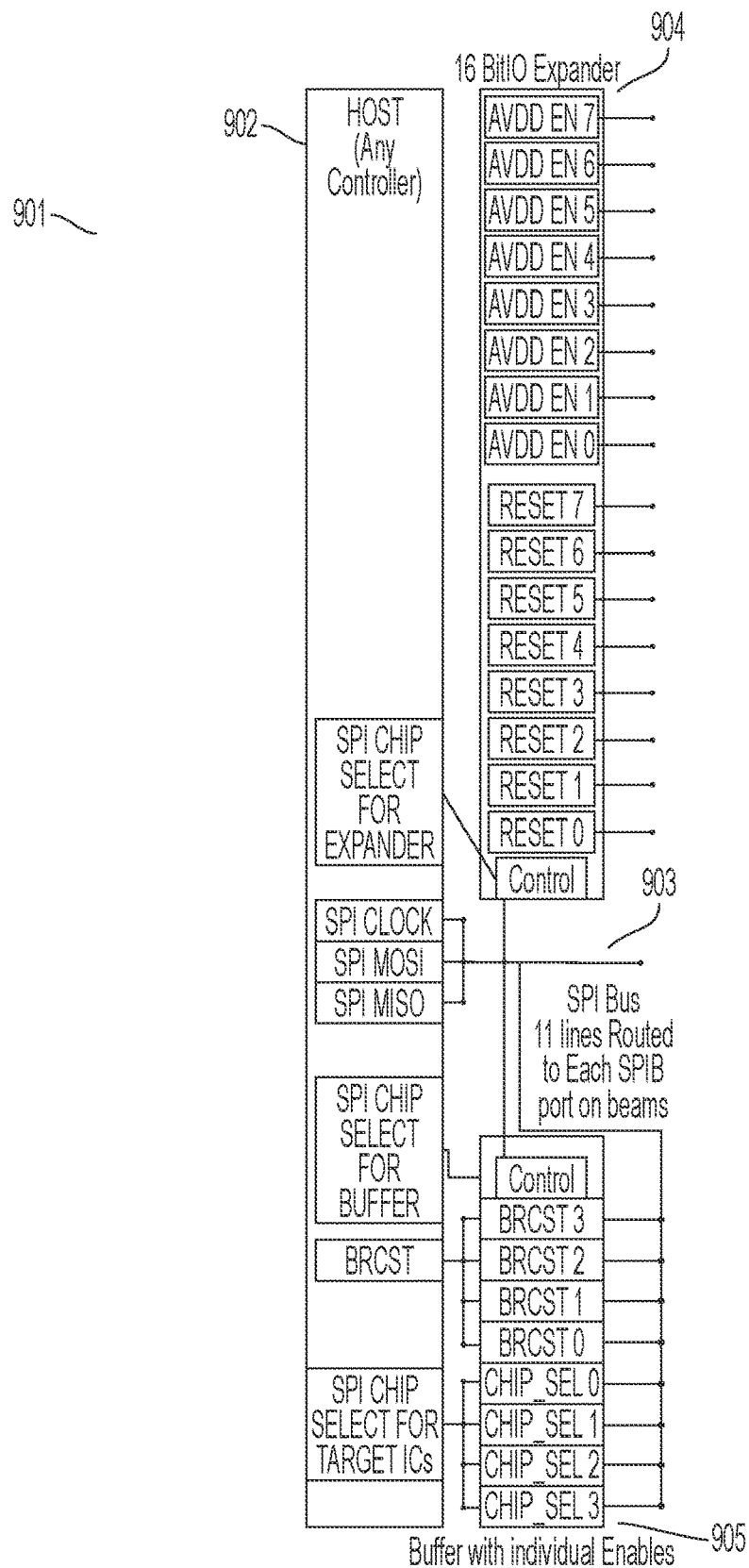

FIG. 8 illustrates an example embodiment of the subject matter described herein.

Figure 9A:
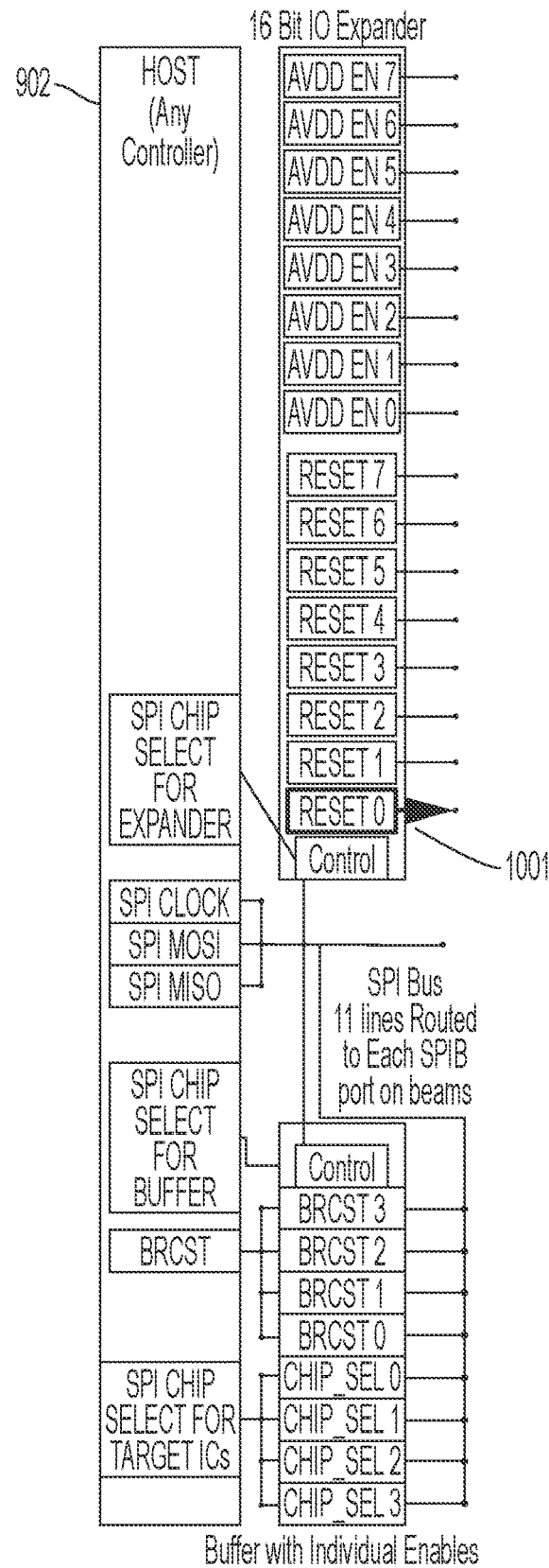

FIGS. 9A, 9B, and 9C illustrate example operations performed according to various embodiments of the present disclosure.

Figure 10A:
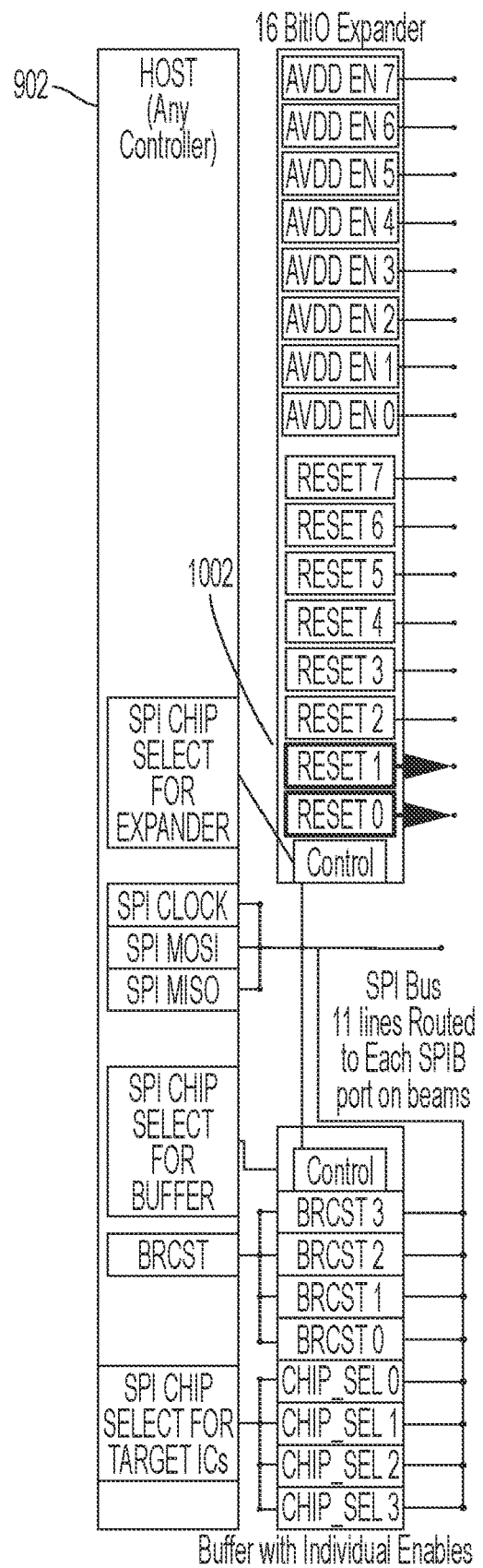

FIGS. 10A, 10B, and 10C illustrate example operations performed according to various embodiments of the present disclosure.

Figure 11A:
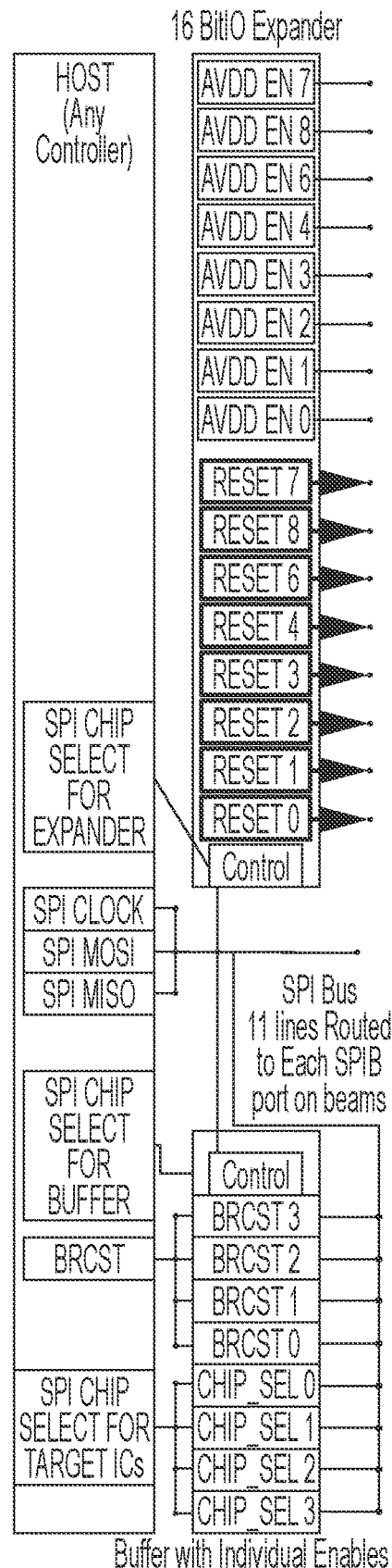
Figure 11B:
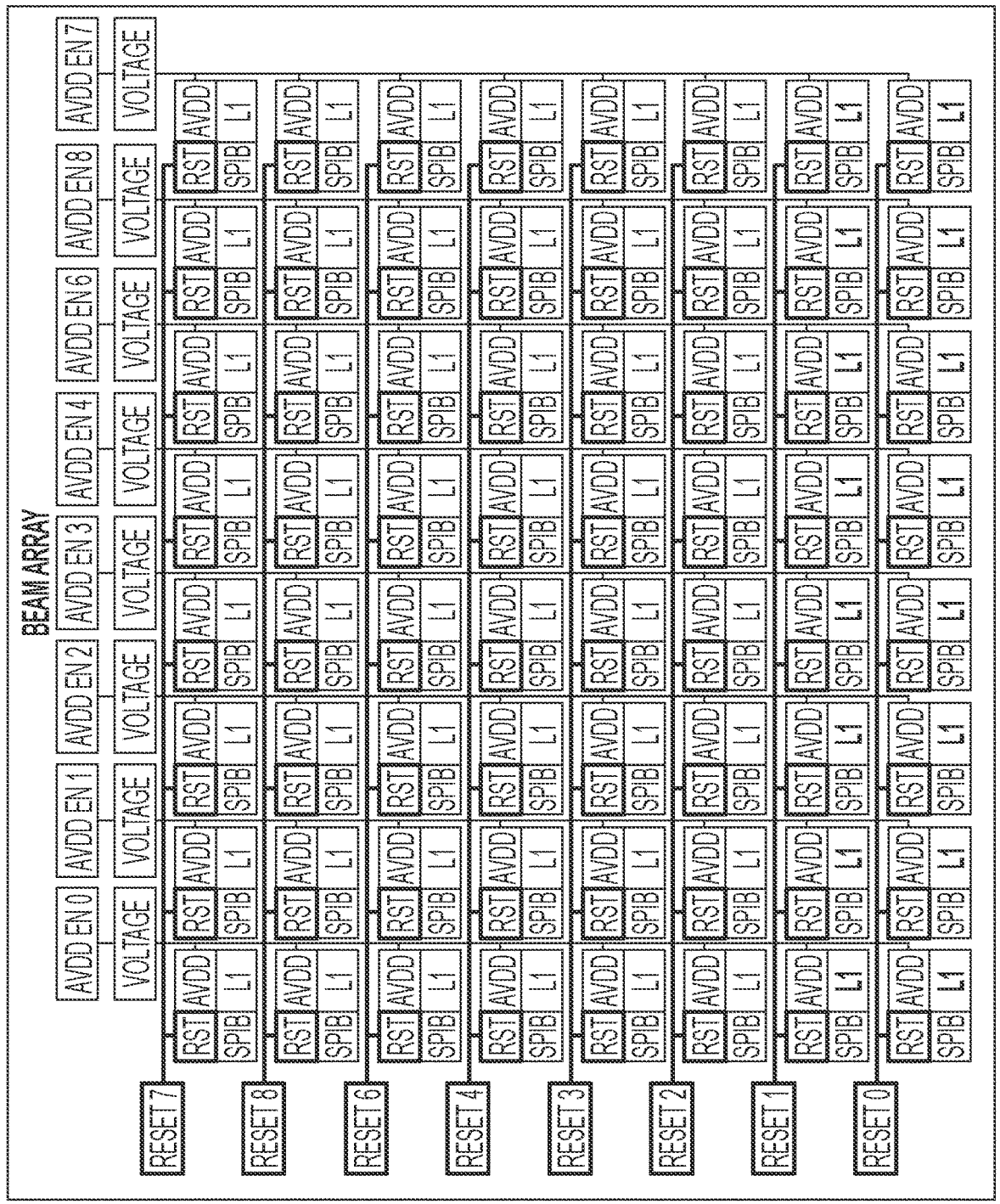

FIGS. 11A, 11B, and 11C illustrate example operations performed according to various embodiments of the present disclosure.

Figure 12A:
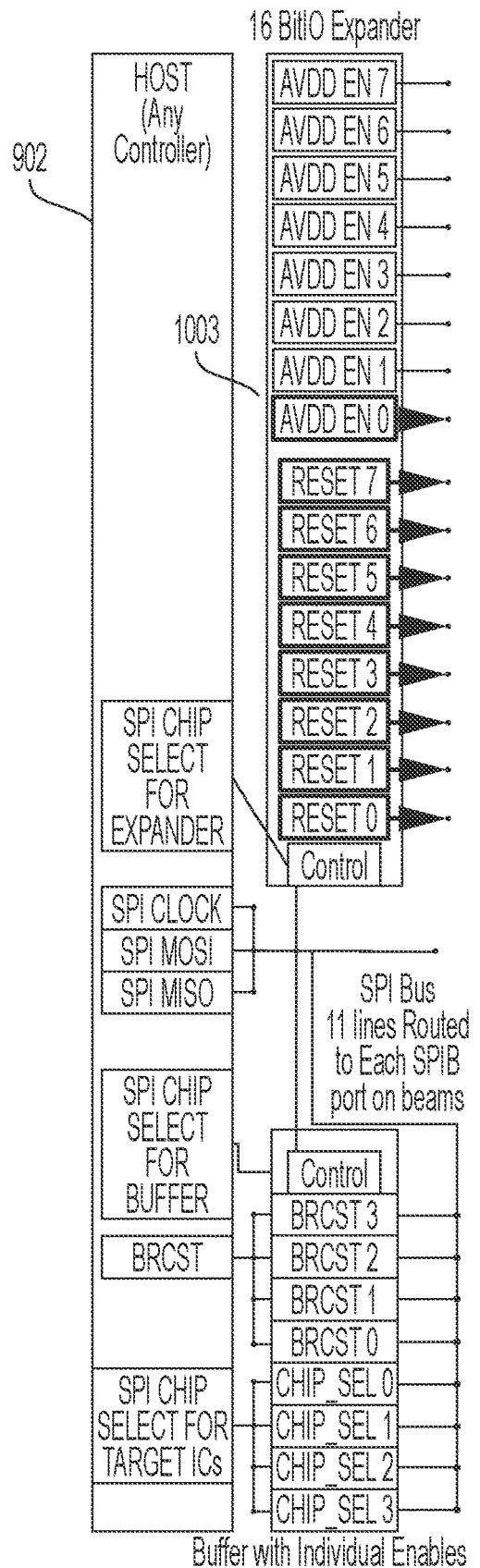
Figure 12B:
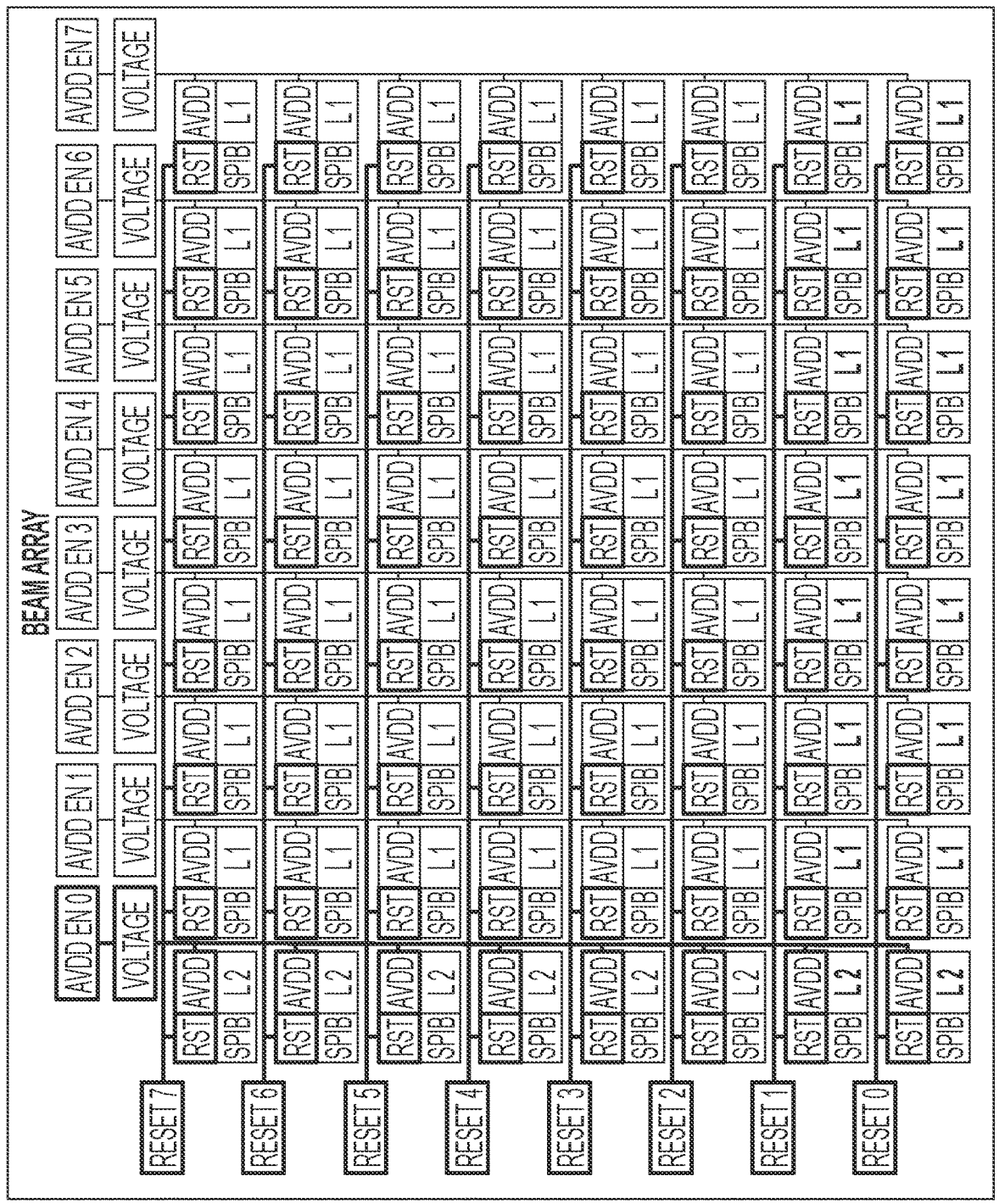

FIGS. 12A, 12B, and 12C illustrate example operations performed according to various embodiments of the present disclosure.

Figure 13A:
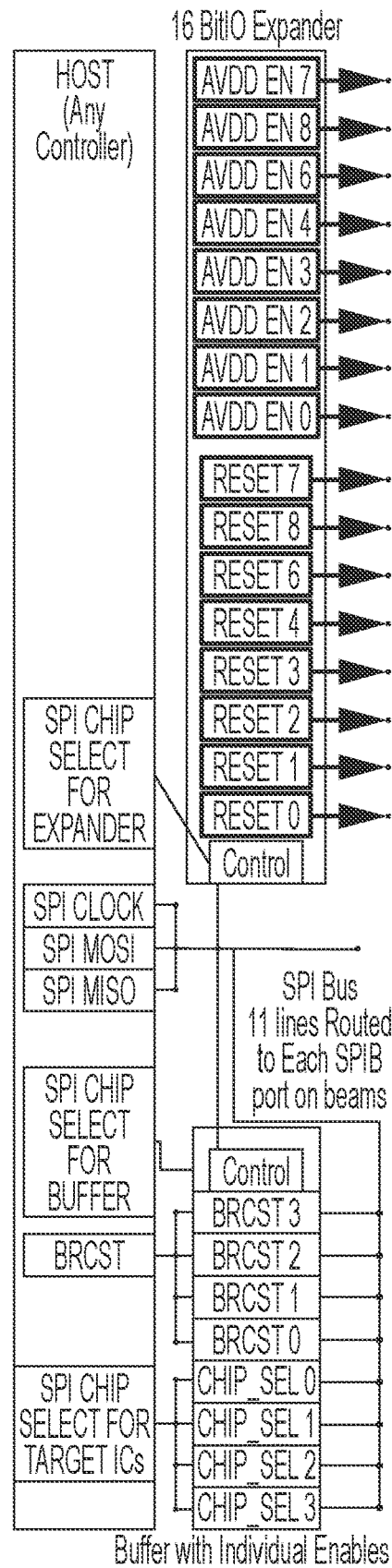
Figure 13B:
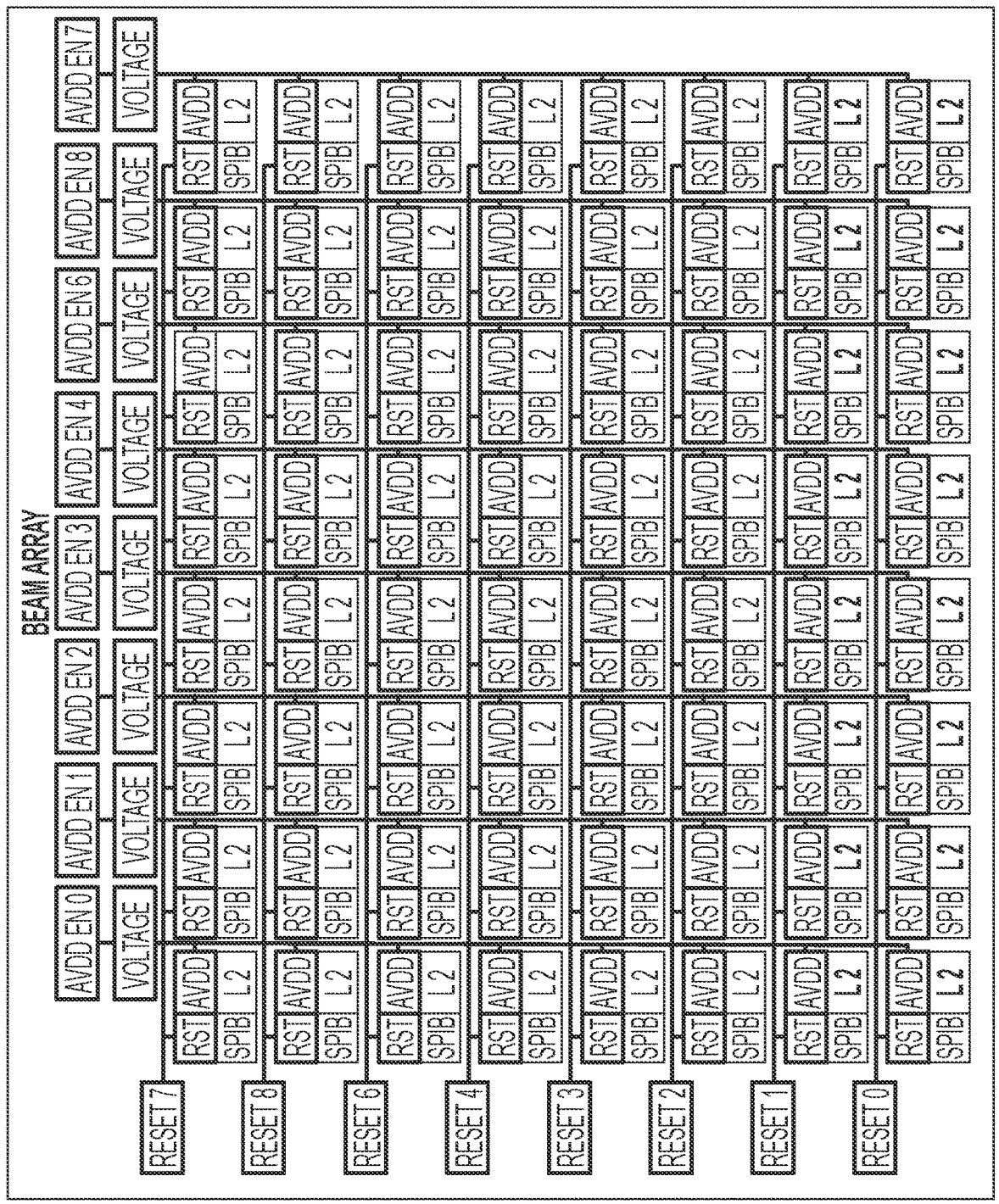

FIGS. 13A, 13B, and 13C illustrate example operations performed according to various embodiments of the present disclosure.

Figure 14A:
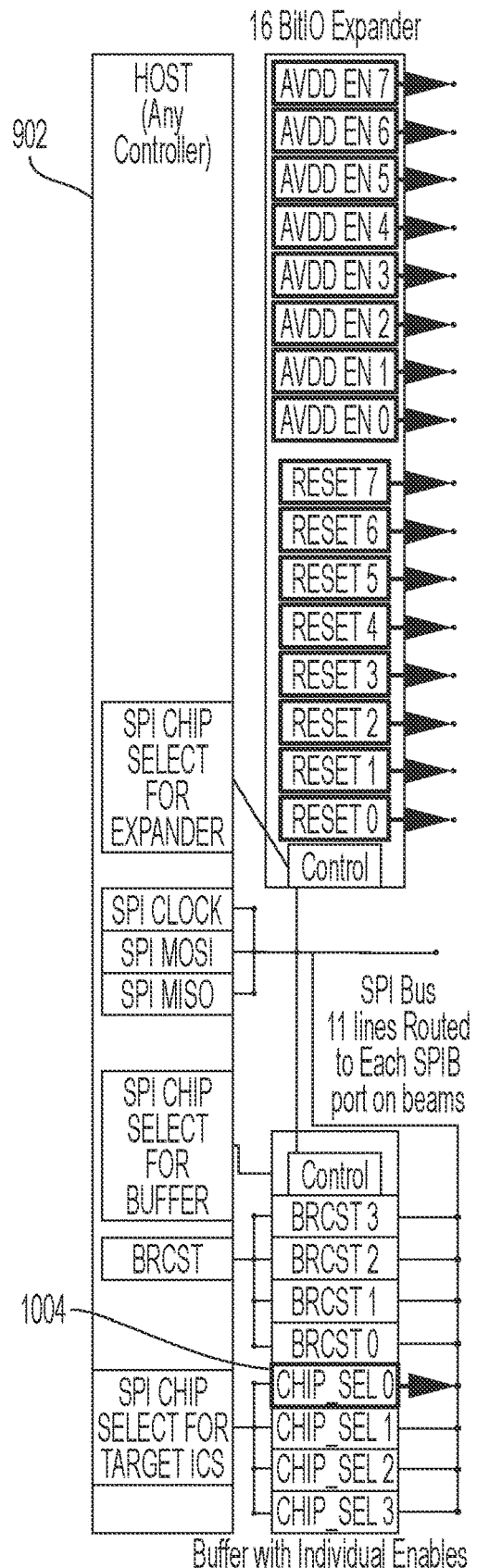
Figure 14B:
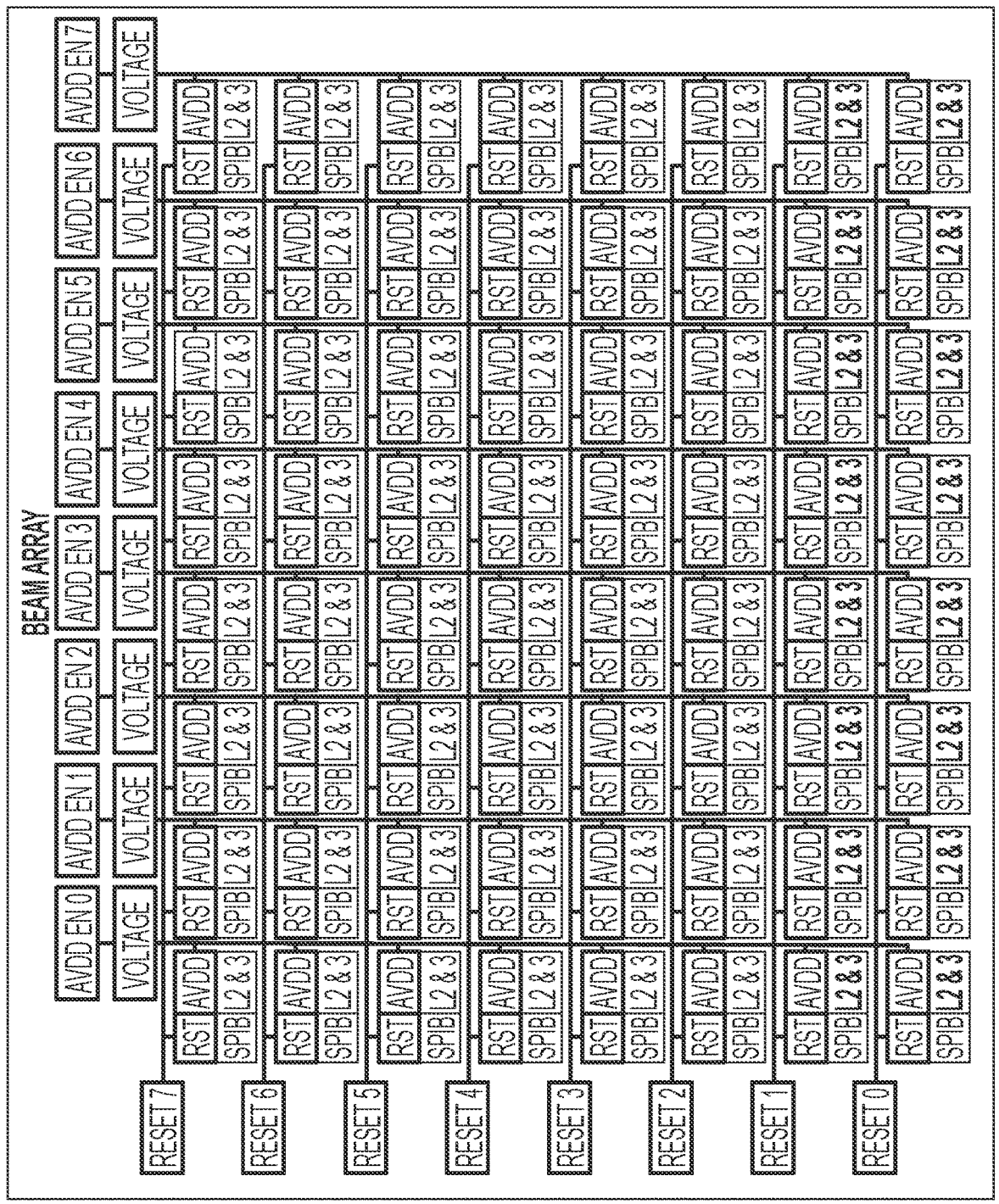
Figure 14C:
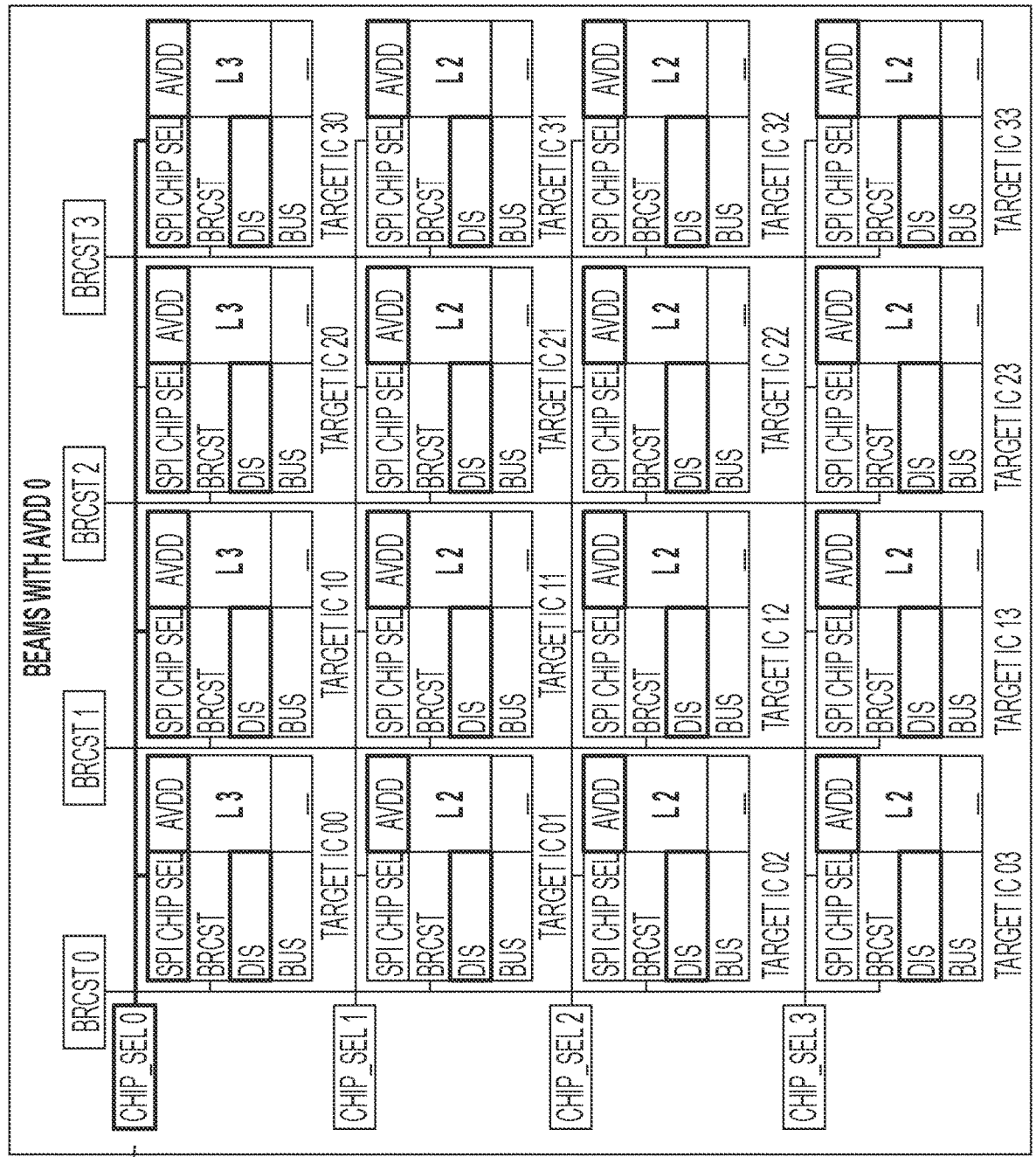

FIGS. 14A, 14B, and 14C illustrate example operations performed according to various embodiments of the present disclosure.

Figure 15A:
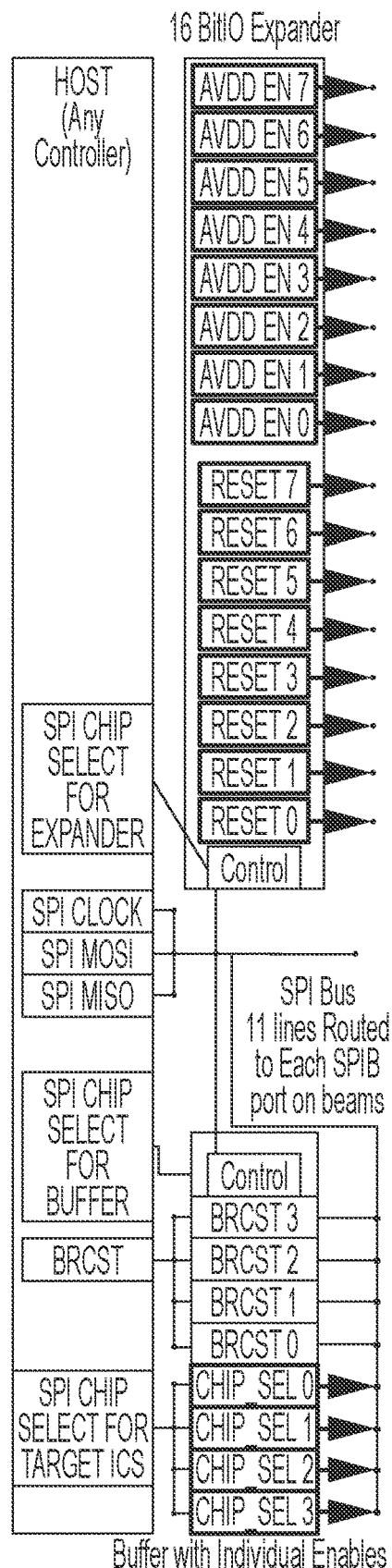
Figure 15B:
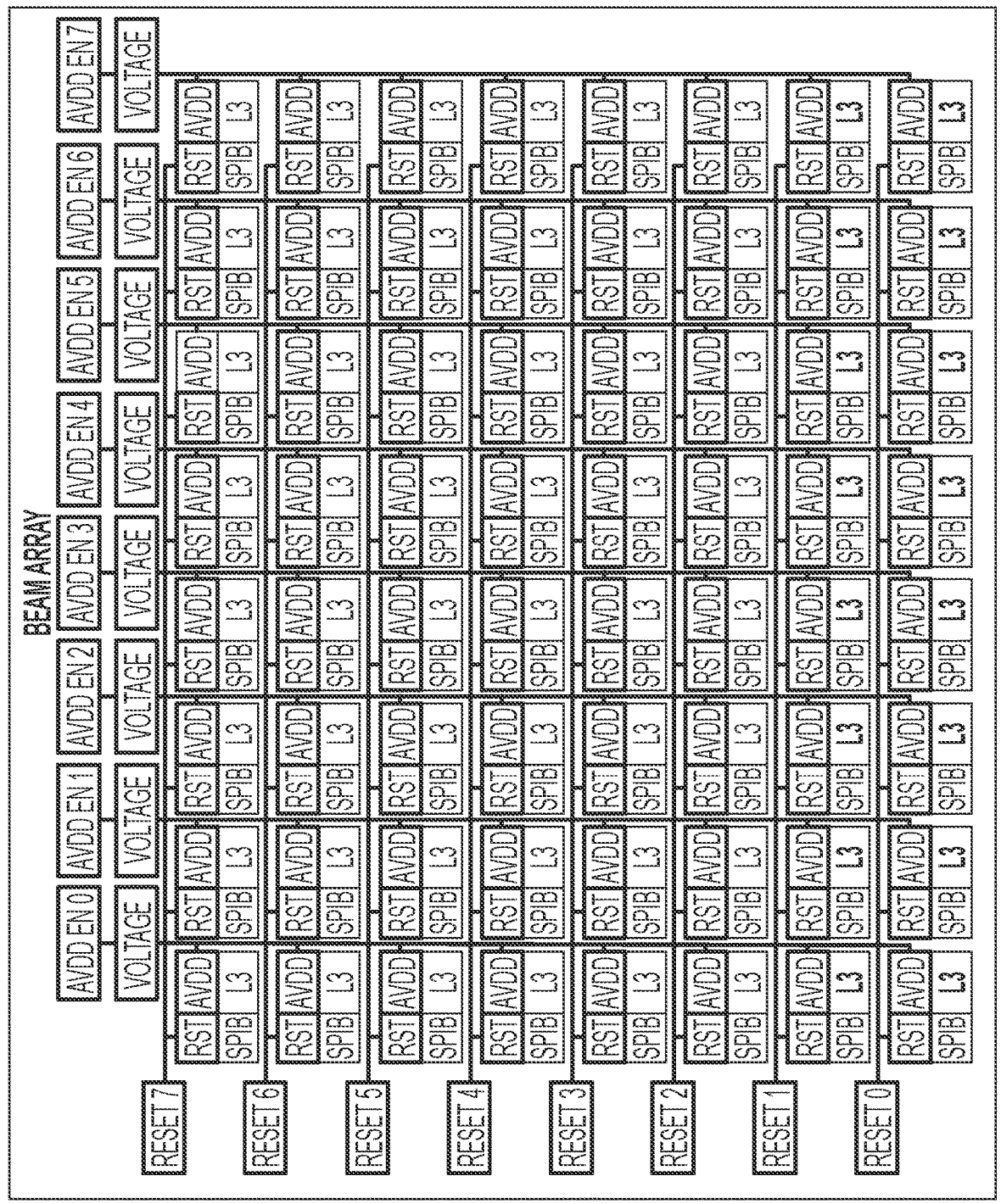

FIGS. 15A, 15B, and 15C illustrate example operations performed according to various embodiments of the present disclosure.

Figure 16A:
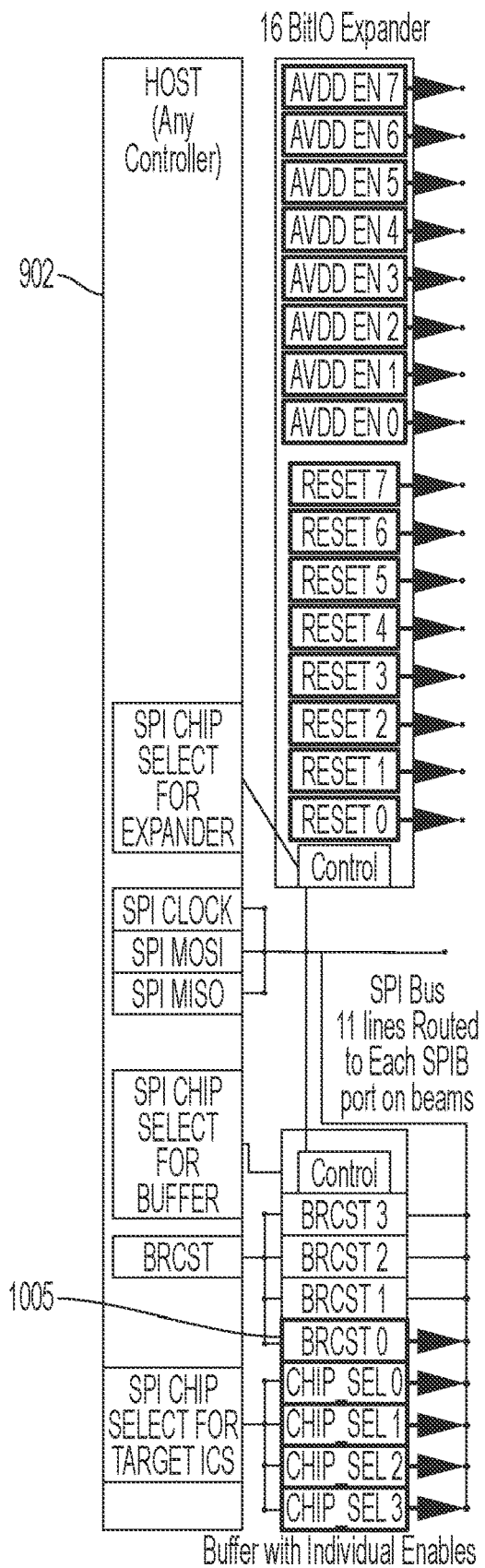
Figure 16B:
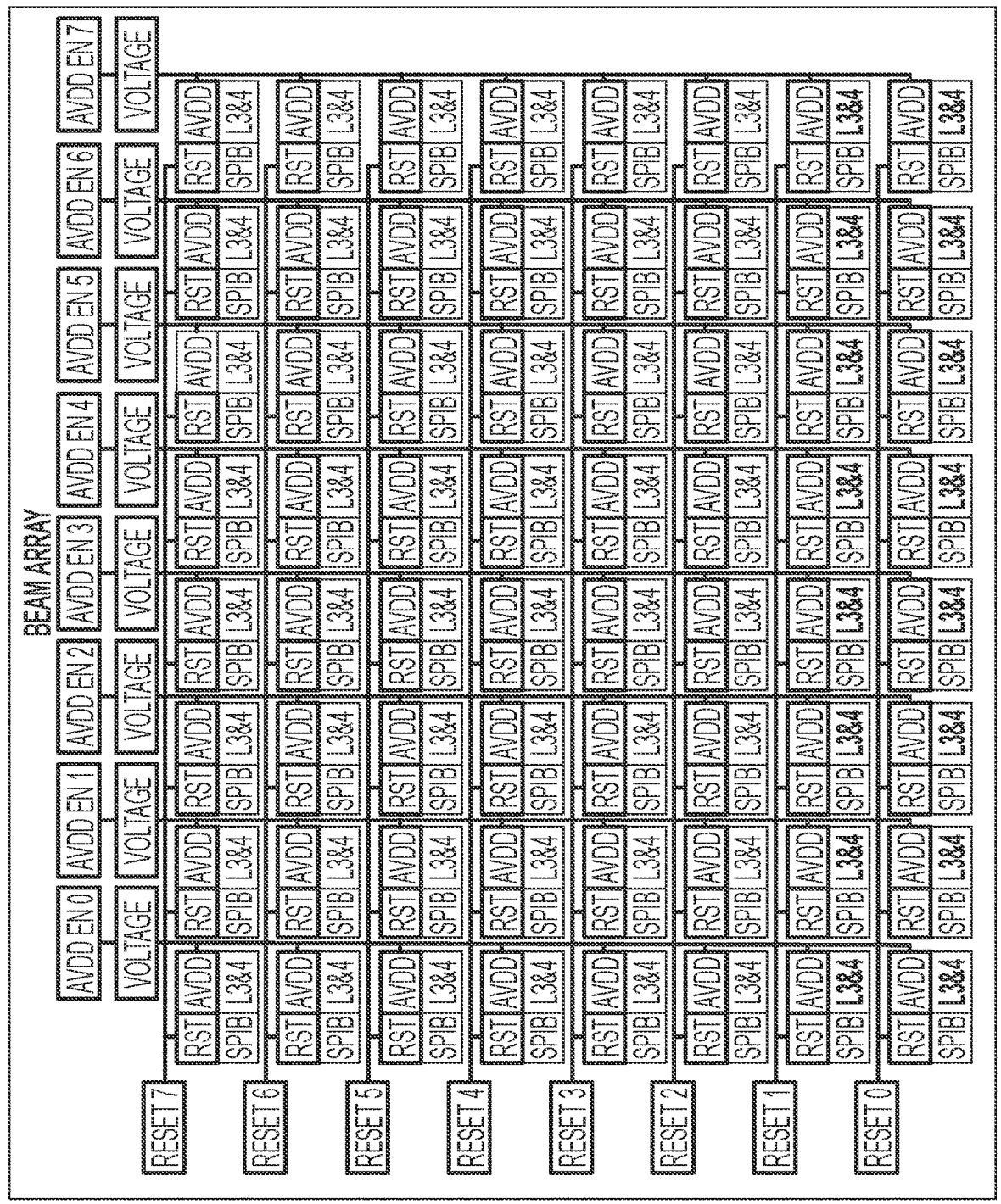

FIGS. 16A, 16B, and 16C illustrate example operations performed according to various embodiments of the present disclosure.

Figure 17A:
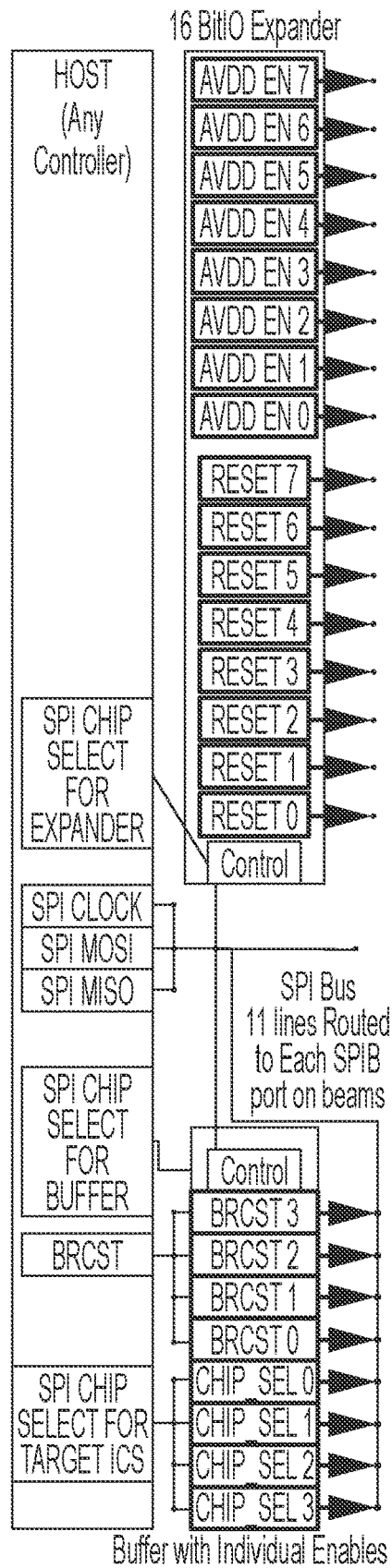

FIGS. 17A, 17B, and 17C illustrate example operations performed according to various embodiments of the present disclosure.

Figure 18A:
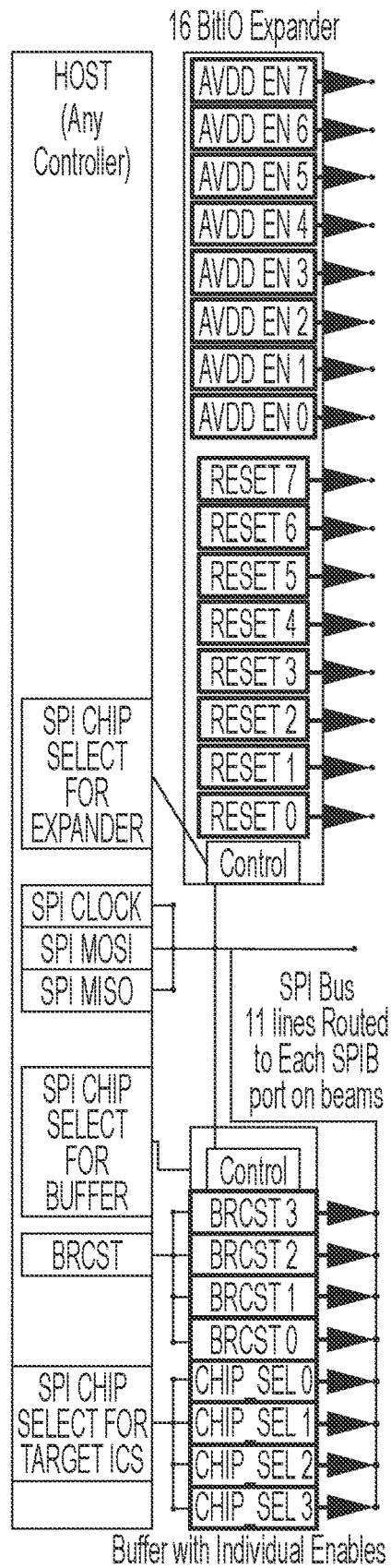
Figure 18C:
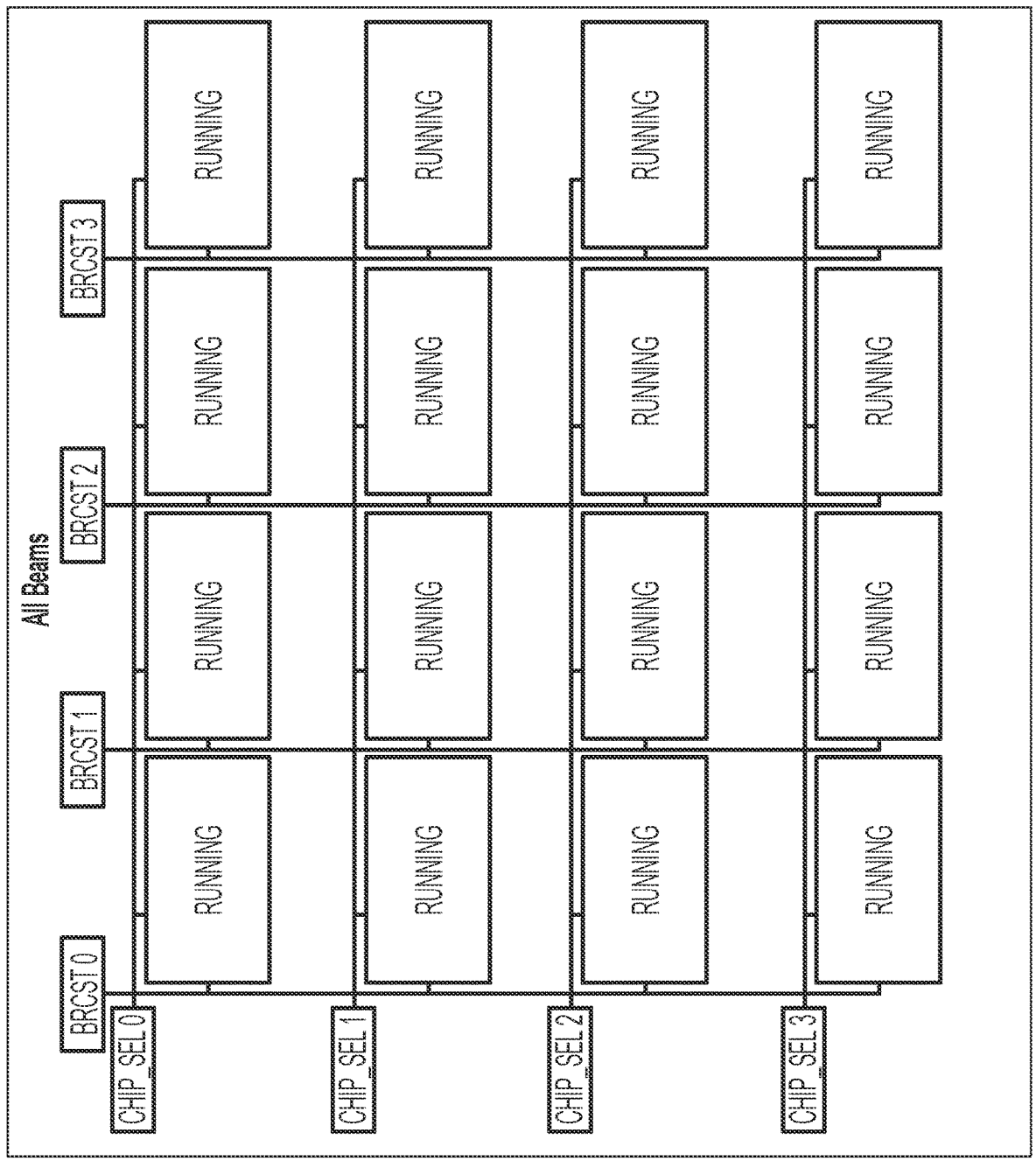

FIGS. 18A, 18B, and 18C illustrate example operations performed according to various embodiments of the present disclosure.

Figure 19:
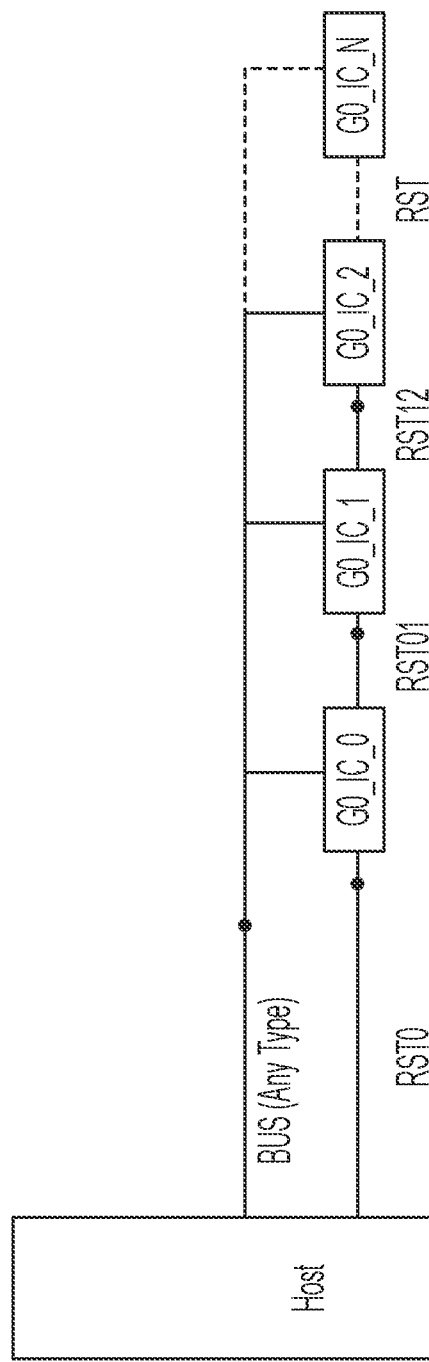

FIG. 19 illustrates an example embodiment of the subject matter described herein.

Figure 20:
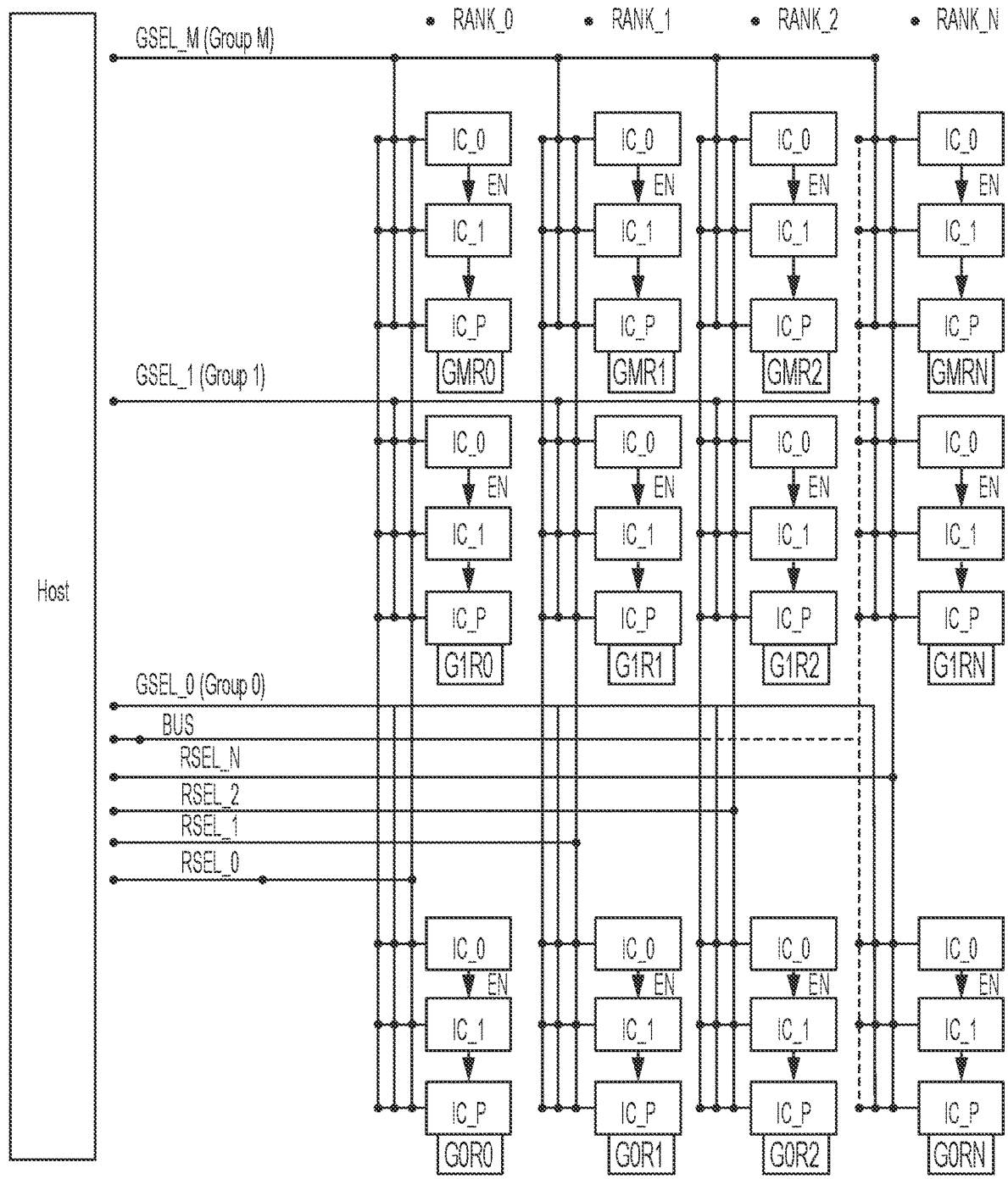

FIG. 20 illustrates an example embodiment of the subject matter described herein.

Figure 21:
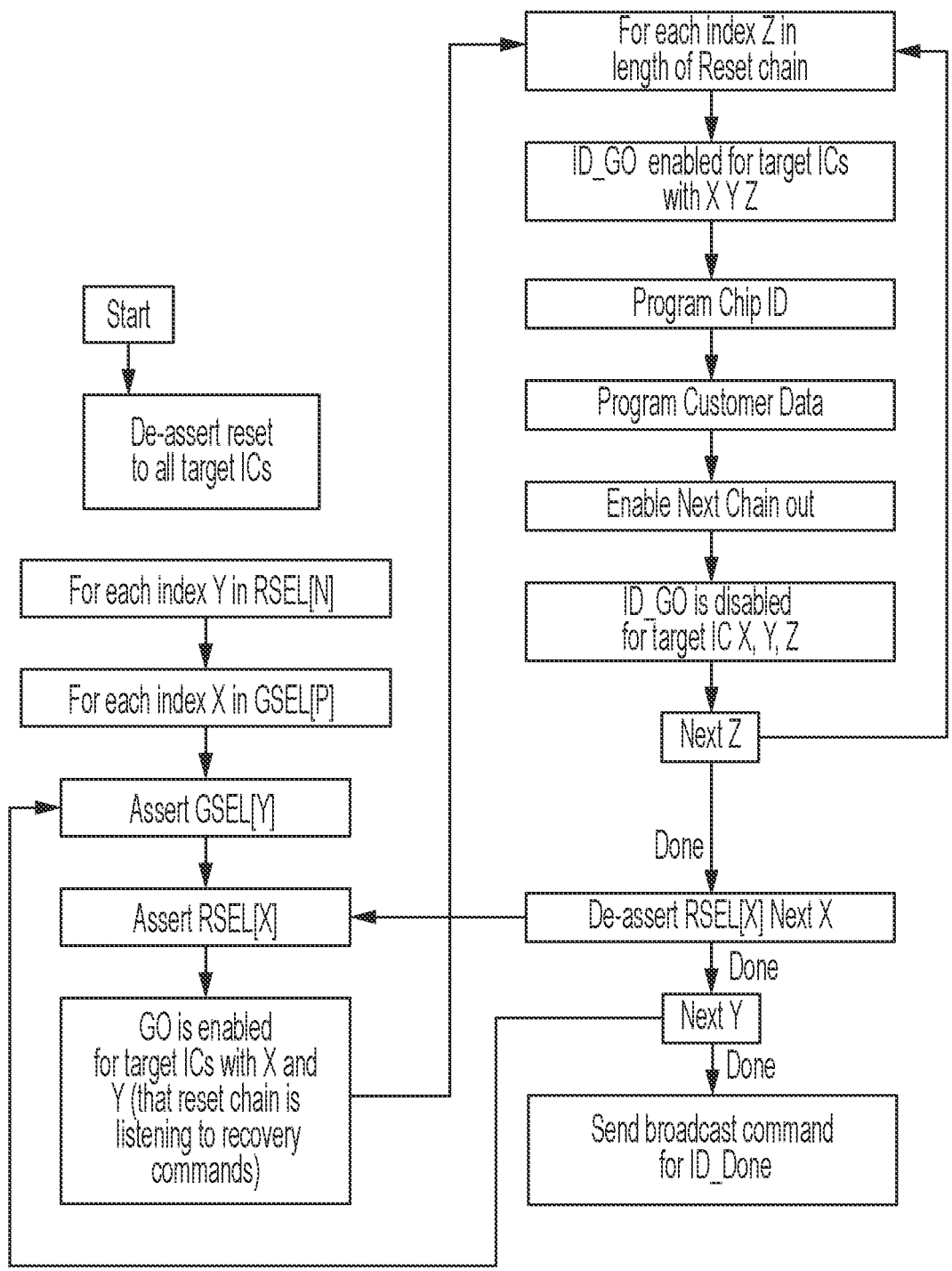

FIG. 21 illustrates example operations performed according to various embodiments of the present disclosure.

Figure 22:
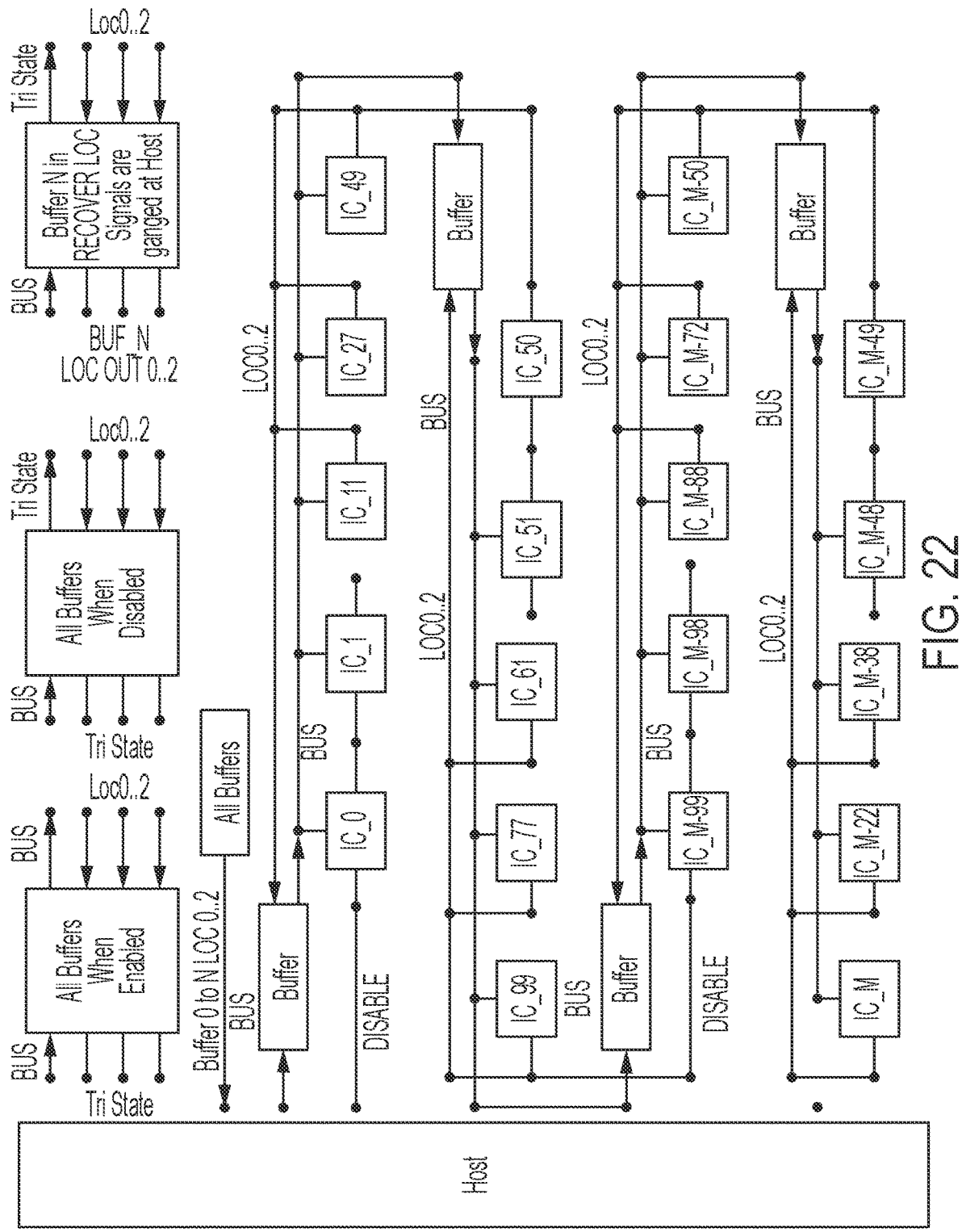

FIG. 22 illustrates an example embodiment of the subject matter described herein sure.

Figure 23:
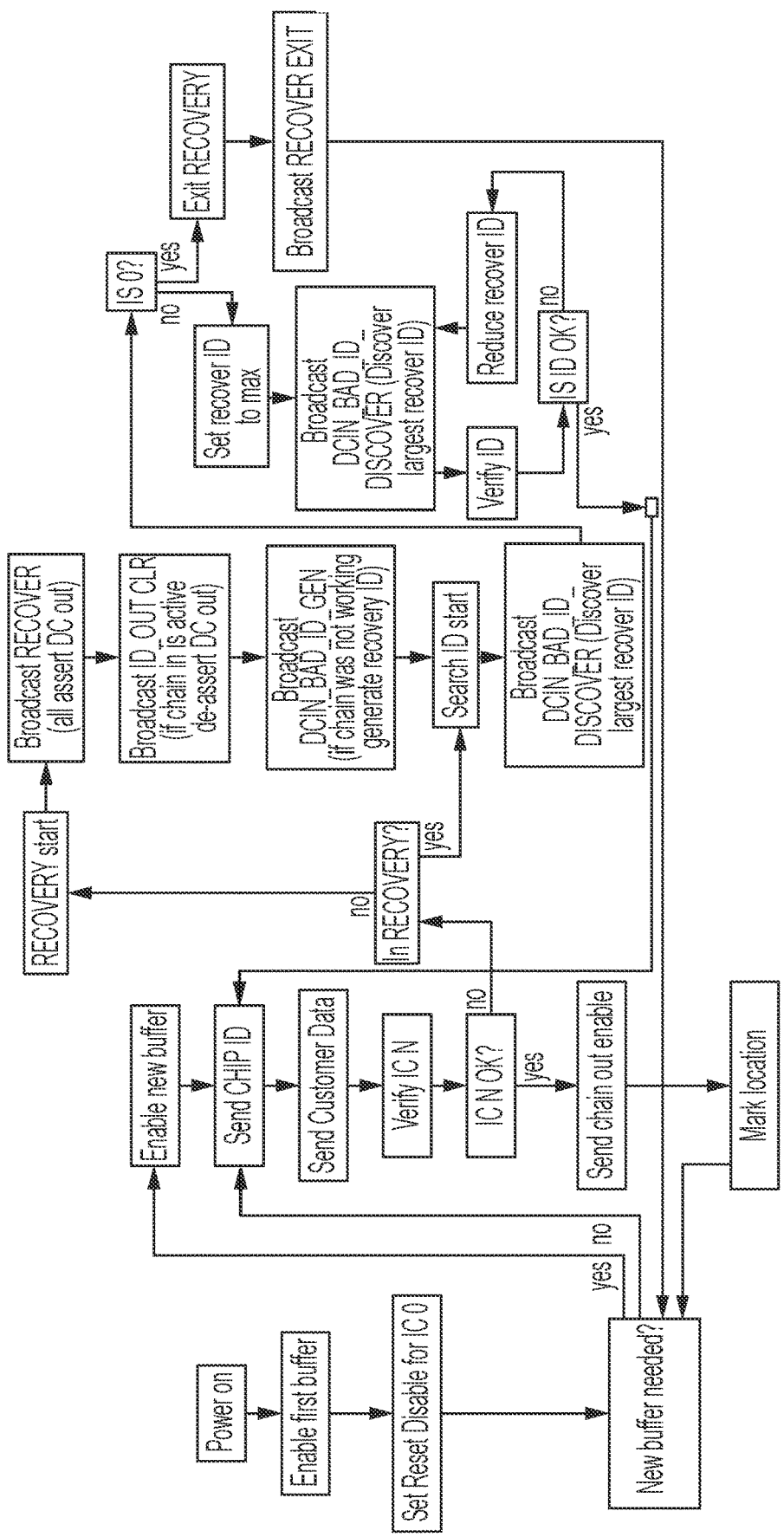

FIG. 23 illustrates example operations performed according to various embodiments of the present disclosure.

Figure 24:
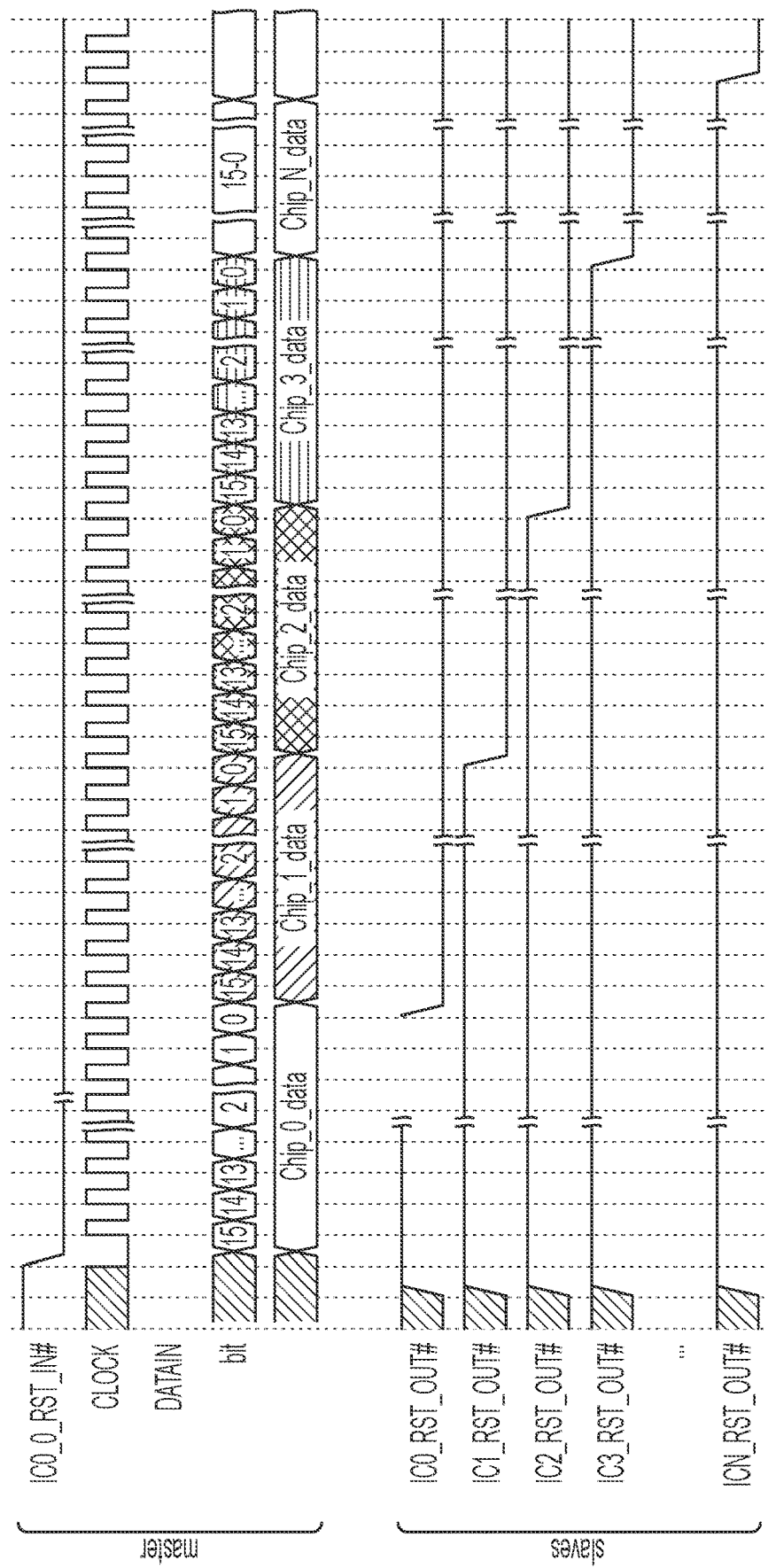

FIG. 24 illustrates an example timing diagram for an example embodiment of the subject matter described herein.

Figure 25:
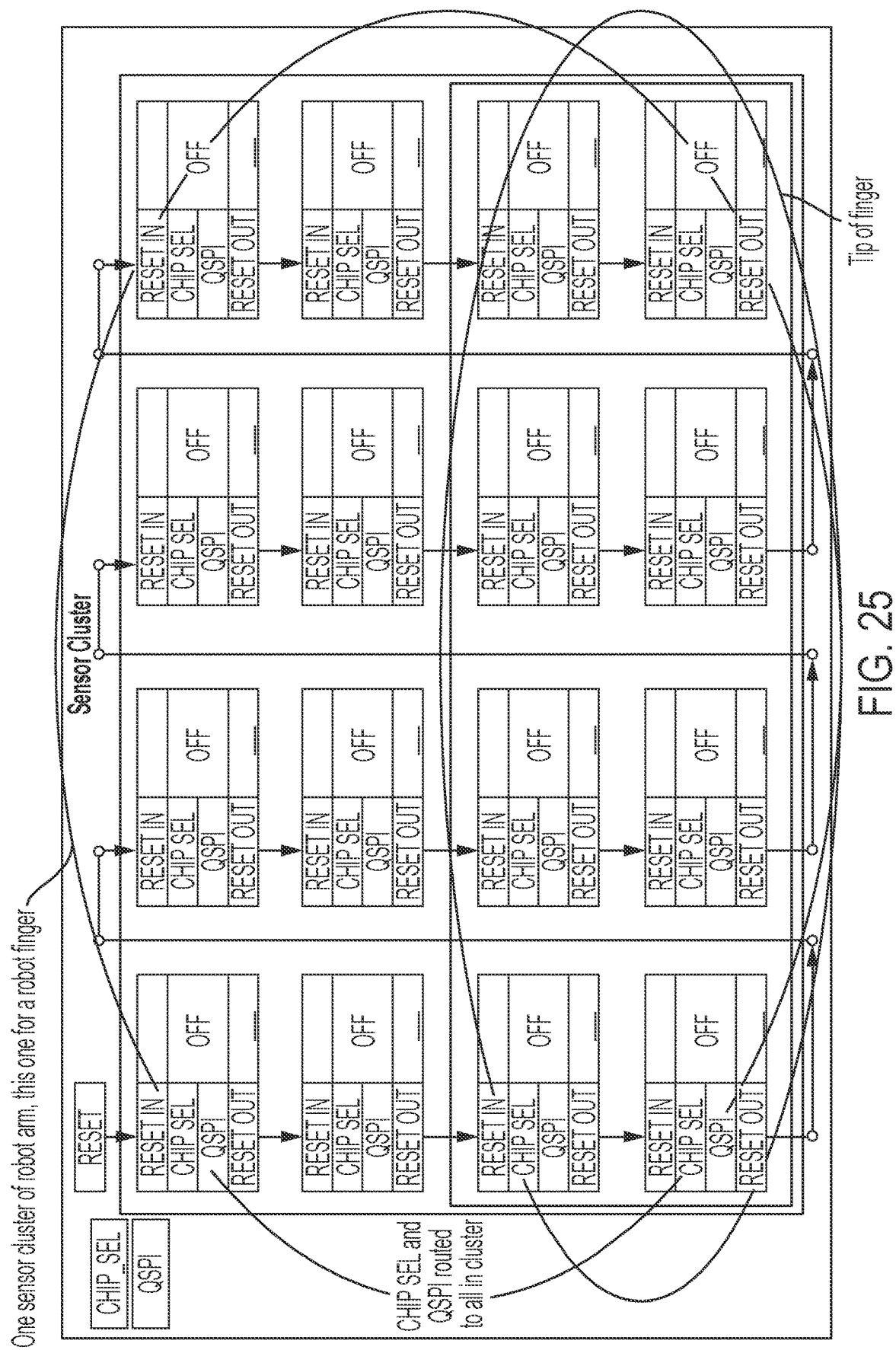

FIG. 25 illustrates an example embodiment of the subject matter described herein.

Figure 26:
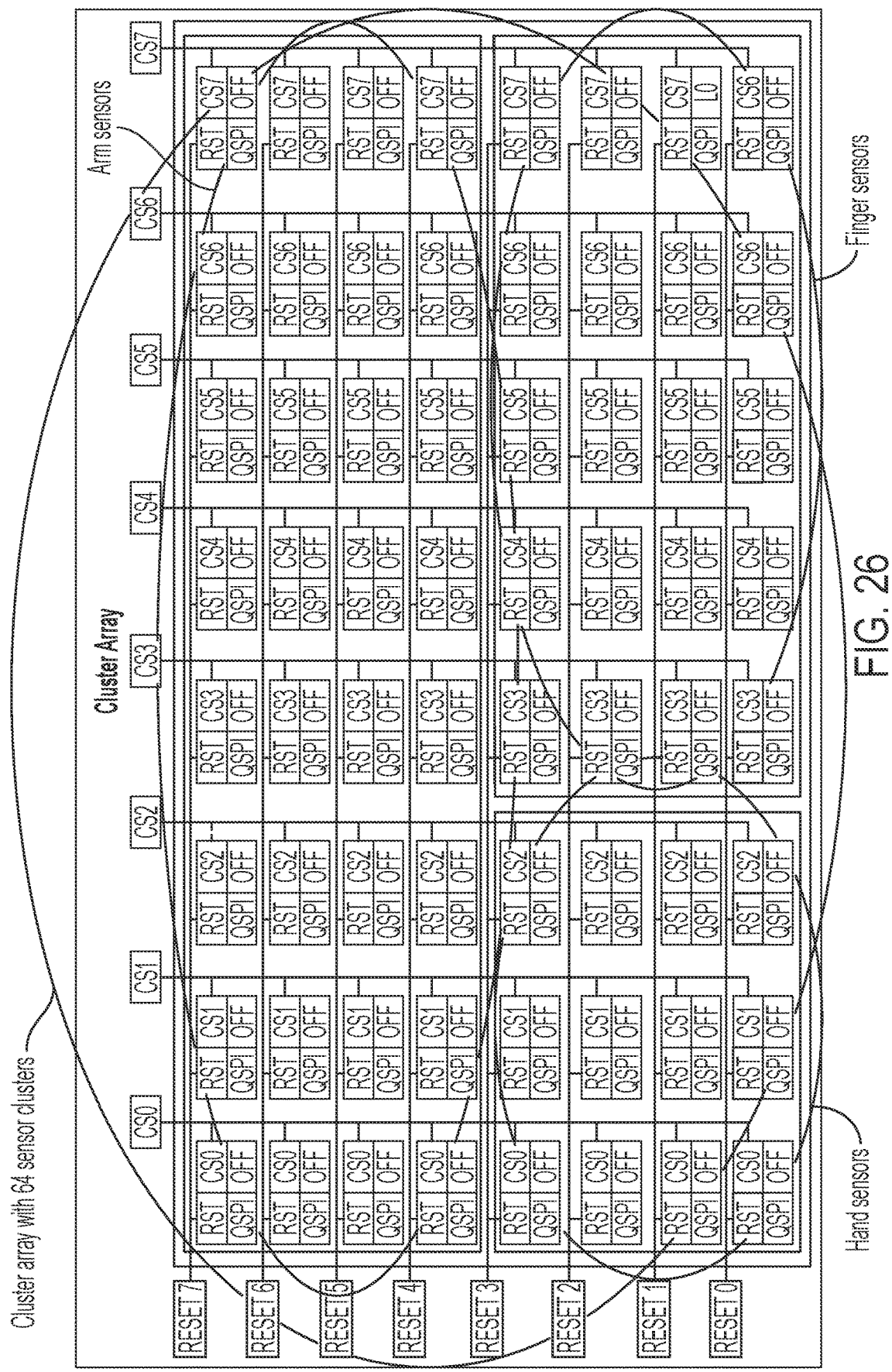

FIG. 26 illustrates an example cluster array for use with various embodiments of the present disclosure.

Figure 27:
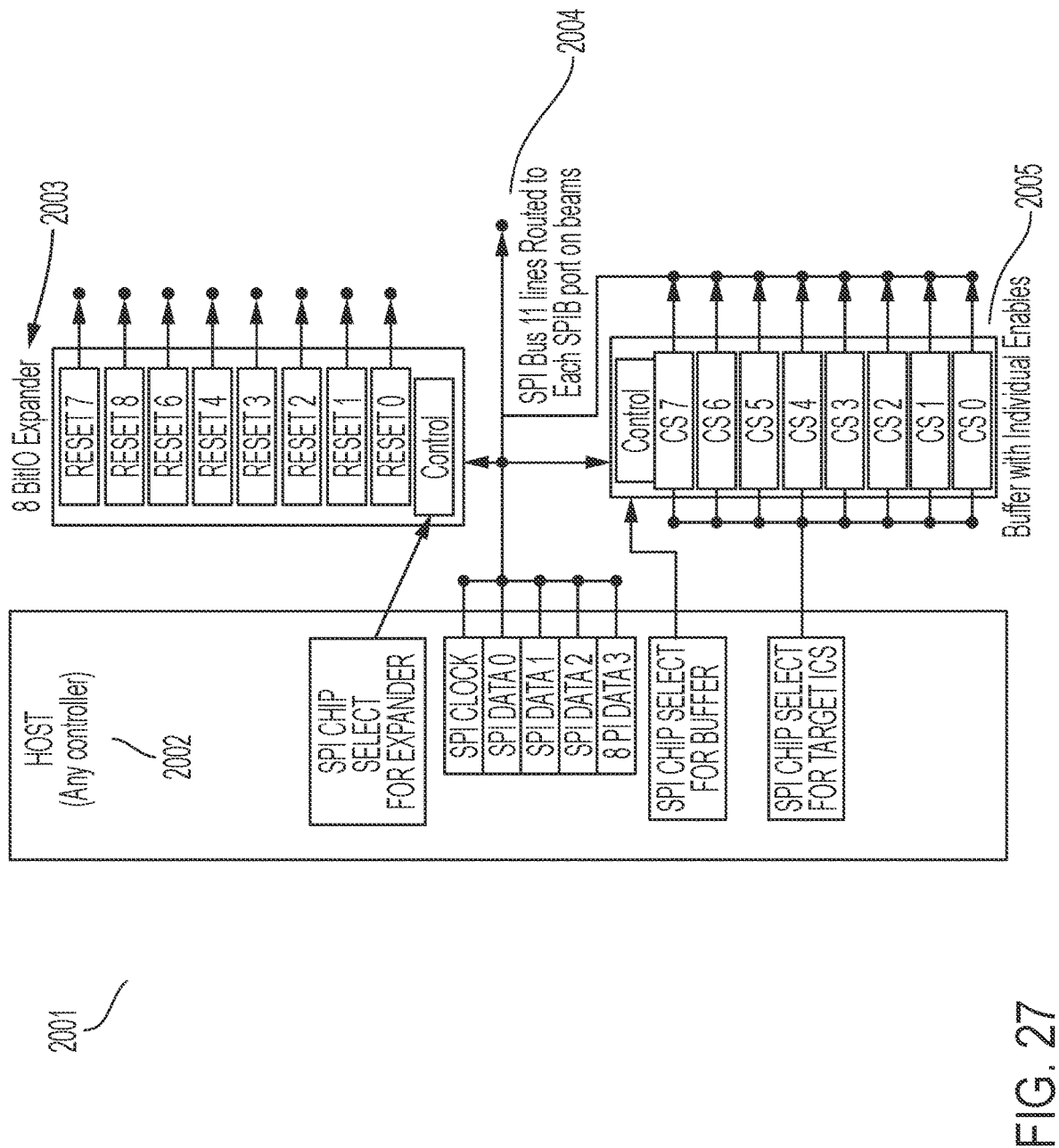

FIG. 27 illustrates an example embodiment of the subject matter described herein.

Figure 28A:
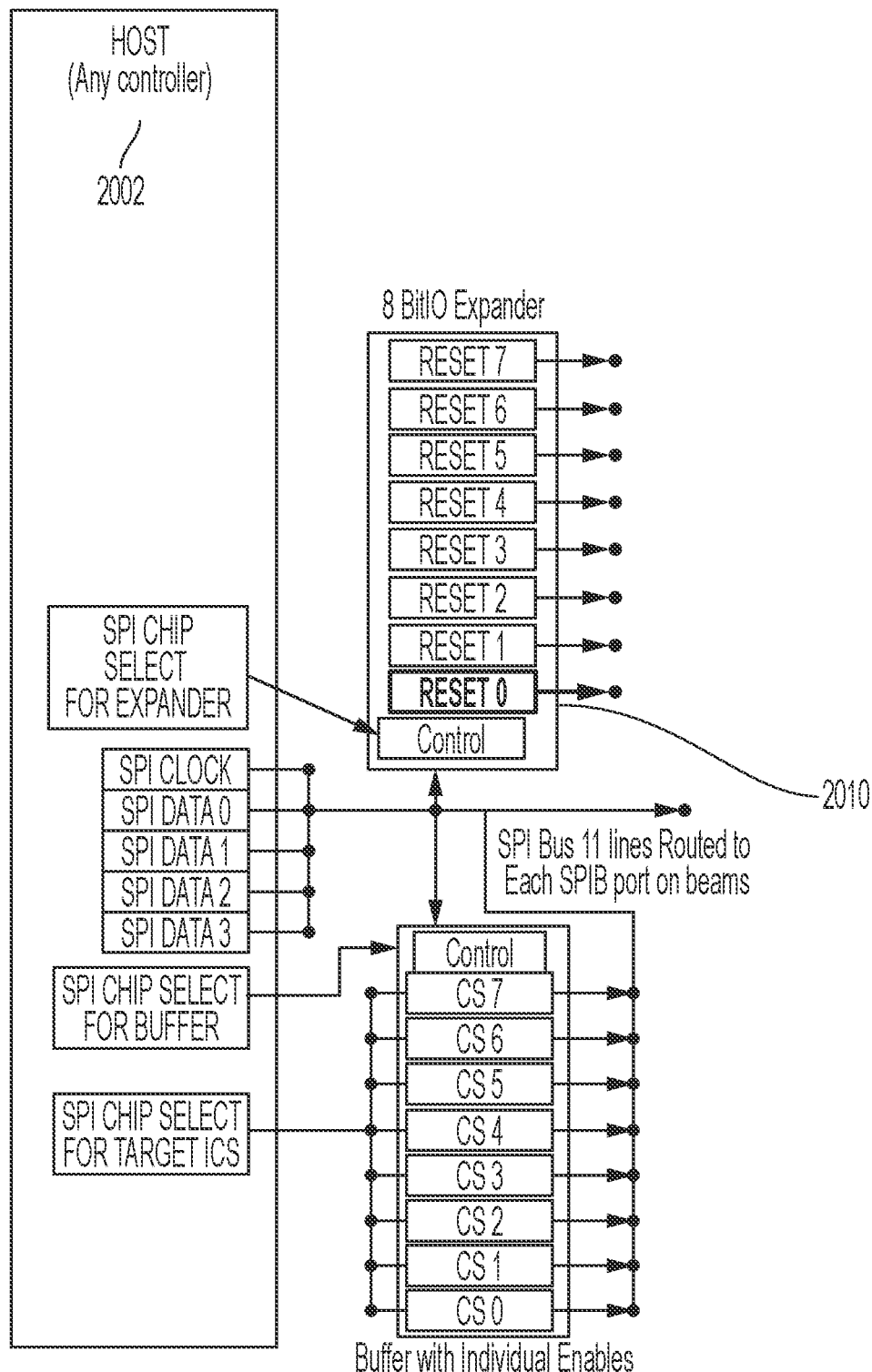
Figure 28C:
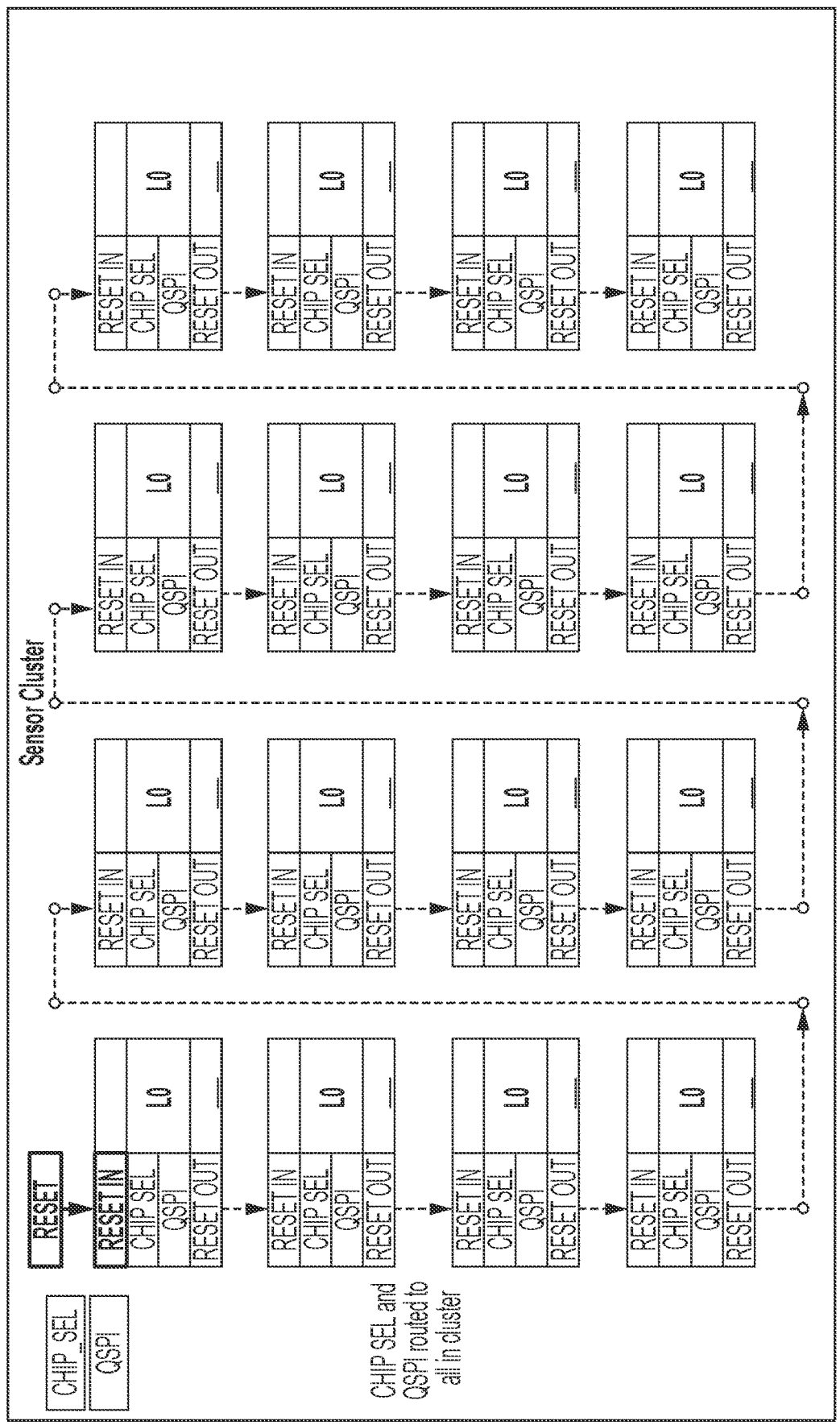

FIGS. 28A, 28B, and 28C illustrate example operations performed according to various embodiments of the present disclosure.

Figure 29A:
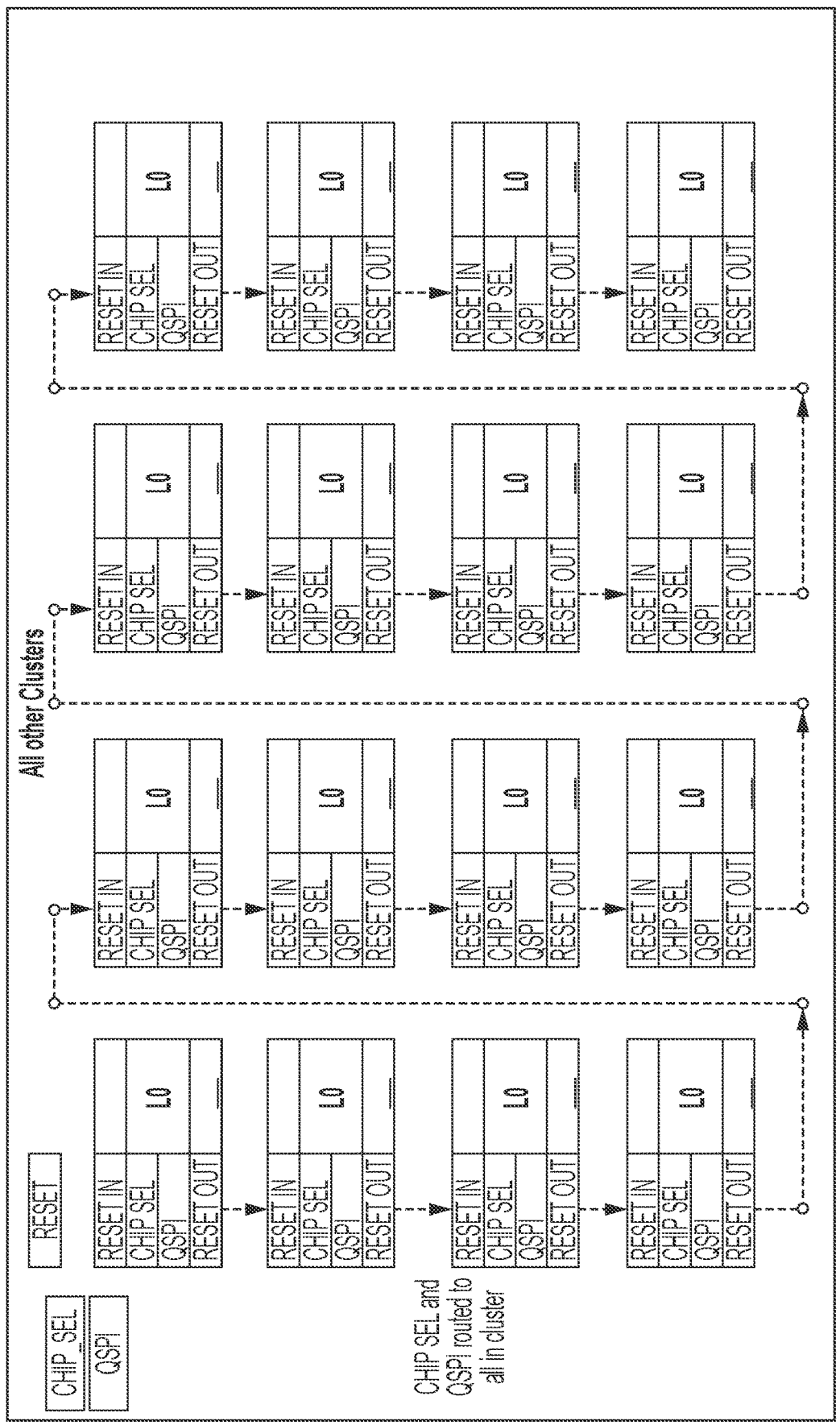
Figure 29B:
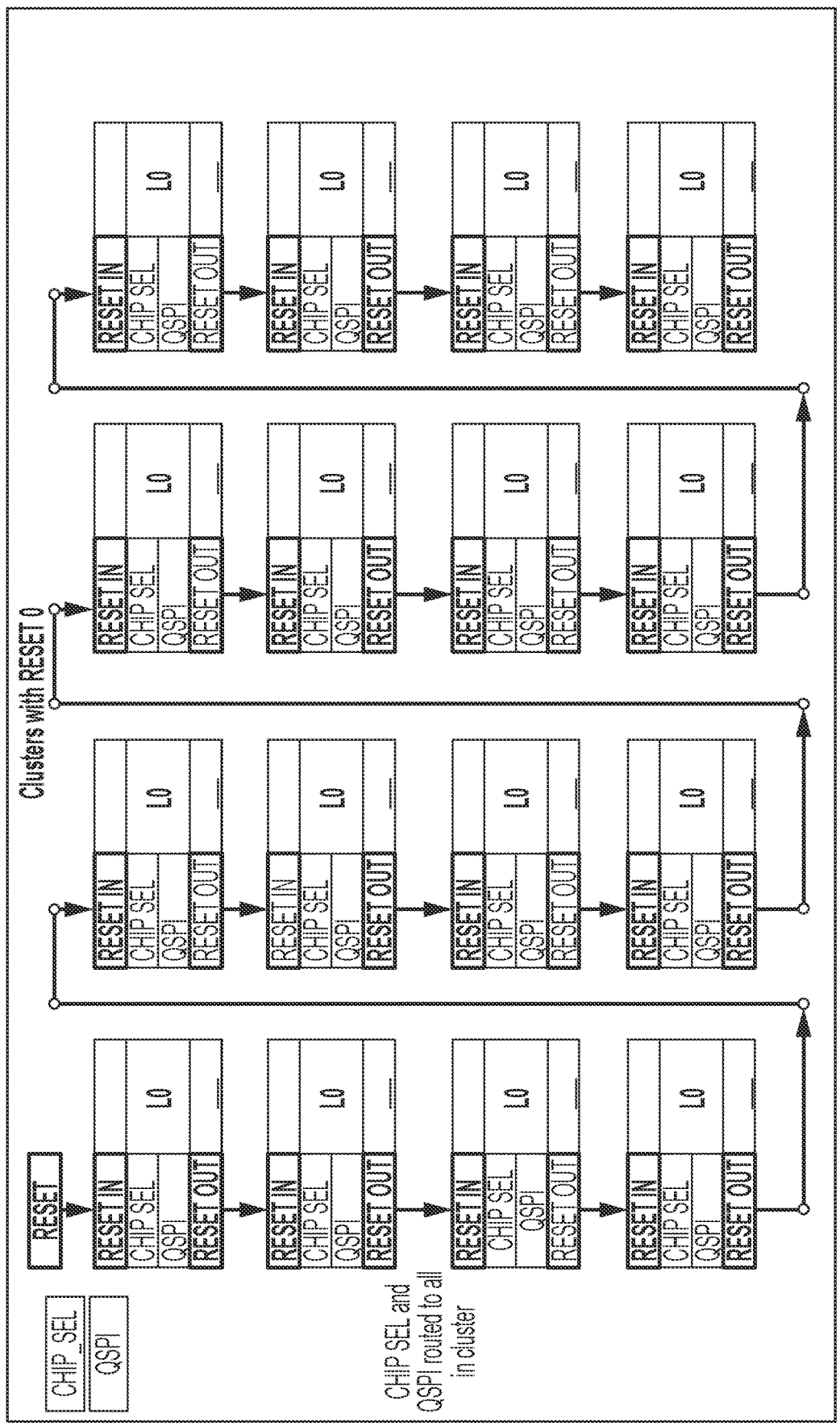

FIGS. 29A and 29B illustrate example operations performed according to various embodiments of the present disclosure.

Figure 30A:
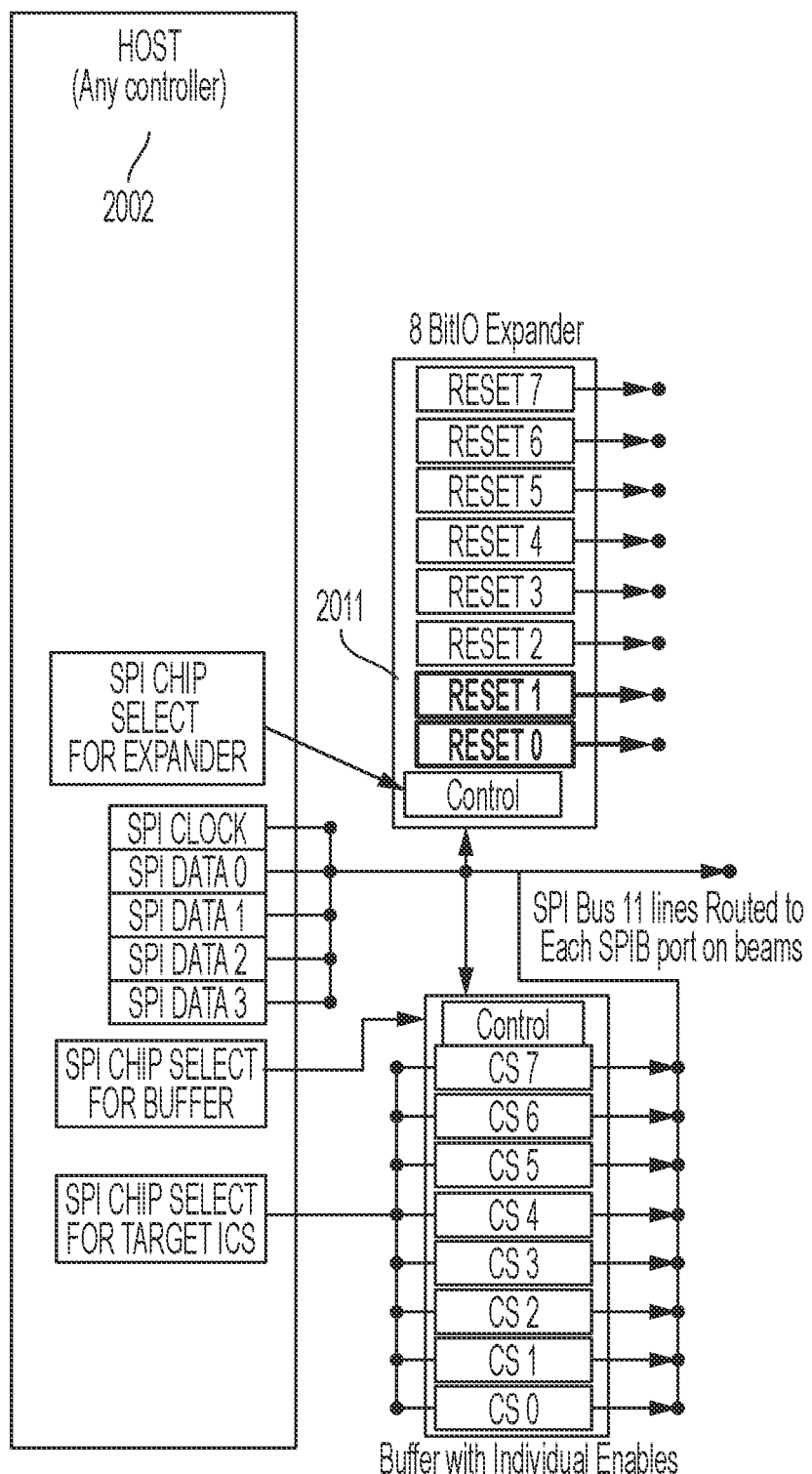
Figure 30B:
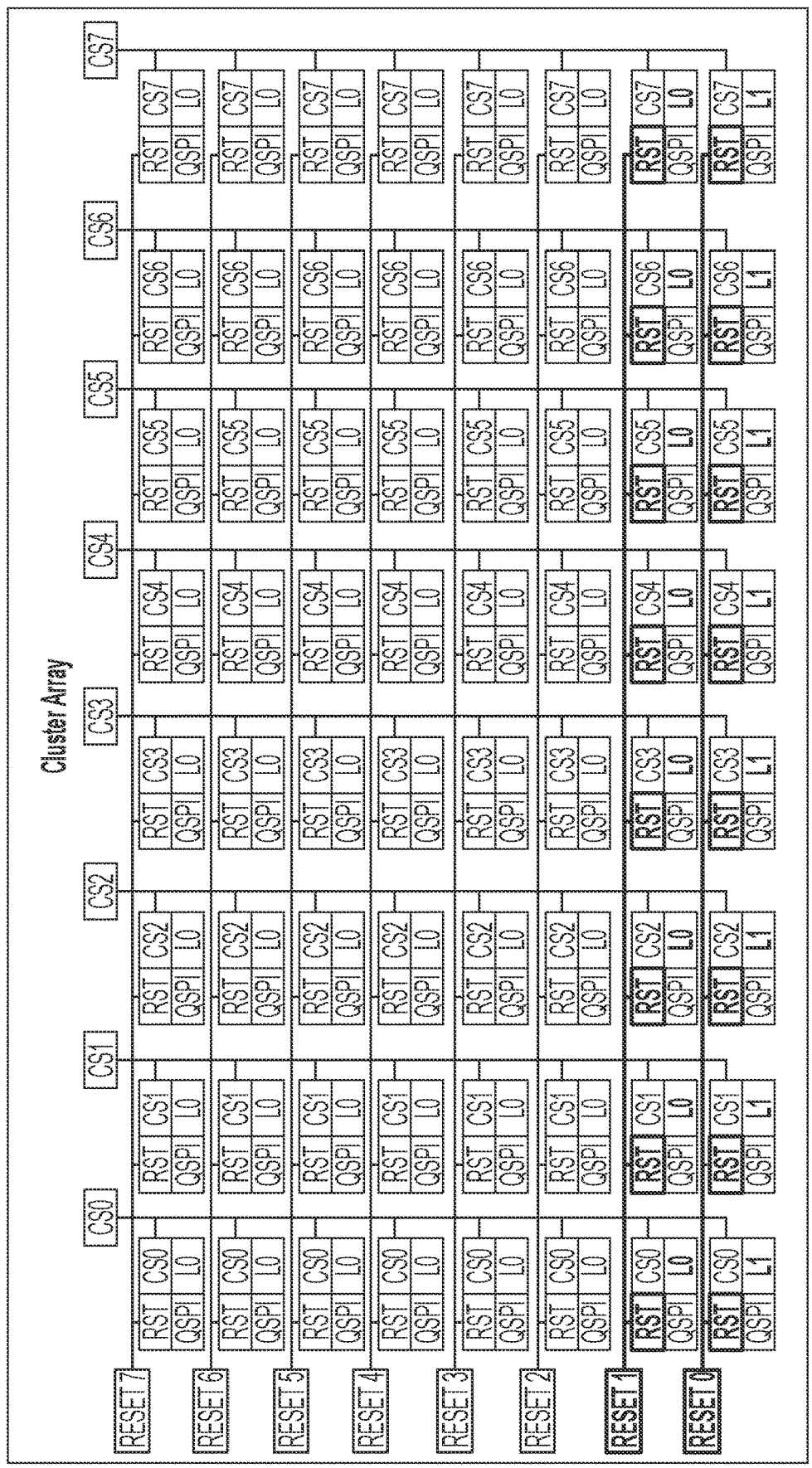
Figure 30C:
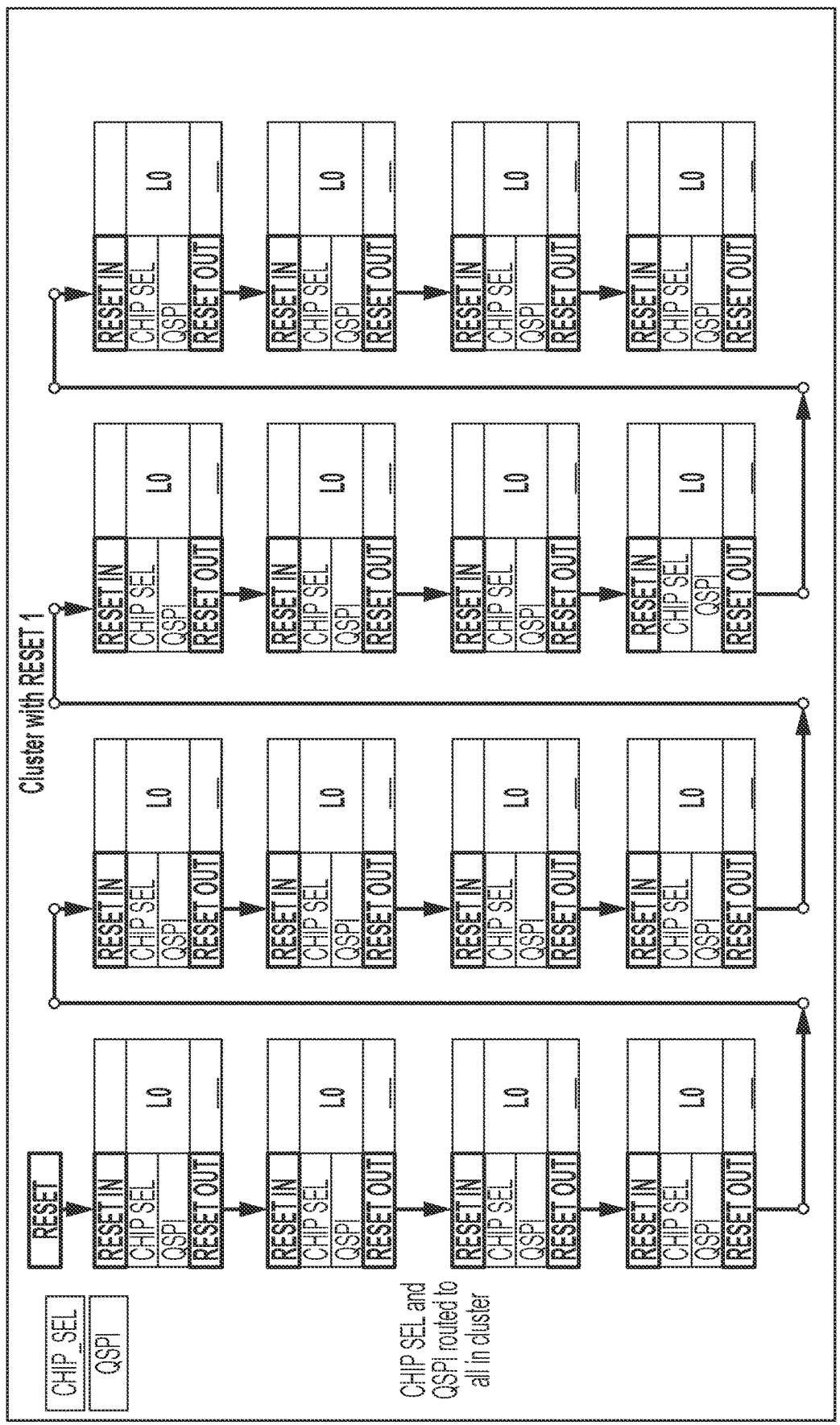

FIGS. 30A, 30B, and 30C illustrate example operations performed according to various embodiments of the present disclosure.

Figure 31A:
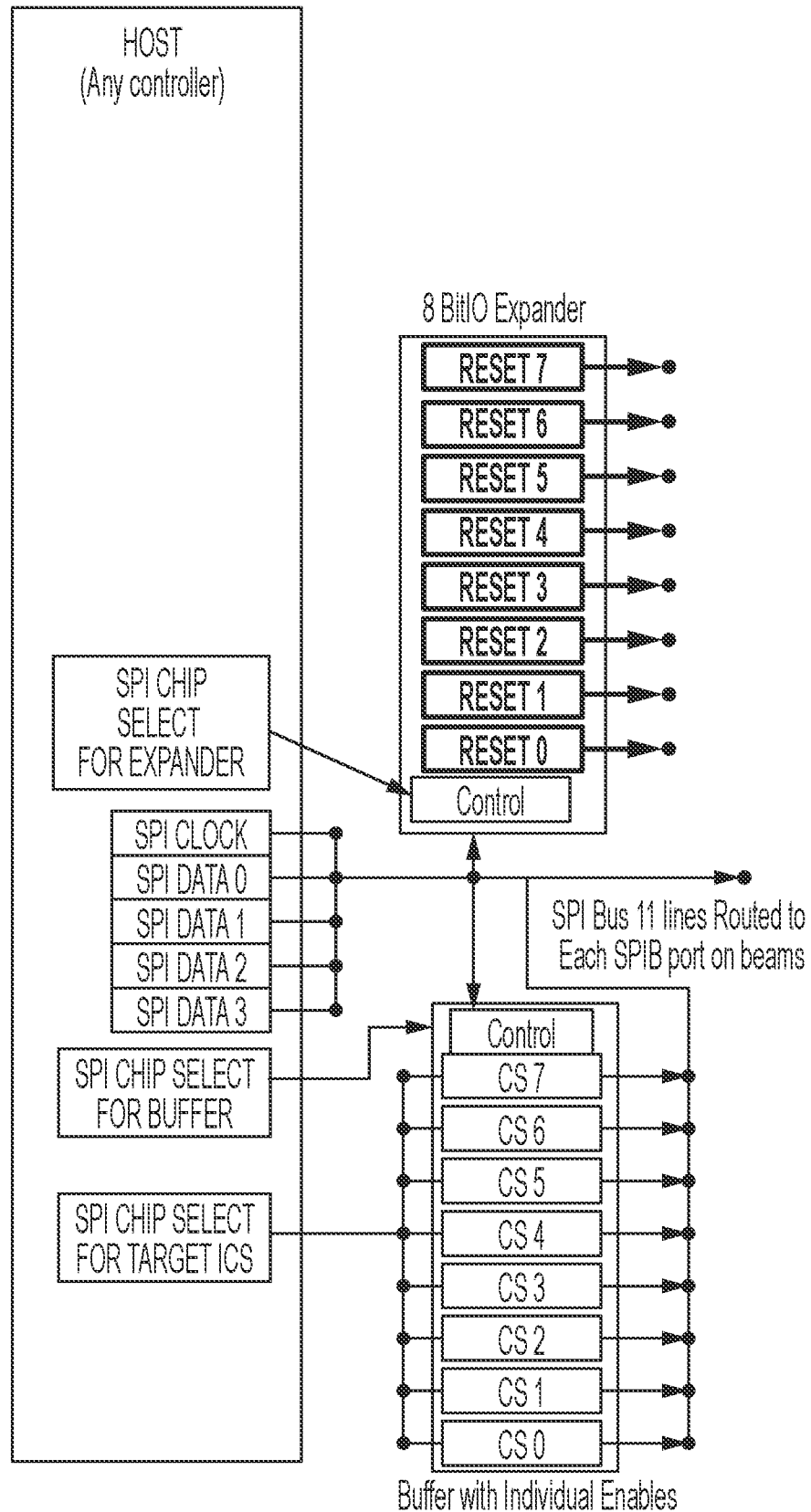
Figure 31B:
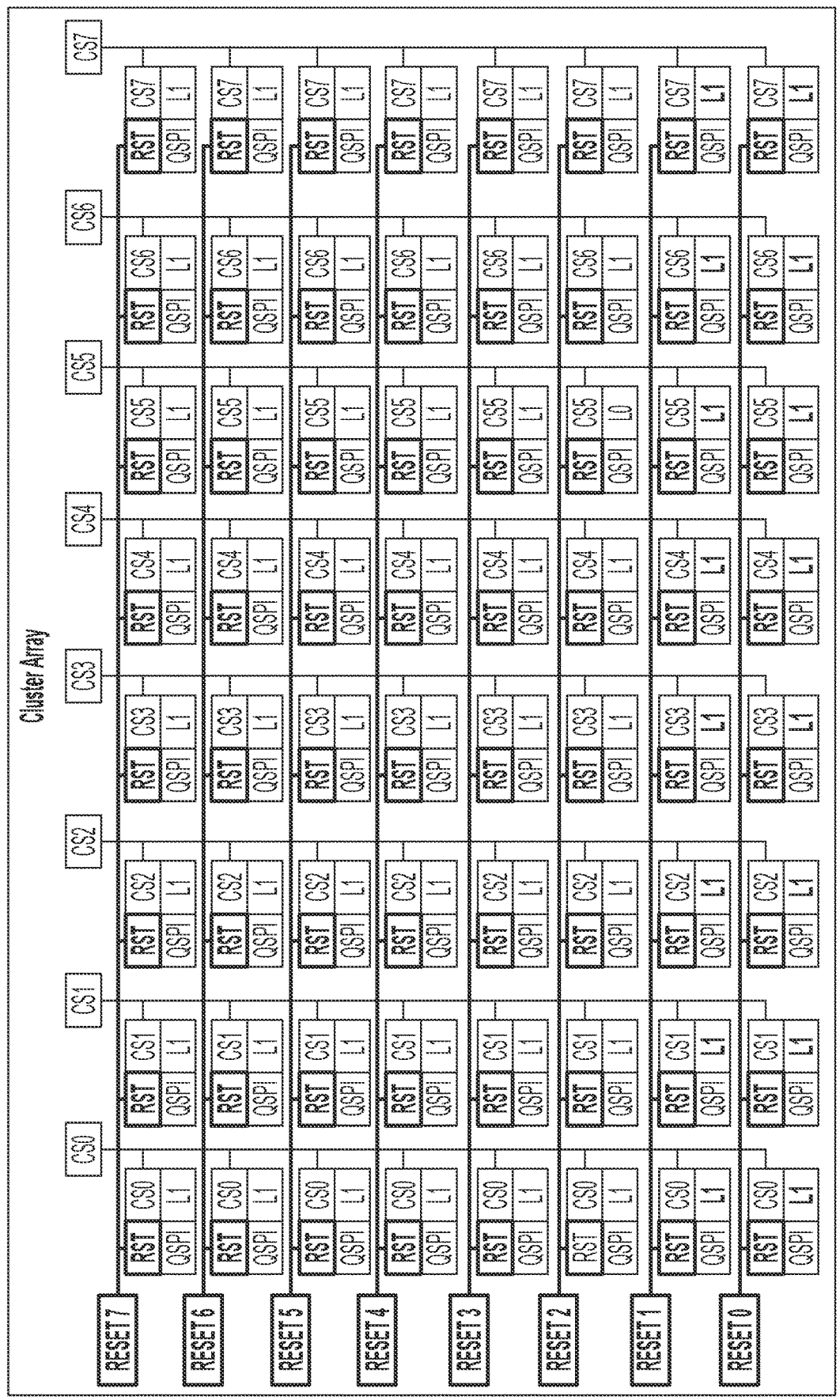
Figure 31C:
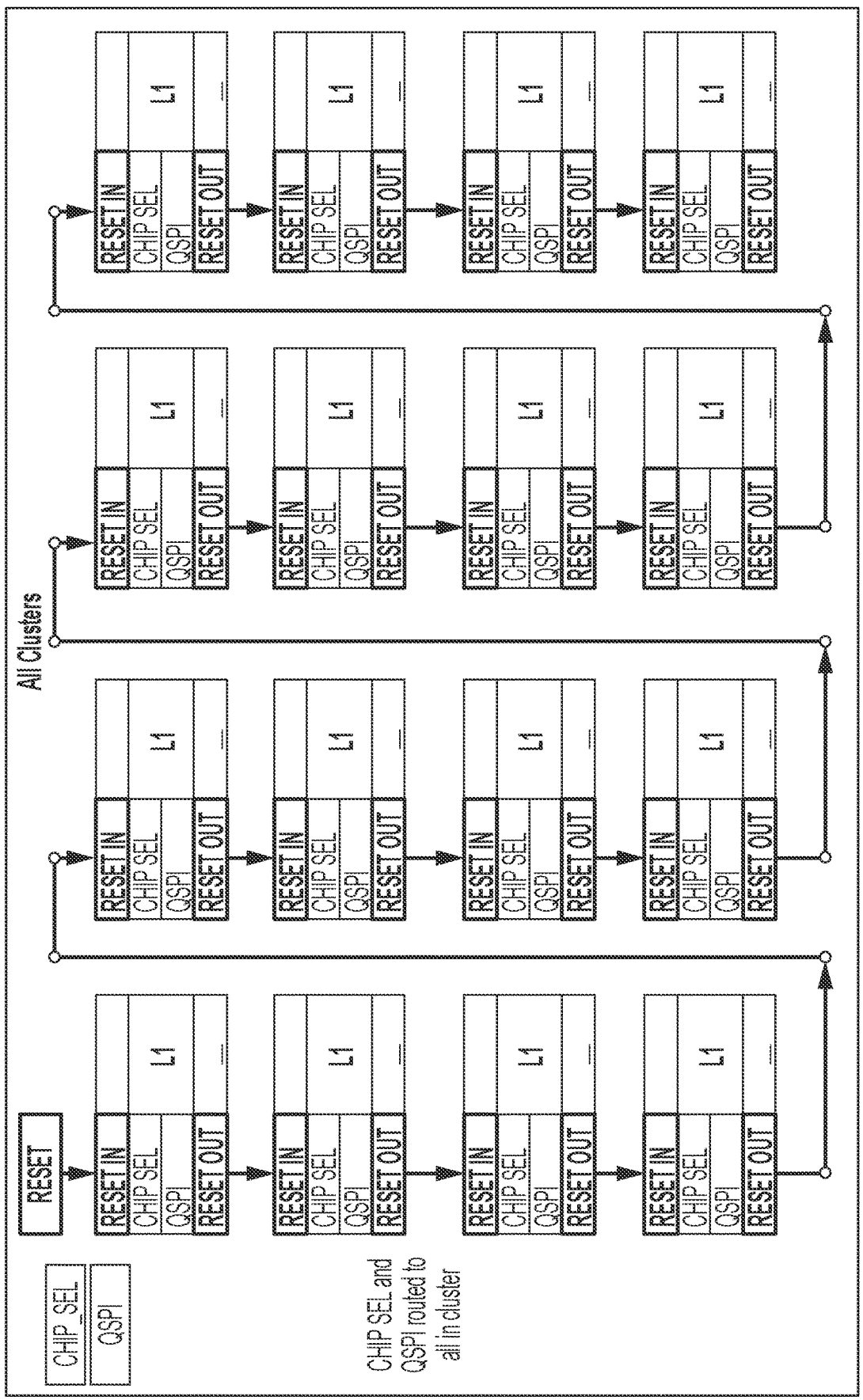

FIGS. 31A, 31B, and 31C illustrate example operations performed according to various embodiments of the present disclosure.

Figure 32A:
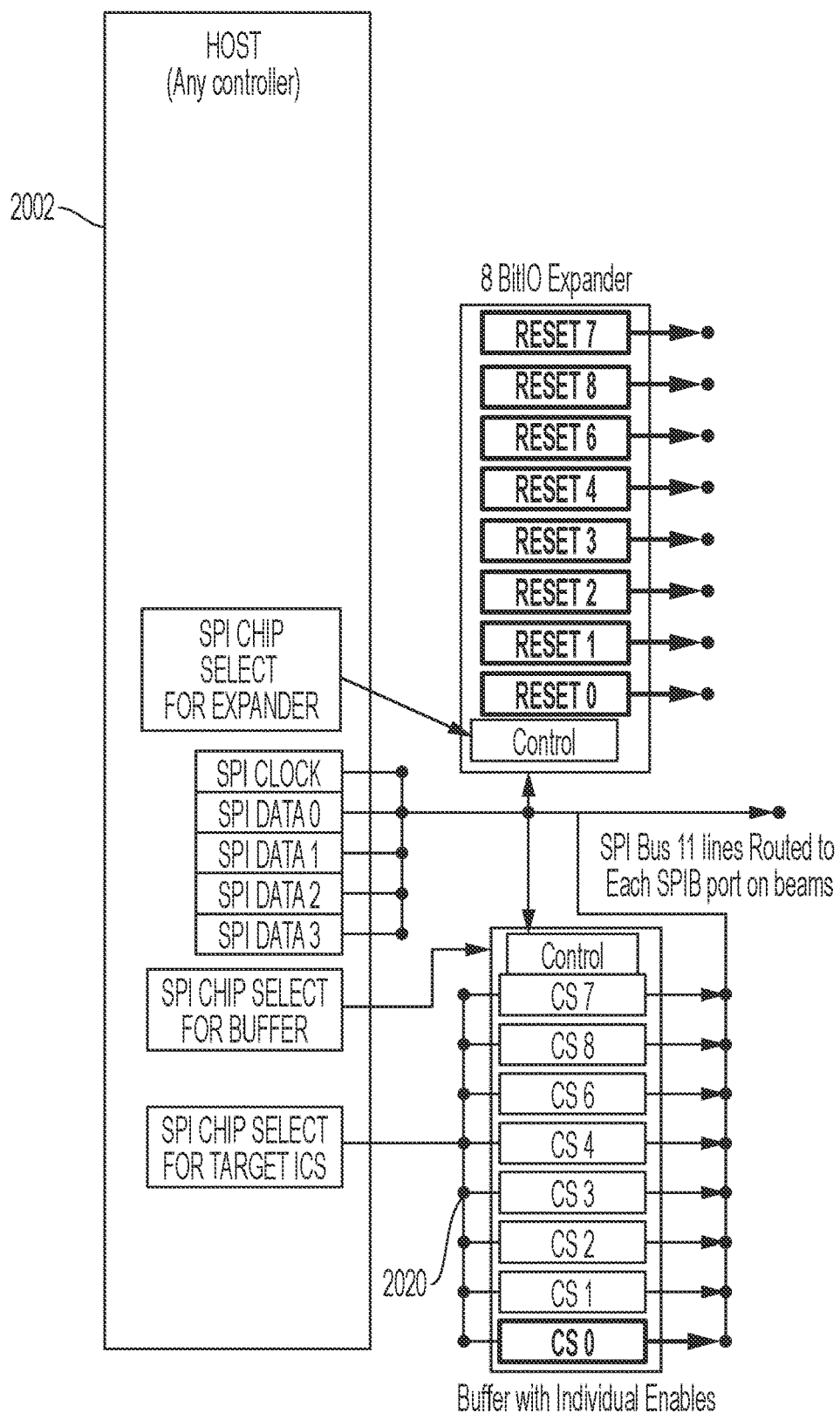
Figure 32B:
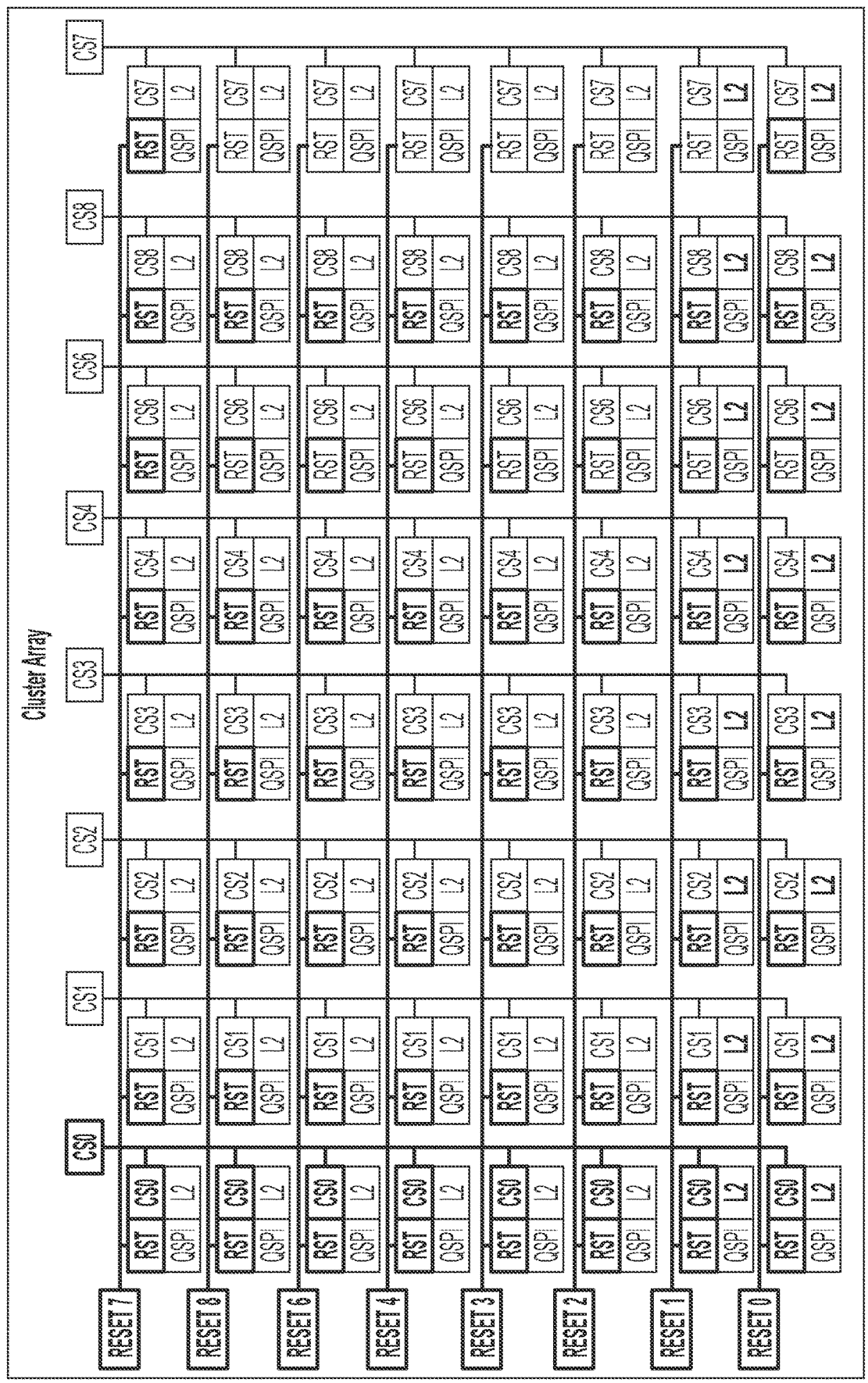
Figure 32C:
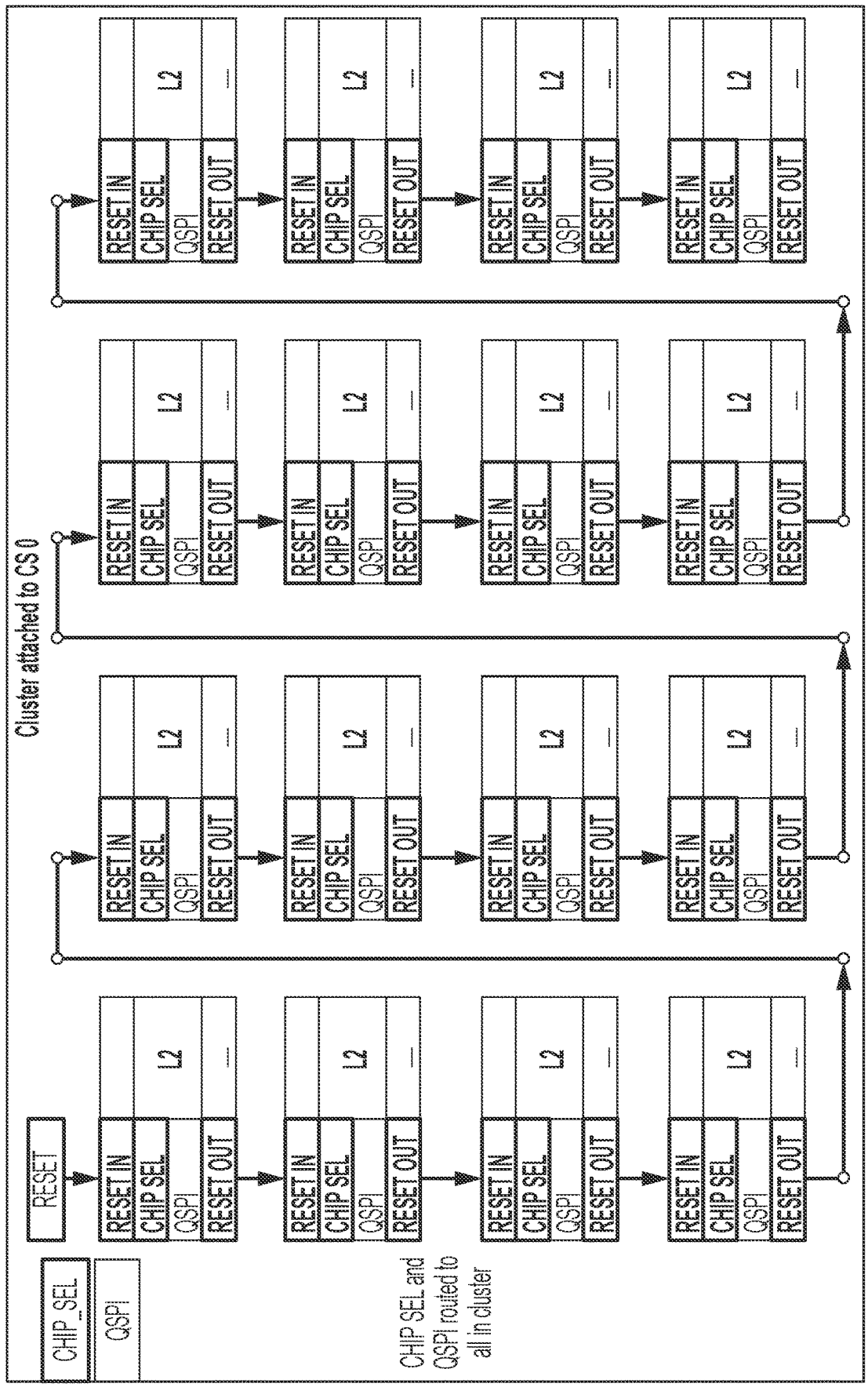

FIGS. 32A, 32B, and 32C illustrate example operations performed according to various embodiments of the present disclosure.

Figure 33A:
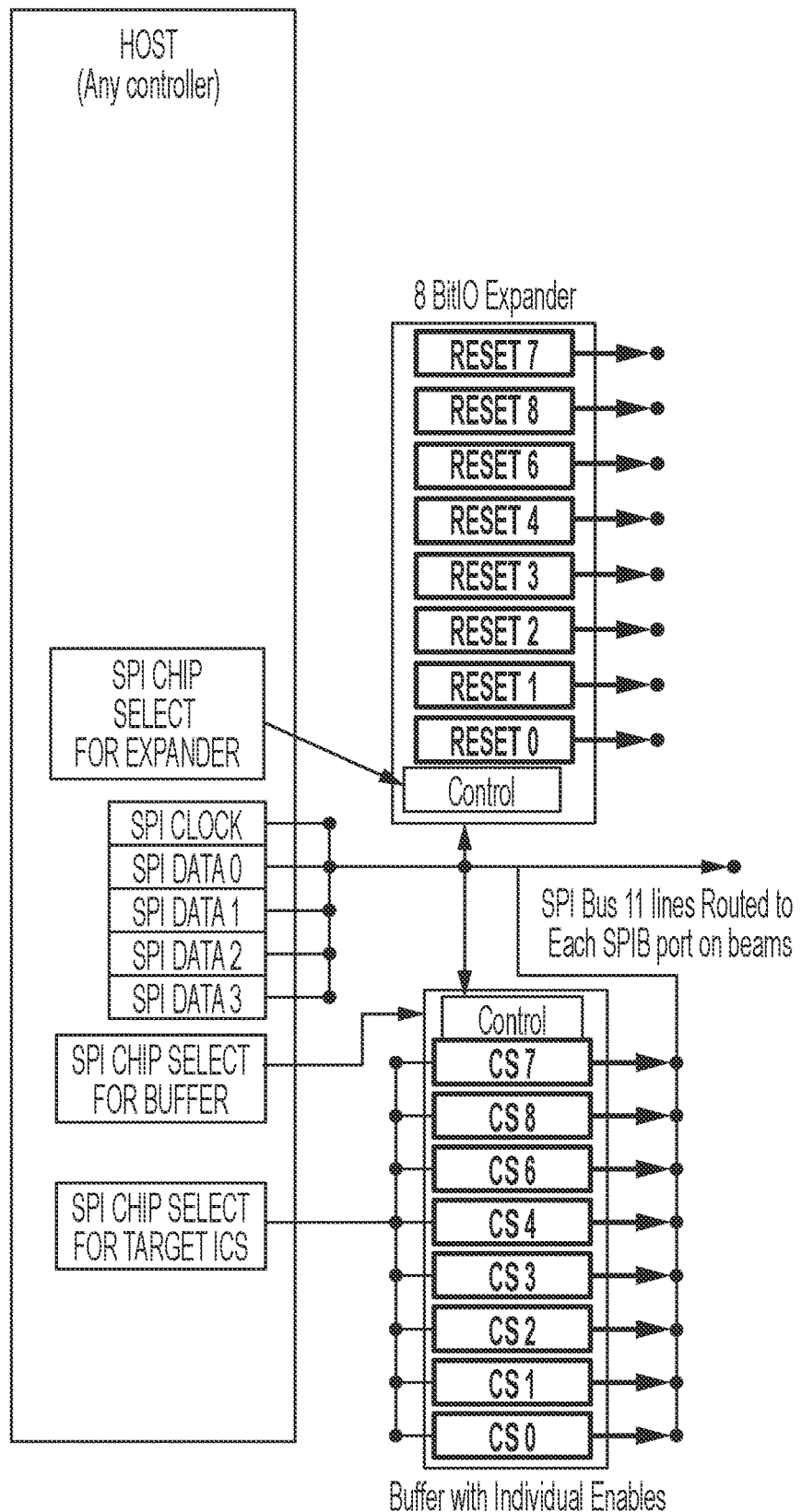
Figure 33B:
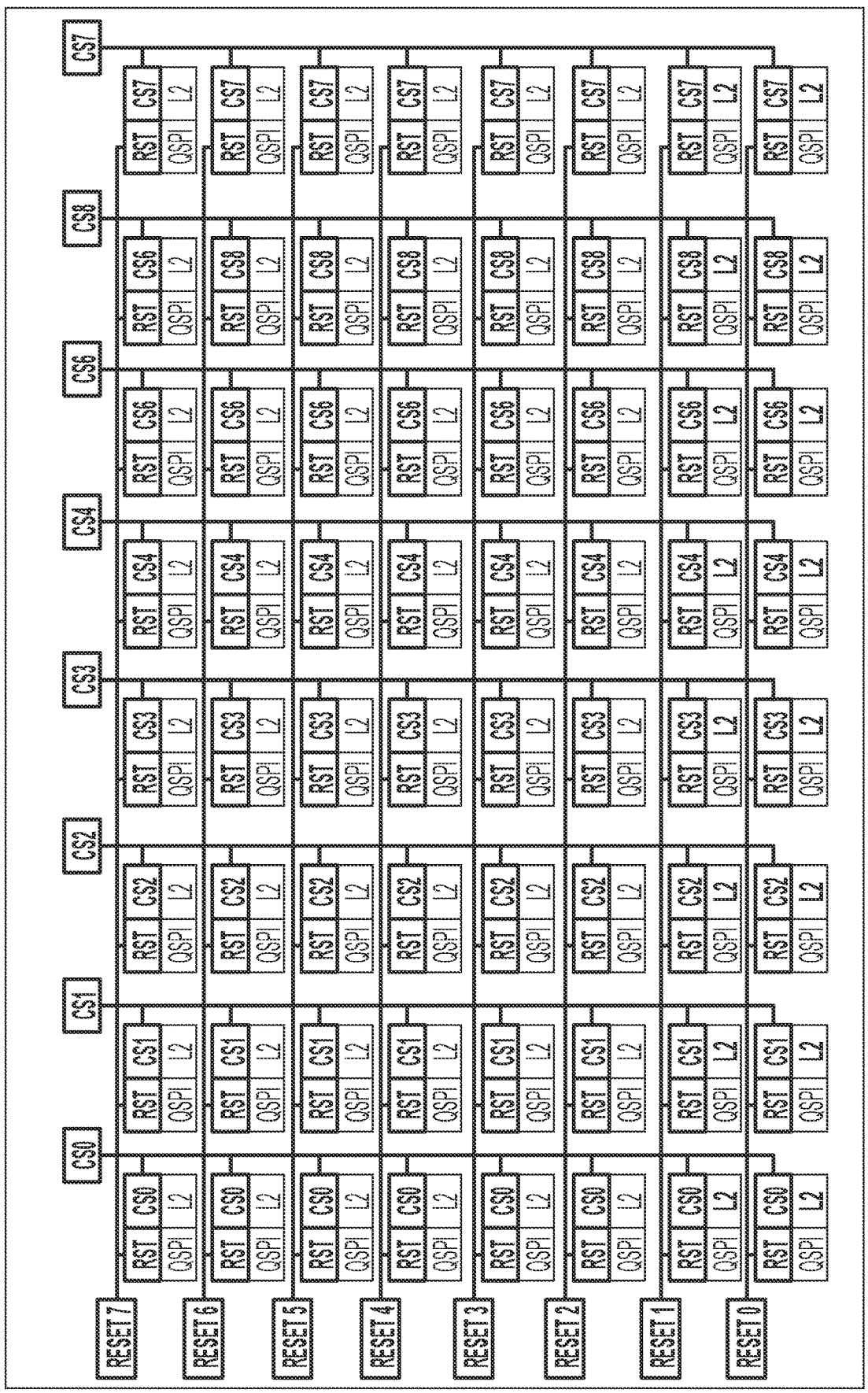
Figure 33C:
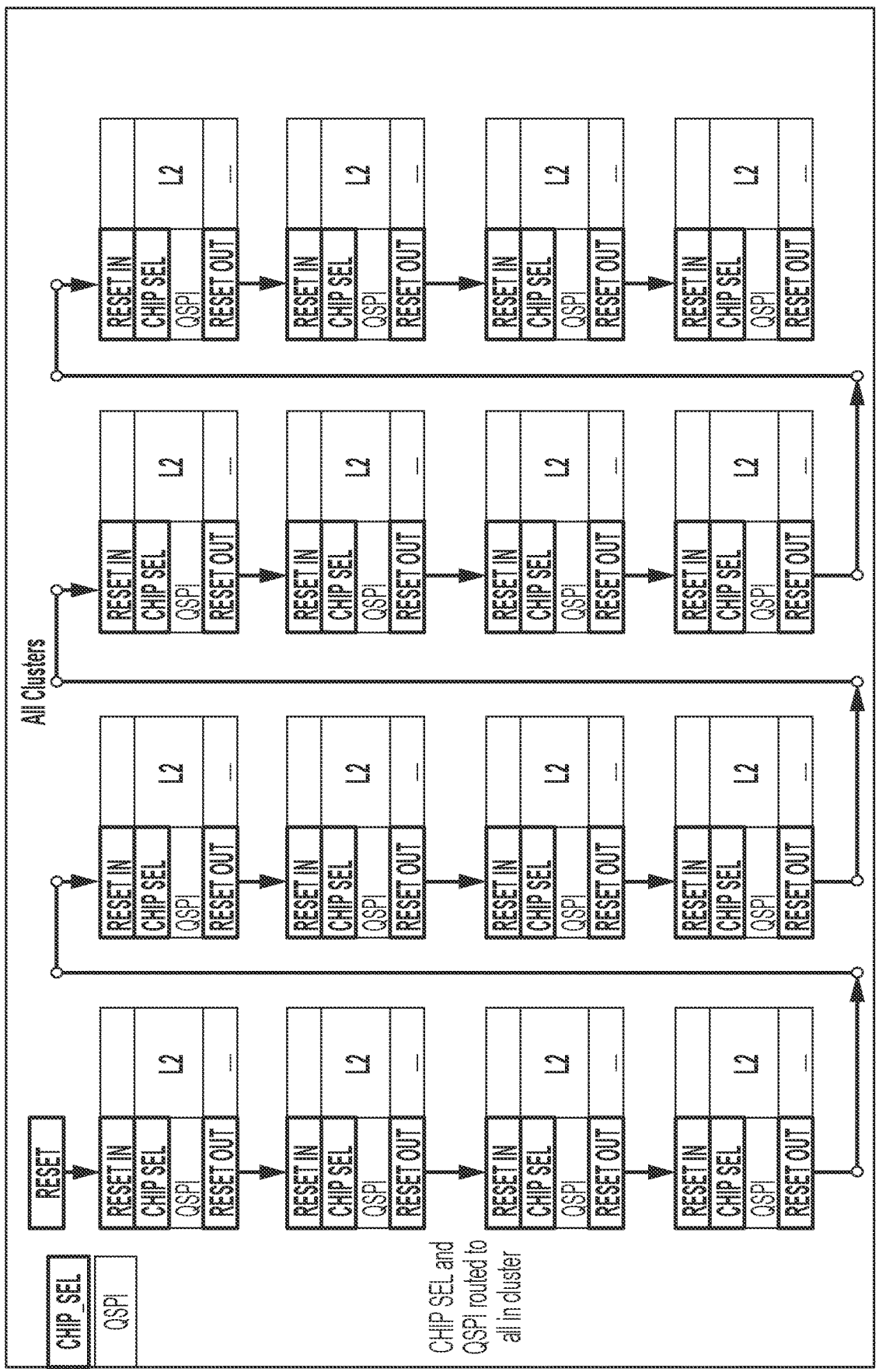

FIGS. 33A, 33B, and 33C illustrate example operations performed according to various embodiments of the present disclosure.

Figure 34A:
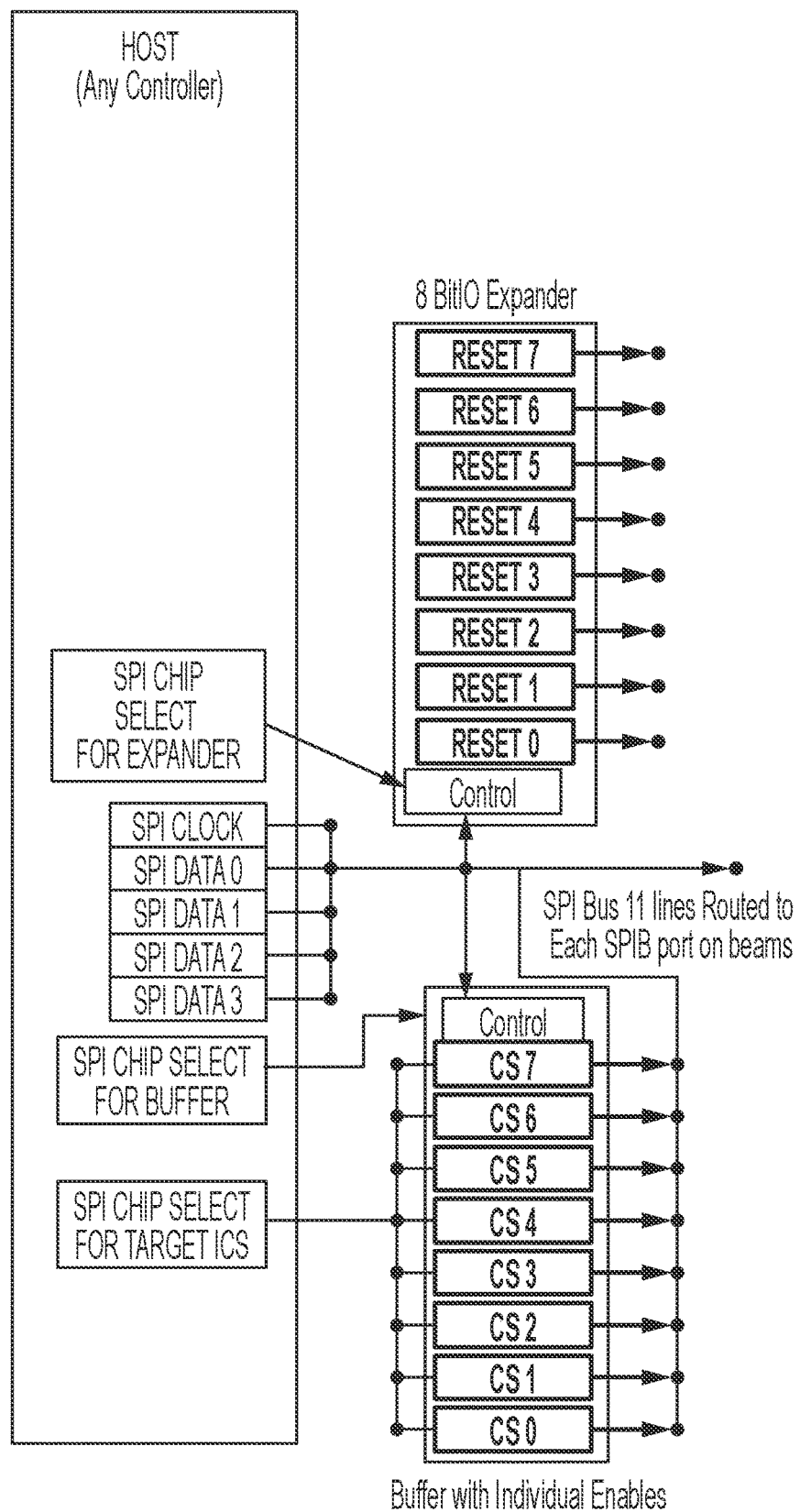
Figure 34B:
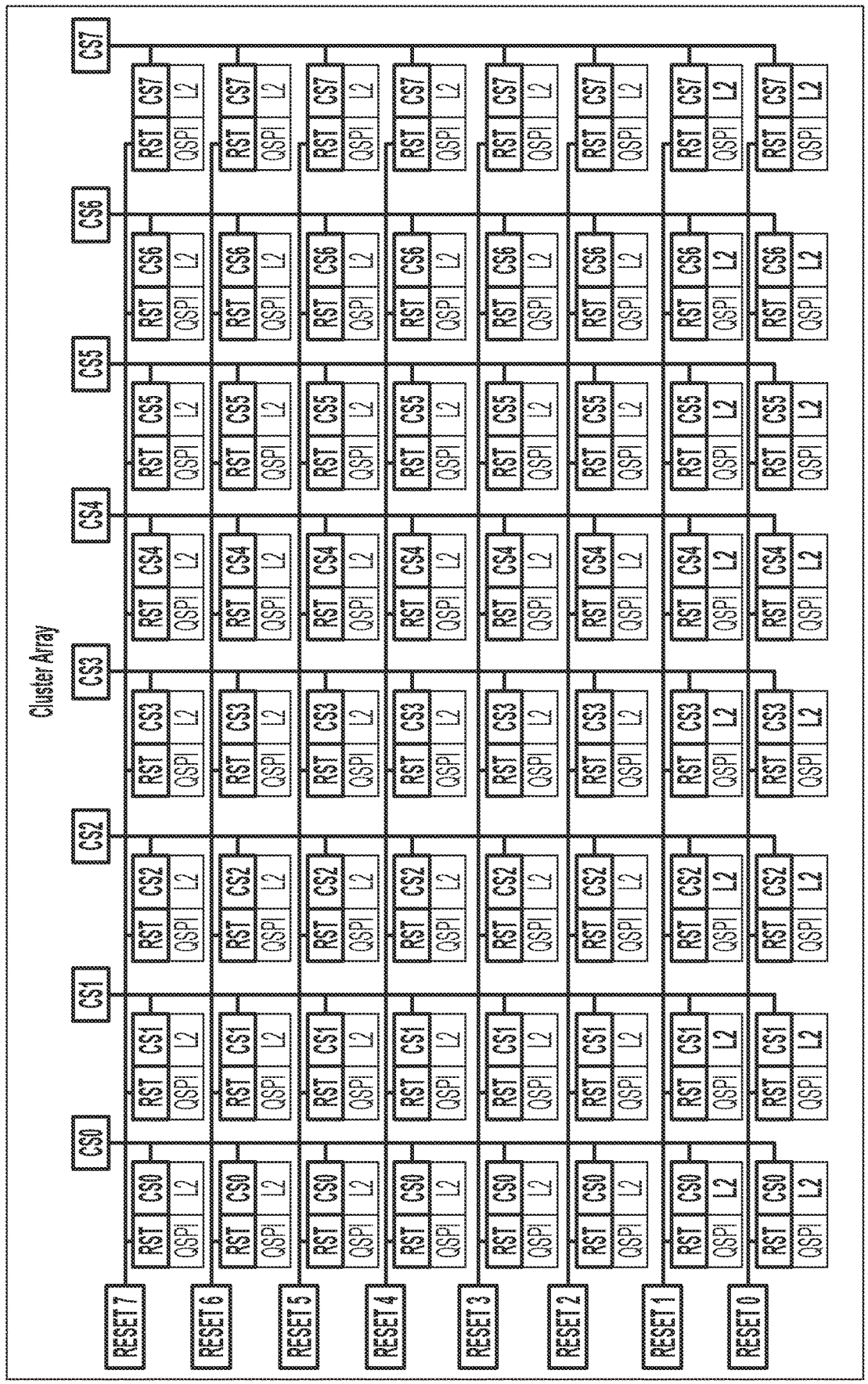
Figure 34C:
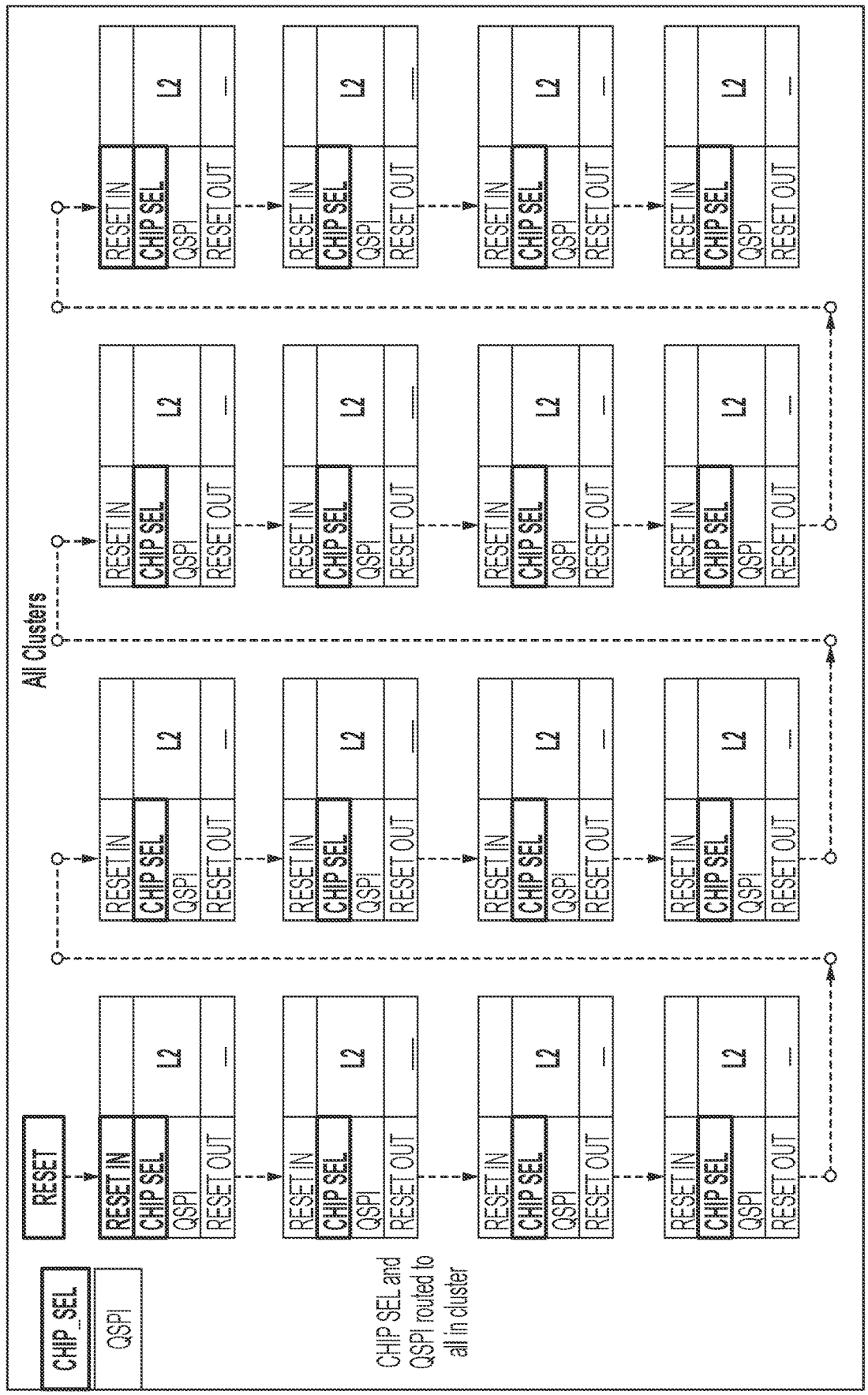

FIGS. 34A, 34B, and 34C illustrate example operations performed according to various embodiments of the present disclosure.

Figure 35A:
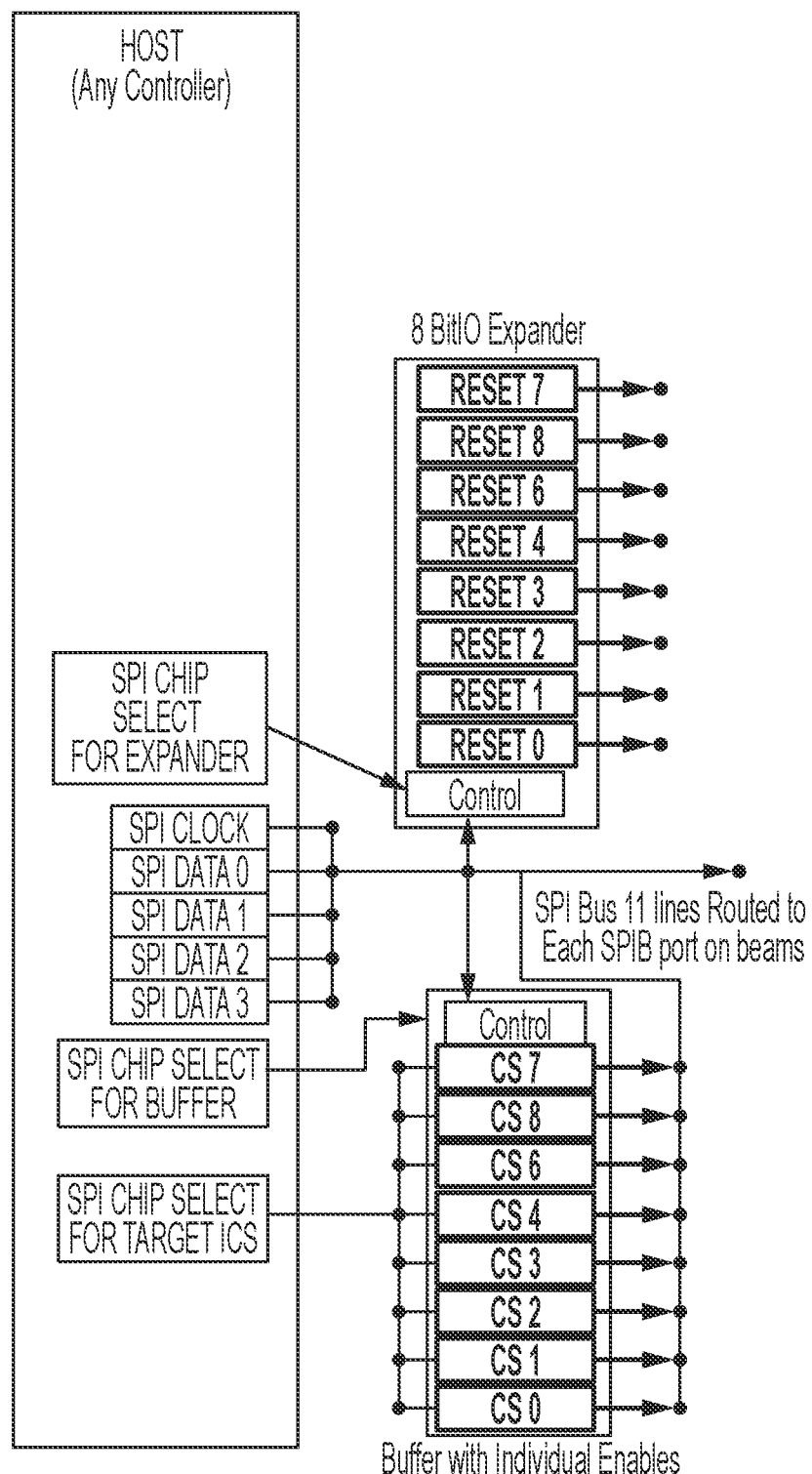
Figure 35B:
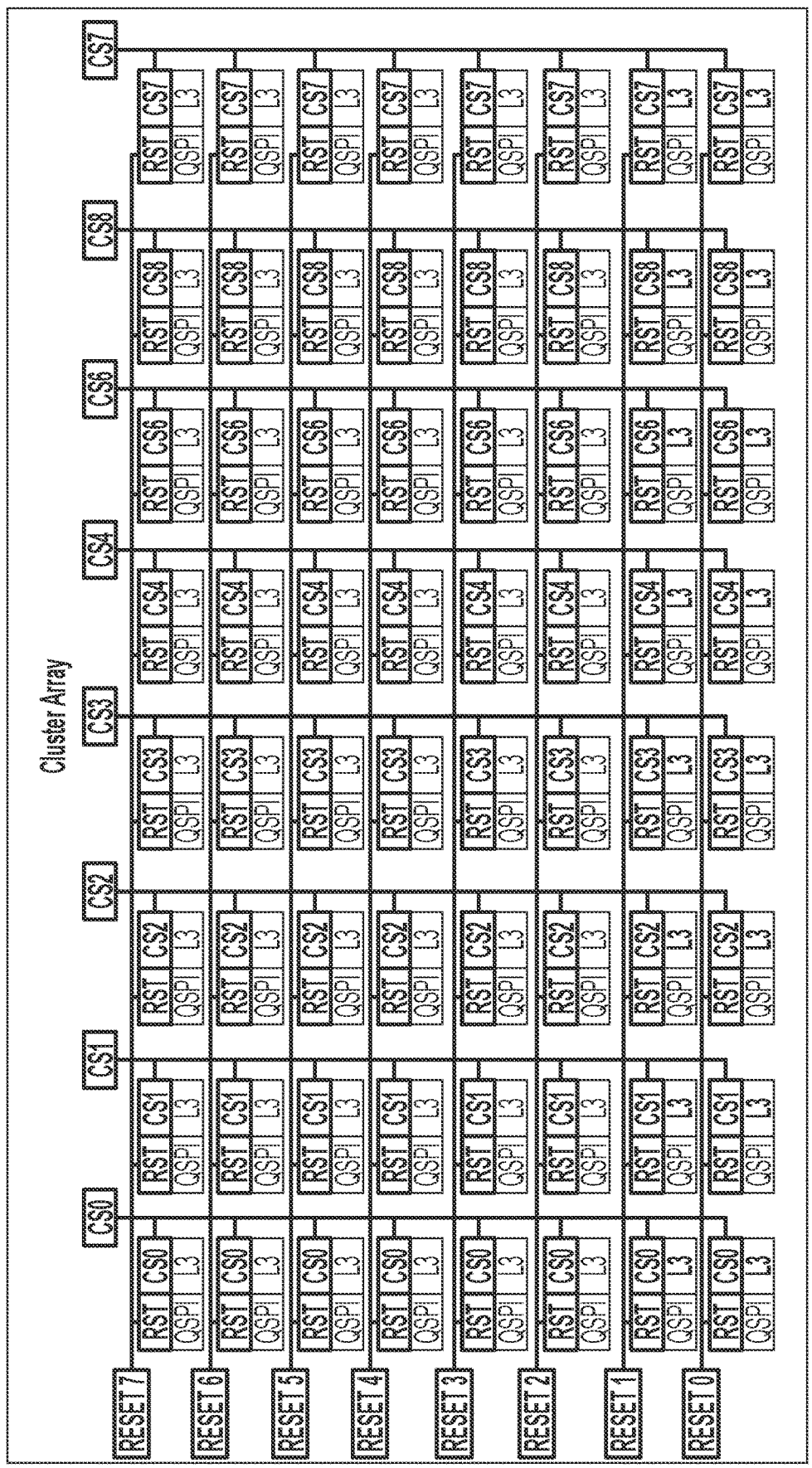
Figure 35C:
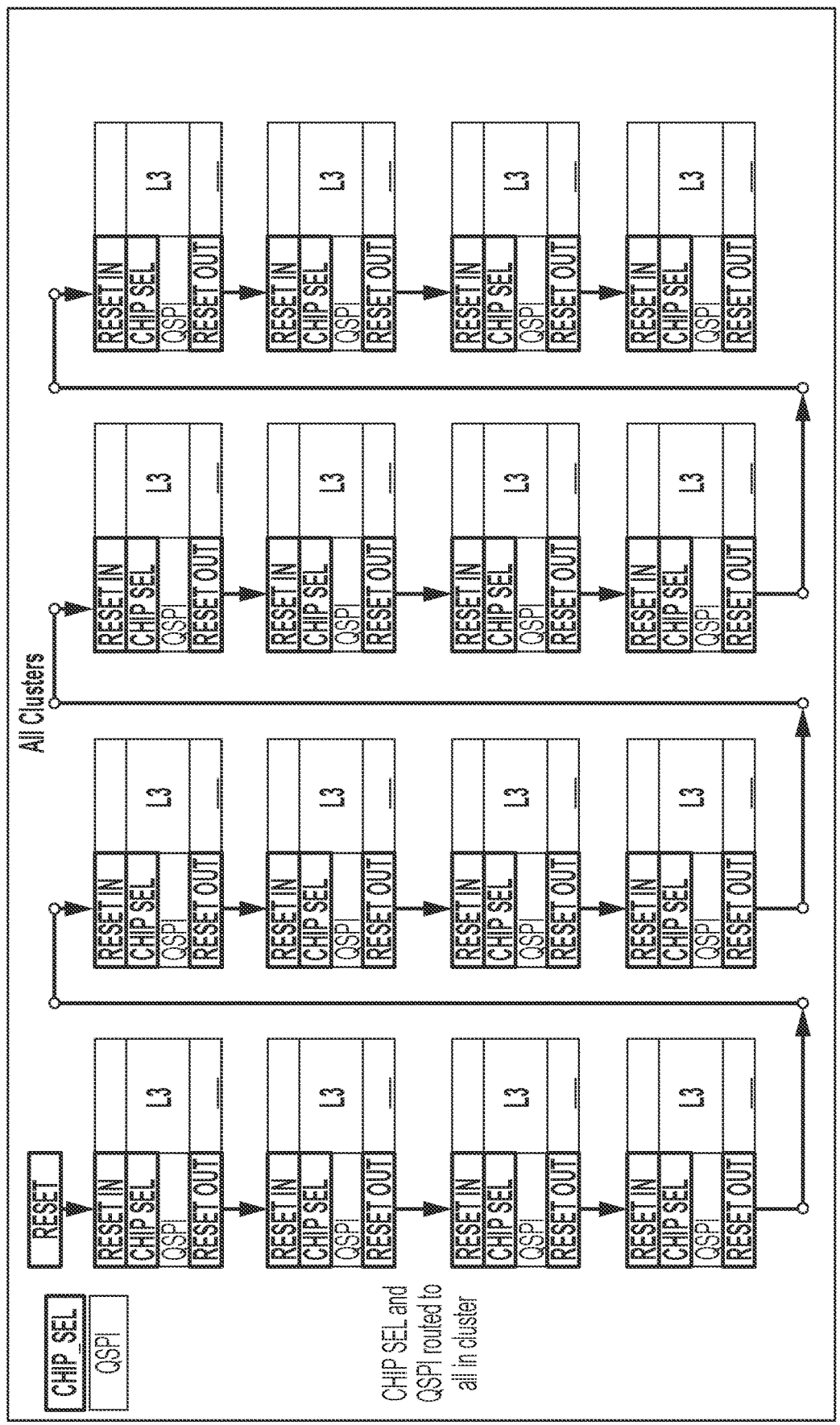

FIGS. 35A, 35B, and 35C illustrate example operations performed according to various embodiments of the present disclosure.

Figure 36A:
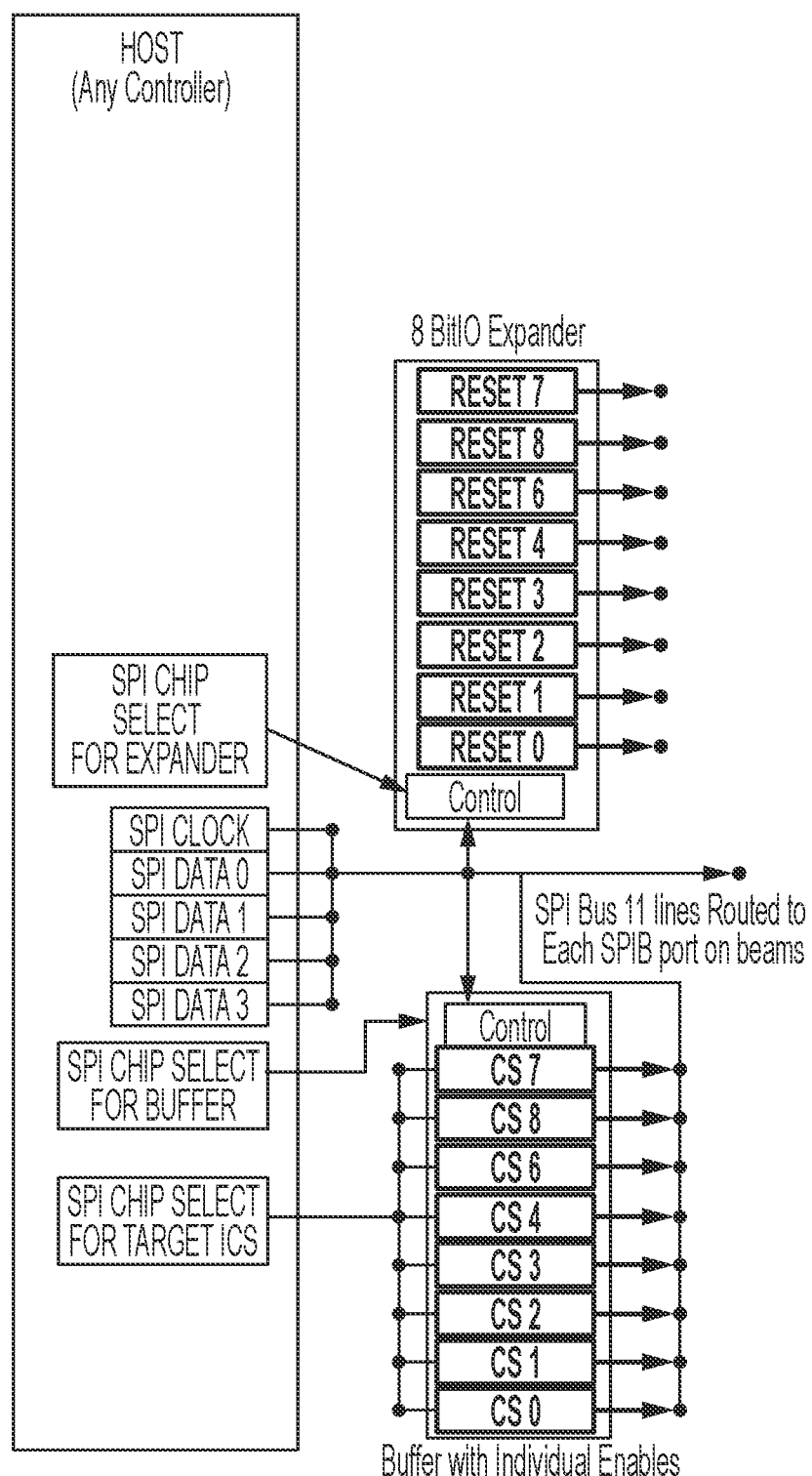
Figure 36B:
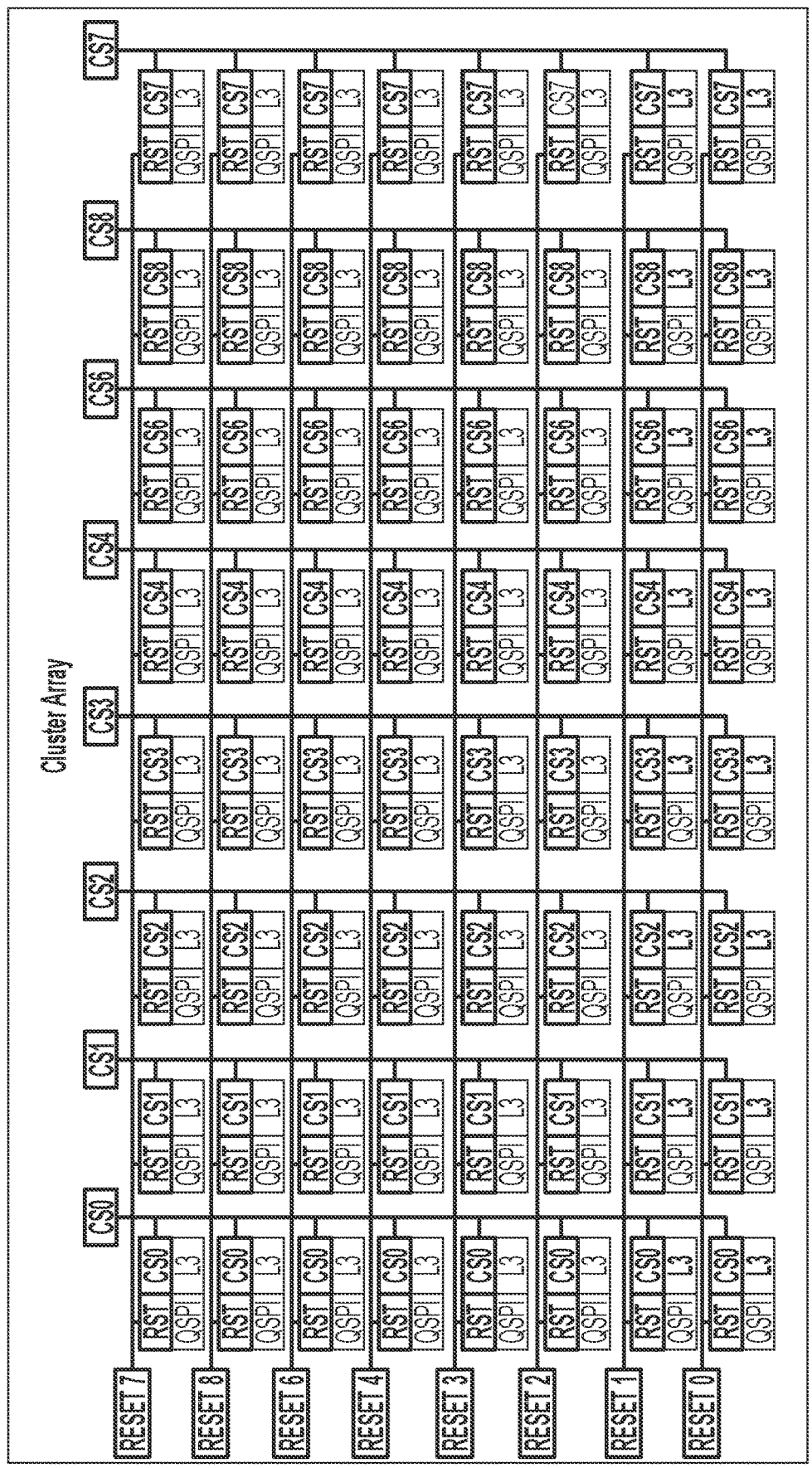
Figure 36C:
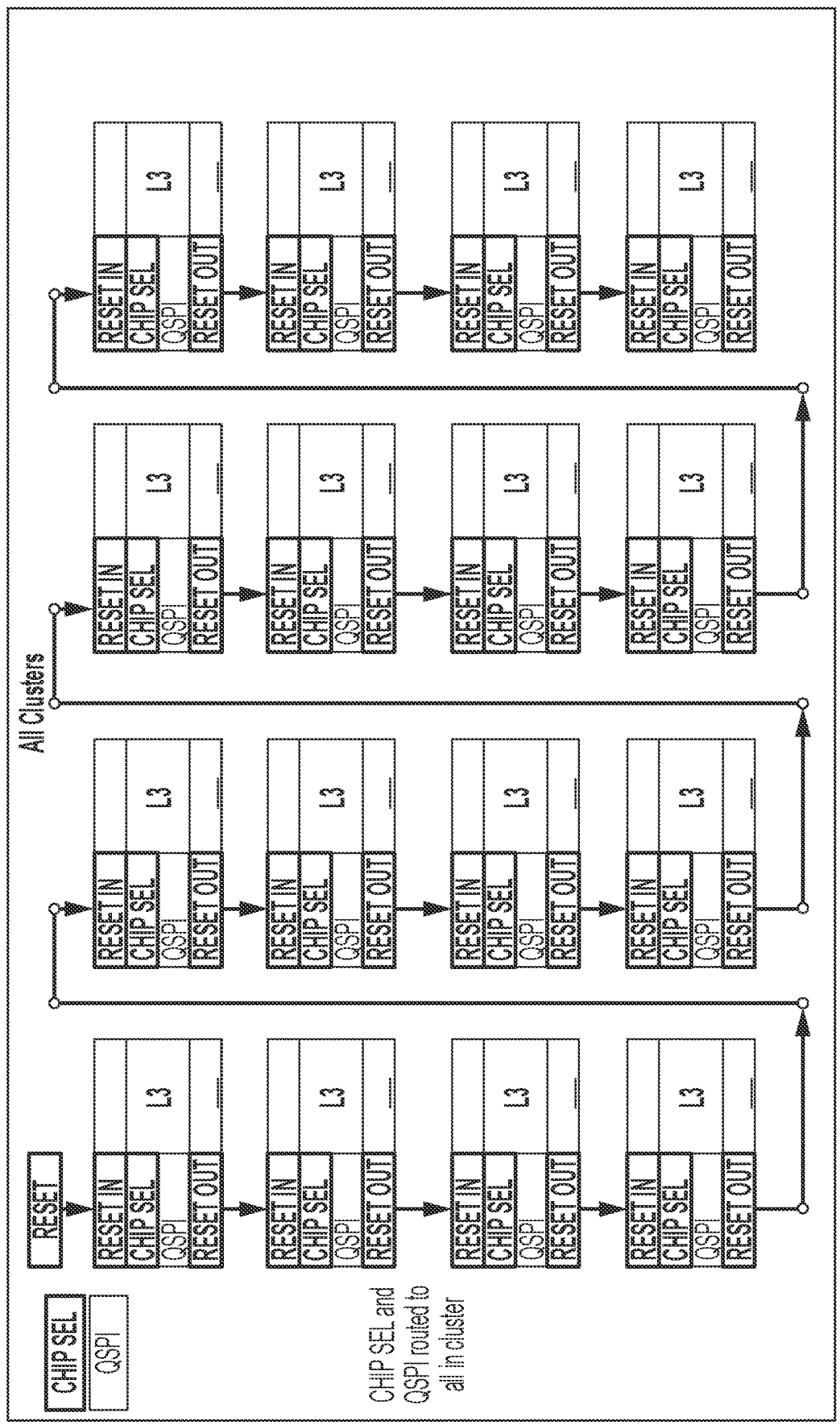

FIGS. 36A, 36B, and 36C illustrate example operations performed according to various embodiments of the present disclosure.

Figure 37A:
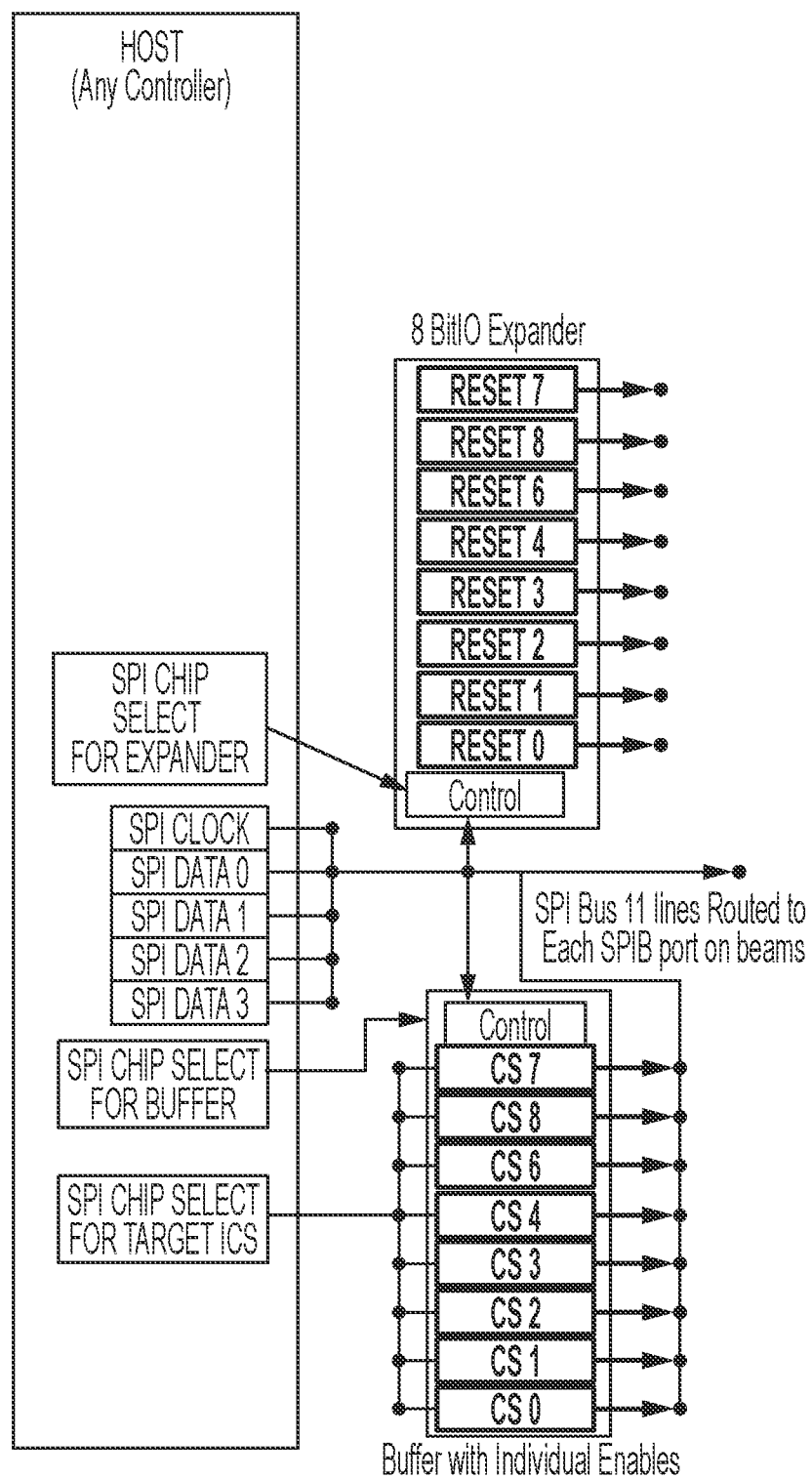
Figure 37B:
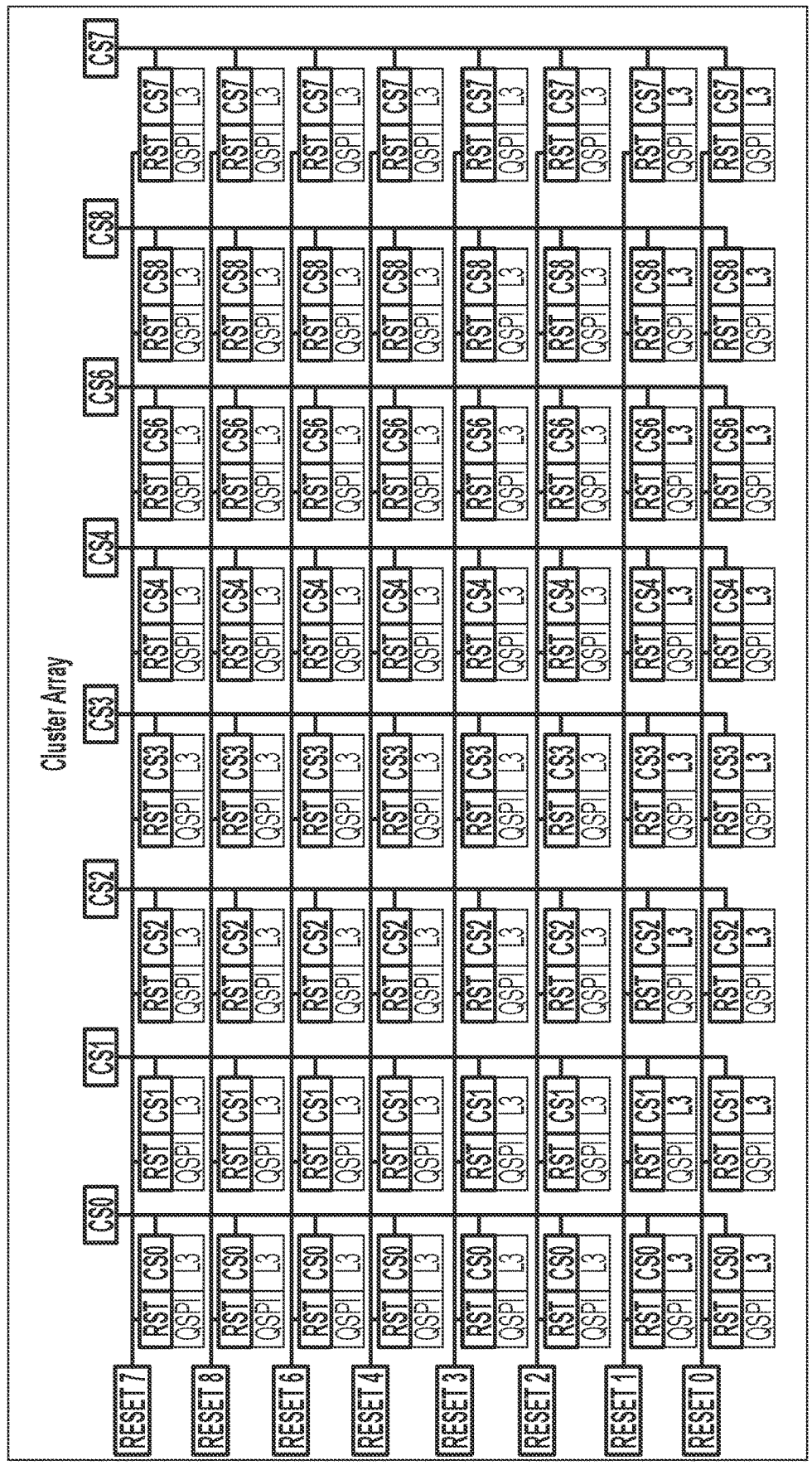
Figure 37C:
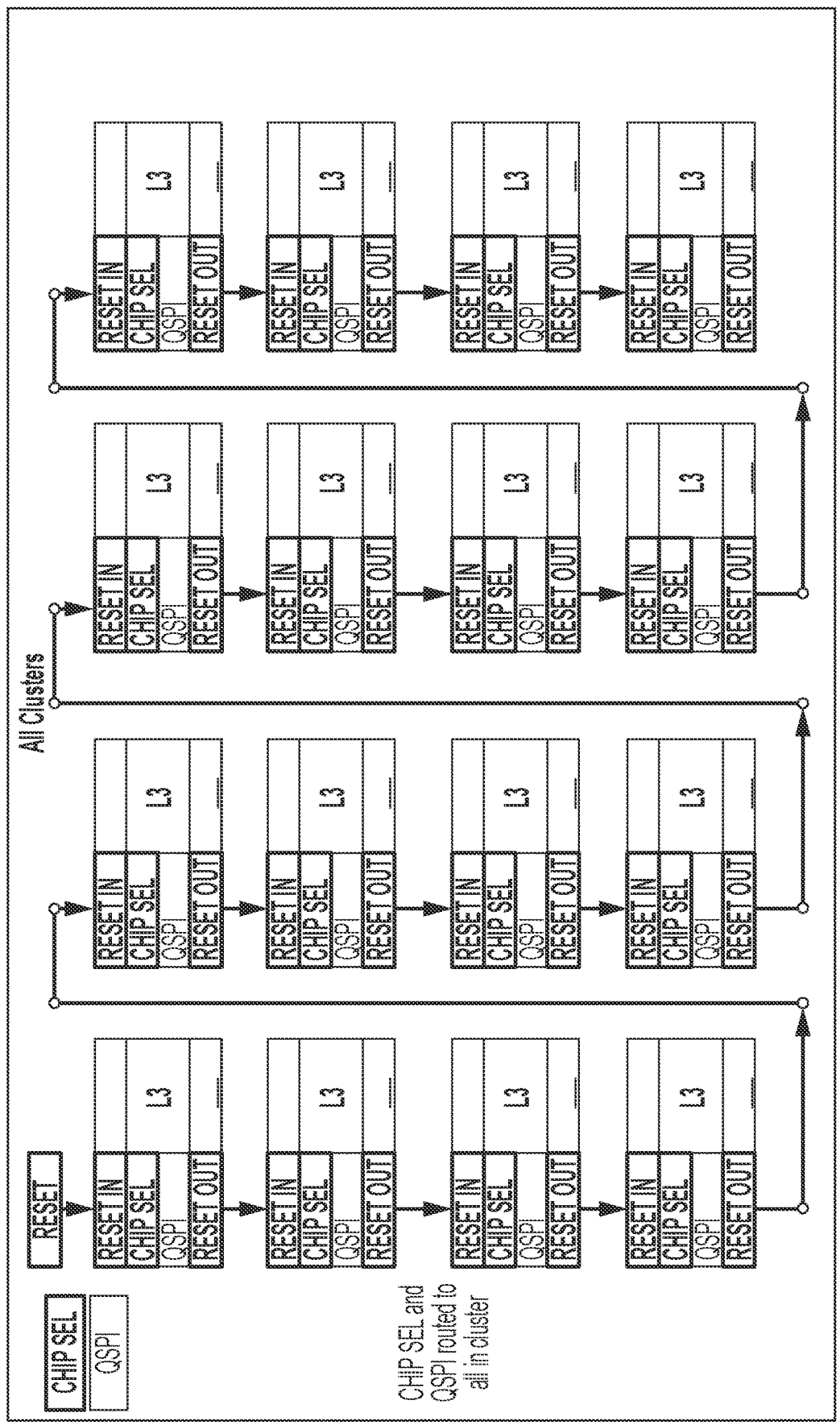

FIGS. 37A, 37B, and 37C illustrate example operations performed according to various embodiments of the present disclosure.

Figure 38A:
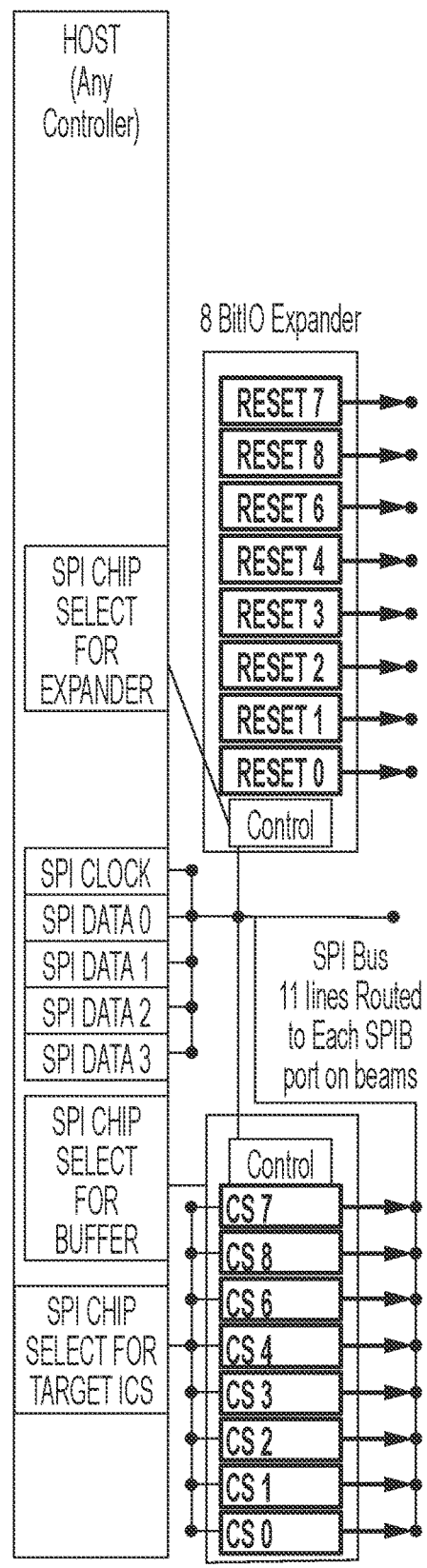
Figure 38C:
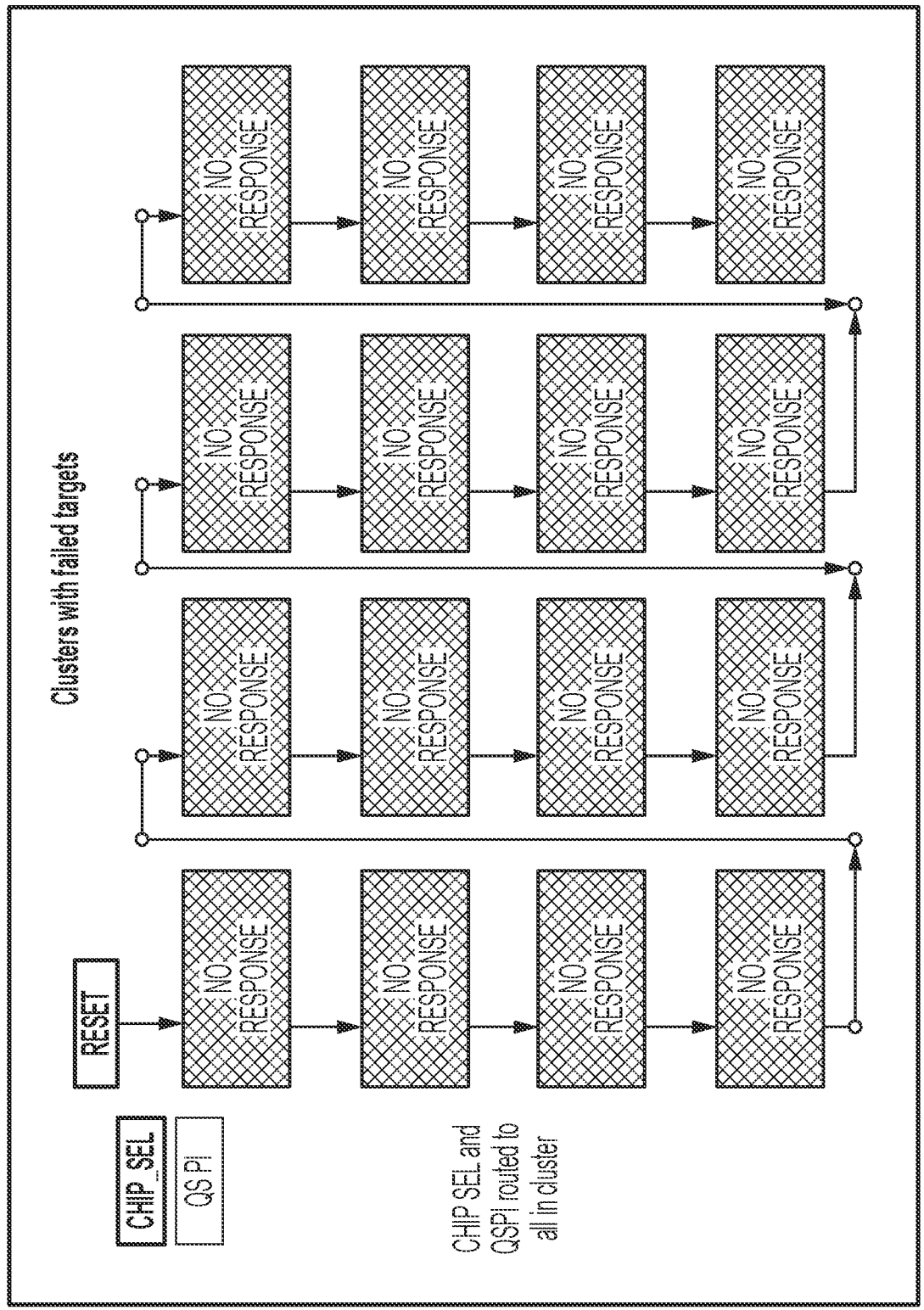

FIGS. 38A, 38B, and 38C illustrate example operations performed according to various embodiments of the present disclosure.

Figure 39A:
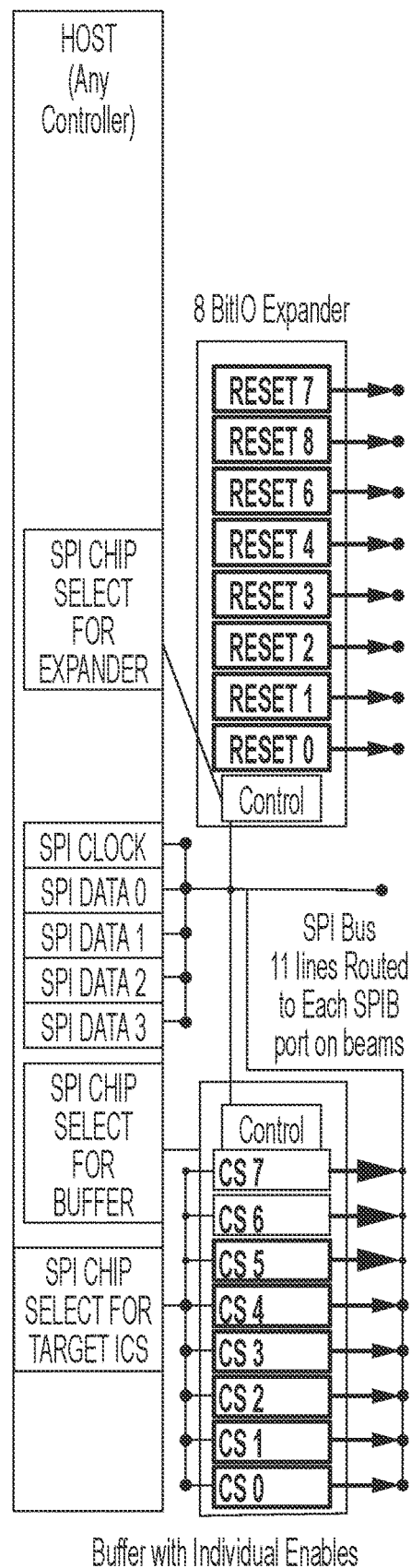
Figure 39B:
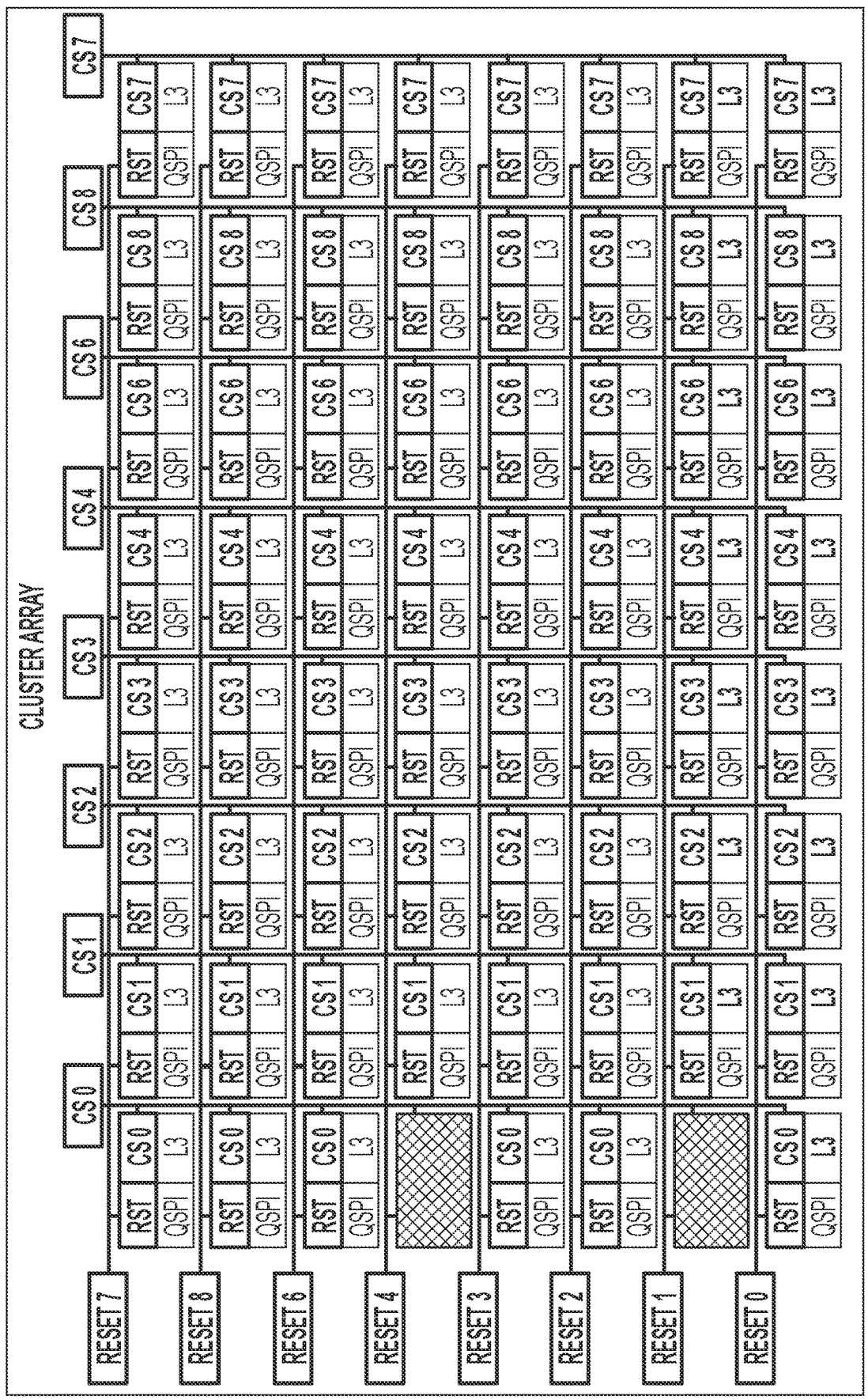
Figure 39C:
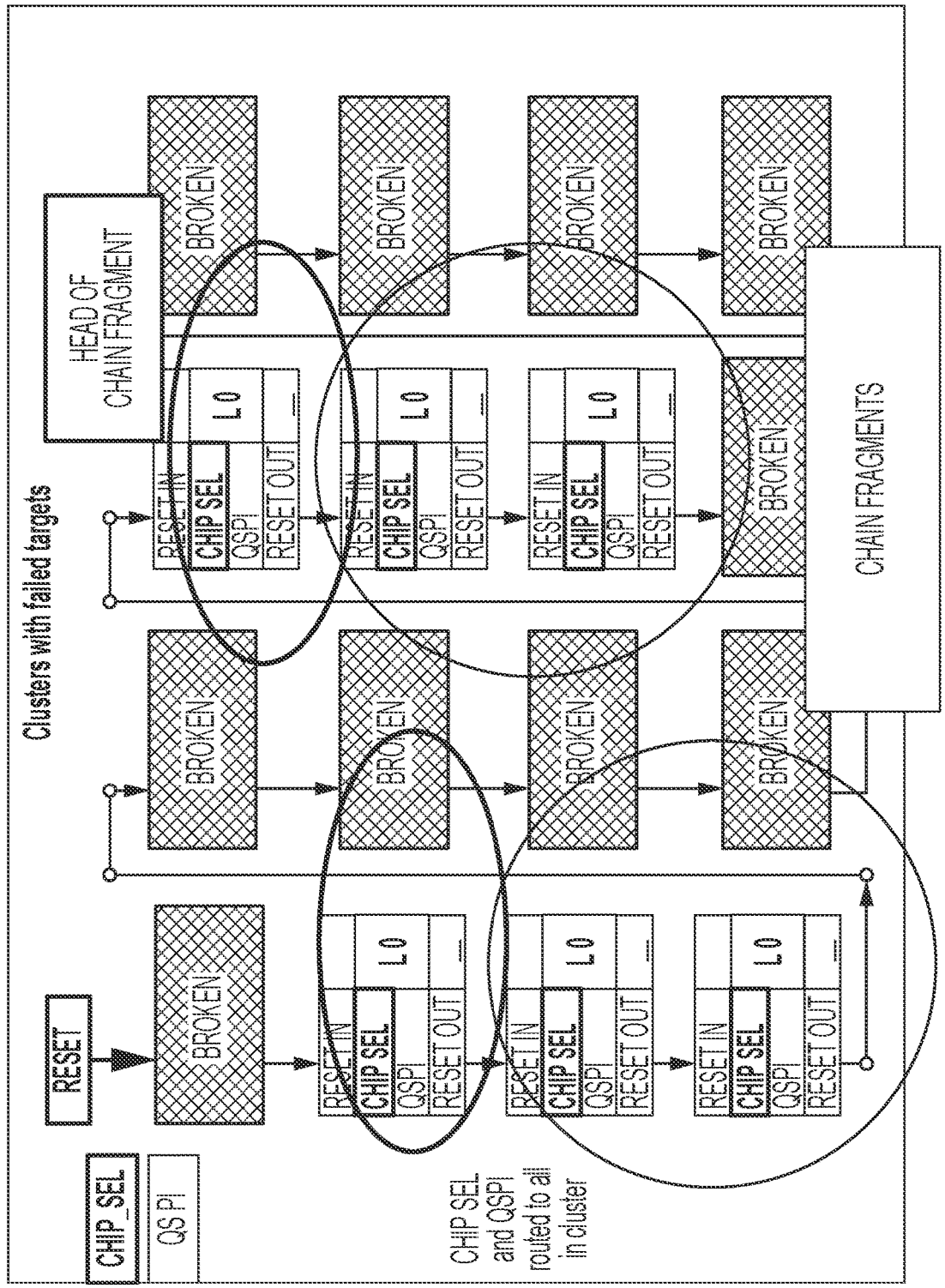

FIGS. 39A, 39B, and 39C illustrate example operations performed according to various embodiments of the present disclosure.

Figure 40:
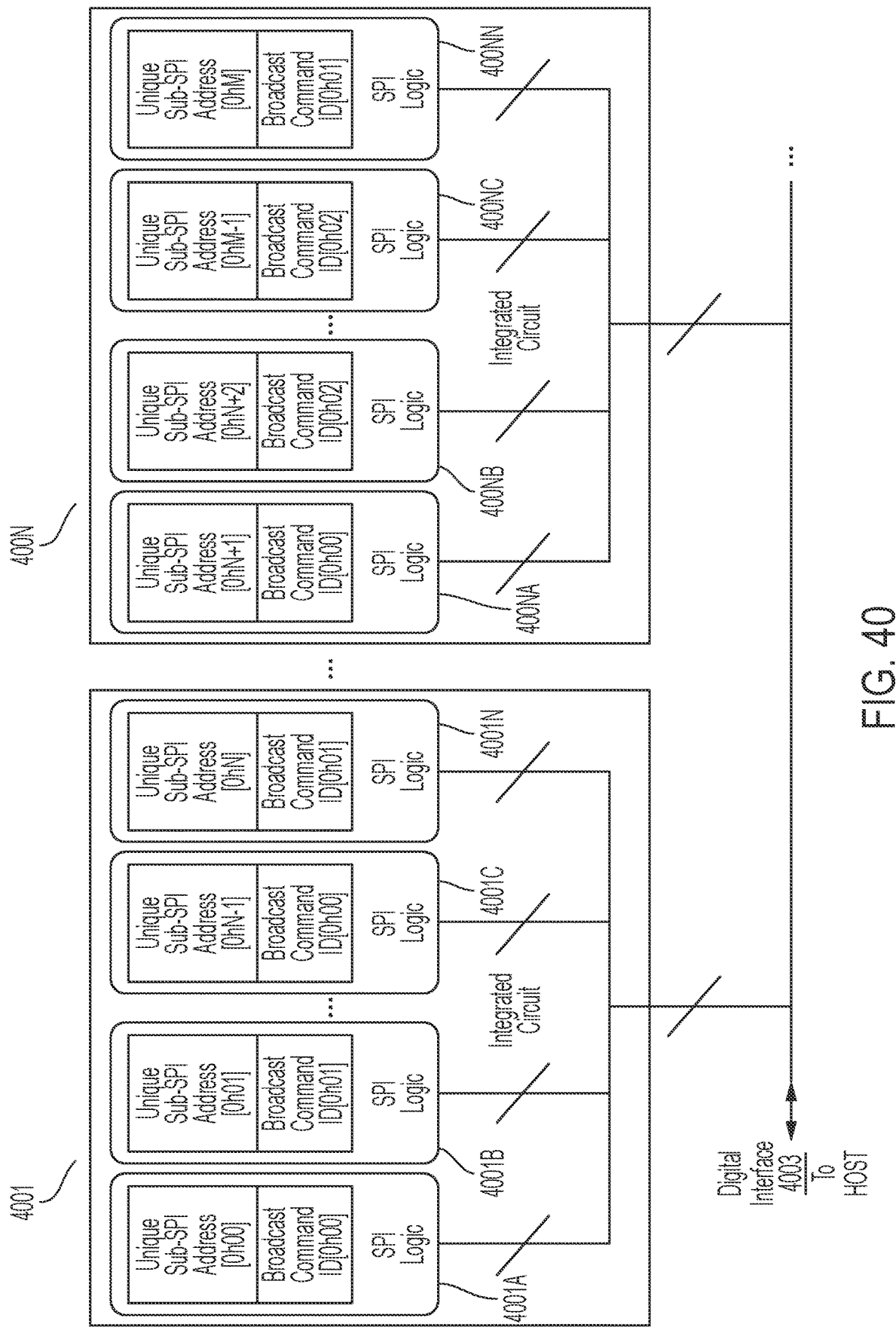

FIG. 40 illustrates an example embodiment of the subject matter described herein.

Figure 41:
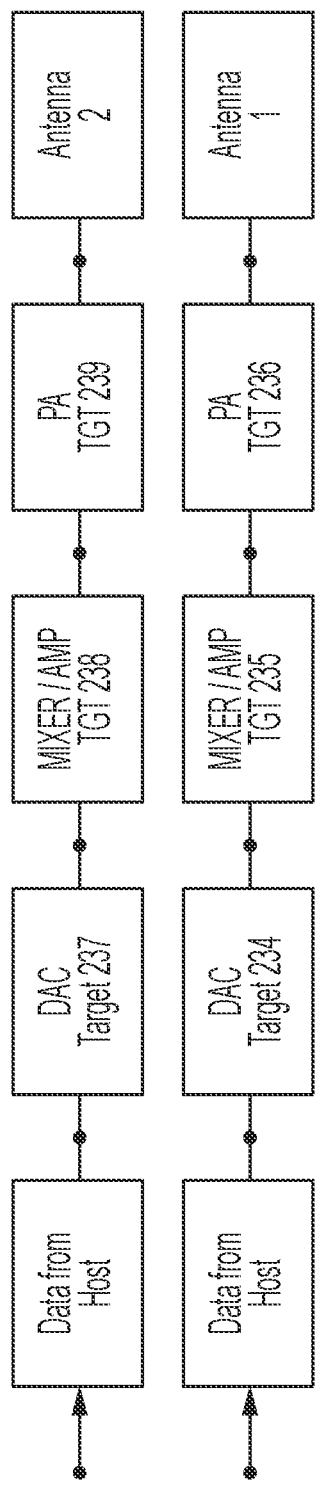

FIG. 41 illustrates an example embodiment of the subject matter described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Used herein, the term "signal" refers to one or more of an analog electrical signal or a digital electronic signal. An analog signal may be any continuous signal for which the time varying feature of the signal is a representation of some other time varying quantity. A digital signal may be a signal constructed from a discrete set of waveforms of a physical quantity so as to represent a sequence of discrete values. A logic signal is a digital signal with only two possible values and may describe an arbitrary bit stream. Other types of digital signals can represent three-valued logic or higher valued logics.

An integrated circuit (also referred to as an IC, a chip, or a microchip) is a set of electronic circuits on one piece (or "chip") of semiconductor material that is normally silicon. The integration of large numbers of tiny MOS transistors into a small chip results in circuits that are orders of magnitude smaller, faster, and less expensive than those constructed of discrete electronic components. ICs are used in virtually all electronic equipment. In some embodiments, an integrated circuit (IC) can execute commands received from a host processor. In some embodiments, the IC may comprise a plurality of compute or functional units for executing such commands A command may comprise data sent over a communication bus to the integrated circuit, where the command represents a request for the integrated circuit to perform a given task or function.

Used herein, a "topology" refers to a particular layout or arrangement of a plurality of integrated circuits and/or other components. For example, a given integrated circuit may be associated with a particular location along a communication bus, and further may be associated with a location in relation to one or more other integrated circuits connected to the common communication bus. "Topological knowledge" refers to awareness possessed by a host or other controlling circuit (e.g., a host circuit, a master circuit, or the like) of a topology of a given plurality of integrated circuits attached to a common communication bus such that the host can distinguish at least one integrated circuit from the remaining plurality of integrated circuits from a topological perspective. Accordingly, at least one integrated circuit of the plurality of integrated circuits may be topologically unique from the other integrated circuits of the plurality of integrated circuits, and the host is in possession of data that allows the host to recognize the topologically uniqueness of at least one integrated circuit.

An example of a topology includes an array. An array refers to a set of multiple integrated circuits arranged systematically, sometimes in rows and columns, such that the multiple integrated circuits may function together. Examples of integrated circuit arrays include sensor arrays, antenna arrays, and the like.

A further example of a topology includes a cluster. A cluster may include a single dimension or include multiple dimensions (e.g., multi-dimensional cluster, two-dimensional or 2D cluster, three-dimensional or 3D cluster). An array may include multiple clusters. Further examples include co-processor arrays or storage arrays. An array may be represented as a multi-dimensional array, in various embodiments.

When a plurality of integrated circuits is attached to a common communication bus and one or more of the integrated circuits is topologically indistinguishable from at least one other of the plurality of integrated circuits, a host or otherwise master circuit is either not in possession of data that allows the host to recognize the topological uniqueness of the one or more integrated circuits or is unable to topologically distinguish between the integrated circuits due to a lack of hard wiring to provide the host such knowledge. For example, in an array comprising a plurality of sensors, a host circuit preferably can detect which sensor of the plurality of sensors is collecting and/or processing an electromagnetic or acoustic signal such that the host circuit can issue a command to an execution unit based upon a location associated with the sensor. For example, if a portion of robot arm has come into contact with a surface and needs to make a location modification to eliminate the contact, knowledge of the exact portion of the robot arm that has come into contact with the surface is preferable so that a small modification can be made (e.g., slightly moving the arm) as opposed to a blanket modification (e.g., repositioning the entire robot). Without topological information associated with at least one sensor of the plurality of sensors, control of (e.g., instructions to cause and/or detect) granular movements may not be possible. Embodiments of the present disclosure overcome such challenges because embodiments of the present disclosure enable recognition, by a host, of topological uniqueness of each integrated circuit of a plurality of integrated circuit communicably coupled to a common or shared communication bus.

A topology may further involve, in various embodiments, a plurality of integrated circuits arranged in a chain arrangement. In a chain arrangement, a first integrated circuit may supply, by way of a first output or first output pin, a second input to a second integrated circuit by way of a second input pin of the second integrated circuit. Continuing in the example chain arrangement, a second output or second output pint of the second integrated circuit may be communicably coupled with a third integrated circuit in order to provide a third input via a third input pin of the third integrated circuit. In such an example, a first input or first input pin of the first integrated circuit may be communicably coupled to a host circuit by way of a communication bus. Embodiments of the present disclosure enable programming of topologically unique identifiers to each integrated circuit of a plurality of integrated circuits arranged in a chain arrangement through the use of a series of commands issuable by a host or otherwise controlling circuit via a shared or common communication bus. The commands issuable by the host may result in execution by a first integrated circuit of a head of chain command and then propagation through the chain arrangement of output of the first integrated circuit to an input of the second integrated circuit, and so on, until all integrated circuits of the chain arrangement have derived or received topologically unique identifiers.

Various logic functional operations described herein may be implemented in logic that is referred to using a noun or noun phrase reflecting said operation or function. For example, an association operation may be carried out by an "associator" or "correlator." Likewise, switching may be carried out by a "switch," selection by a "selector," and so on.

The term "sequential element" refers to an electronic logic element whose output depends not only on the present value of its input signals but on the sequence of past inputs (e.g., the input history) as well. Examples of sequential elements include latches and flip flops. A "combinational element" refers to an electronic logic element whose output is only a function of the present input. Sequential elements can be synchronous (e.g., the state of the device changes only at discrete times in response to a clock signal on the element's clock input) or asynchronous (e.g., can change at any time in response to changing inputs).

Combinatorial logic refers to hardware comprising two or more input states that may define one or more output states, where the resulting state or states are related by defined rules that are independent of previous states. In certain embodiments, each of the inputs and output(s) of the combinatorial logic can attain either of two states: logic 0 (low) or logic 1 (high). Combinatorial logic may comprise digital logic implemented by Boolean circuits.

A logic block refers to a collection of integrated circuit elements or components that are interconnected, by way of electrical signals and/or wiring, to collectively provide desired logic functions. The integrated circuit elements or components may comprise one or more of synchronous sequential elements, asynchronous sequential elements, combinational elements, or the like.

A register refers to a group of sequential circuit elements configured for storing information and making the information available to other circuit elements. For example, a register may comprise a plurality of flip-flops, where each flip-flop is capable of storing a single bit of data (e.g., an N-bit register may comprise N flip-flops).

In certain example embodiments of the present disclosure, an integrated circuit may be referred to as "listening" or performing "input measurements" in relation to a communication bus. In such examples, the integrated circuit may be communicably attached to a shared or common communication bus and executing input measurements using pins attached to the communication bus in order to determine whether the integrated circuit has been addressed by a host circuit or controller via the communication bus. In this way, the integrated circuit may be considered "listening" for its address in order to be available to execute a command intended for the integrated circuit. In certain embodiments, the integrated circuit may be placed into a "listening" mode based upon a command received from the host circuit or controller. Input measurements result in input measurement values, whereby an input measurement value represents a value detected by an integrated circuit having performed an input measurement.

In certain example embodiments of the present disclosure, an integrated may be referred to as having derived a topologically unique identifier (e.g., or other information) by way of performing an input measurement of a stimulus provided by a host circuit. Derivation, in certain embodiments, refers to performing input measurements and deriving bit values based on associated input measurement values.

Overview

Example embodiments are directed to an identification circuit of an integrated circuit that enables a controlling host (e.g., or master circuit), attached to an arbitrary number of integrated circuits (e.g., targets) via a common or shared communication bus, to program topologically unique data (e.g., topologically unique identifiers among other data) to an integrated circuit of the arbitrary number of integrated circuits. The unique data may be transferred upon resetting or powering on the integrated circuit. Embodiments of the present disclosure provide several improvements over existing systems, including a significant reduction in a number of physical pins or routings required in order for a host or otherwise controlling circuit to program topologically unique data to an integrated circuit of an arbitrary number of integrated circuits communicably connected to the host by way of a common or shared bus when the arbitrary number of integrated circuits would be otherwise topologically indistinguishable from a perspective of the host system.

FIG. 1 illustrates a controlling host attached to an arbitrary number of integrated circuits. The circuit depicted in FIG. 1 may be, for example, a large-scale 95 GHz phased array. Shown in FIG. 1, target integrated circuits may be topologically indistinguishable from one another from a perspective of the host controller. Target integrated circuits may or may not vary by functionality. Target integrated circuits may have different default settings making them distinguishable on the common or shared communication bus to the host controller, but the target integrated circuits may be topologically indistinguishable.

FIGS. 2A, 2B, and 2C illustrate host pin requirements for supporting a given number of topologically indistinguishable devices. Shown in FIGS. 2A-2C, as a number of devices requiring topologically unique identification increases, so does a number of host pins required to support the topologically unique identifiers. That is, hard wiring topologically unique identifiers for each integrated circuit of an increasing number of otherwise indistinguishable integrated circuits using a single host controller becomes expensive if not completely inefficient.

Embodiments of the present disclosure overcome shortcomings associated with conventional solutions by enabling the host to topologically distinguish the target integrated circuits on the common or shared communication bus in order for the host to communicate topologically unique data with the target integrated circuits (e.g., without requiring additional host or target pins). Examples of topologically unique data, in some embodiments, may include a unique identifier for in-band addressing so that, over the common or shared communication bus, the host can uniquely communicate to at least one target integrated circuit via the bus. Examples of topologically unique data, in some embodiments, may further include customer identification (ID) data for programmatic customization of bus communication such as encryption keys. Examples of topologically unique data, in some embodiments, may further include customer identification (ID) data for modifying, enabling, or disabling features associated with the target integrated circuit.

Examples of topologically unique data, in some embodiments, may further include data for modifying features of a target integrated circuit based on its location in the circuit topology (e.g., a topology of a plurality of integrated circuits connected to the common or shared communication bus). Examples of topologically unique data, in some embodiments, may further include data for modifying features of a target integrated circuit in the event that damage occurs to the ensemble (e.g., the plurality) of target integrated circuits. Examples of topologically unique data, in some embodiments, may further include commands to mitigate detected faults, or generally commands.

In some embodiments, a broadcast command may include data sent over a communication bus, by a host or other circuit, to command a plurality of target integrated circuits to perform a given task. In various embodiments, the broadcast command is issued in order to command at least one of the plurality of target ICs to perform the given task simultaneously. In various embodiments, the broadcast command is issued in order to reduce a number of commands transmitted via the communication bus (e.g., simultaneous execution may not be required or desired).

Various communication interfaces may be used with embodiments of the present disclosure. Examples of communication interfaces, without limitation, include:

I2C (Inter-integrated circuit): SCL—serial clock line and SDA—serial data line; Master/Slave protocol with in-band addressing by master; the bus can be composed of a clock repurposed from SCL, and a data line repurposed from SDA.

SPI (N wires): SCLK—clock, MOSI—master out slave in, MISO—master in slave out, CS—chip select Rates: 1-100 Mbps, Master/Slave protocol with chip select providing out of band addressing. In band addressing by master variant can be used.

JTAG (4 wire): TDI—test data in, TDO—test data out, TCK—test clock, TMS—test mode select. Rates: 10-100 Mbps, Master/Slave protocol with TDI→TDO chain to provide access to same devices which come up bypassed.

Packet (Various-Parallel): Data bus, Clock, Multiple pins can be repurposed.

CAN (Controller Area Network) Device Net: CAN_FD, CANH and CANL. Both pulled "recessive". Rates~5 Mbps, Peer to peer network with in-band addressing by ID mixed with message prioritization. Single clock recovered data line.

Embodiments of the present disclosure may be fault tolerant. Faults considered by embodiments of the present disclosure may fall into one of several categories. For example, a communication interface failure may involve a circuit attached to the bus causing the bus to no longer be reliable or operational (e.g., in certain scenarios, such a failure may be considered fatal to functionality). Fault tolerance discussions assume the bus to be functioning in the presence of any other failure. As another example, a reset logic failure may involve failure of logic in a circuit which prevents the ID reset from working on that integrated circuit. This is considered tolerable by some solutions. An example reset pin failure may involve a via or a pin that is damaged such that reset is not performed. This is also considered tolerable by some solutions. As another example, a functional failure may involve an IC that has degraded functionality in some aspect other than above. This is considered tolerable.

In certain embodiments, in-band addressing or signaling may be used on a data path of a communication bus, in which control signals may be inserted between data transfers. A control line may be used to distinguish between periods of data and control information (e.g., a control line may be low during data transfer and high otherwise). In-band control information may include the means for indicating start-of-packet (SOP), end-of-packet (EOP), the destination port address of the transfer, and an error-detection code.

In certain embodiments, in-band addressing or signaling is in contrast to out-of-band addressing or signaling. Out-of-band signaling may be employed to send flow control information in a serial status line (e.g., TSTAT, RSTAT of an SPI) that runs at the same bit rate as the data path. Out-of-band flow control has the advantage of keeping the transmit and receive interfaces independent of each other. If in-band flow control were used, then the flow control for one data path would be carried in the data path in the other direction. This would be of no major consequence if both transmit and receive functions could be integrated in one link layer device. With the present state of IC technology, however, it is not possible to achieve any meaningful integration of both functions into one device. Hence, most link layer implementations consist of separate, unidirectional devices.

In certain embodiments, a host or master circuit employs in-band addressing in order to communicate, via a common or shared communication bus, with a plurality of topologically indistinguishable target integrated circuits all connected to the common or shared communication bus.

In some embodiments, a plurality of integrated circuits may be configured in a chain arrangement. For example, at least one integrated circuit of the plurality of integrated circuits may be connected to another integrated circuit of the plurality of integrated circuits, rather than directly to the host or otherwise master or controlling circuit that uses or addresses the integrated circuit. In such an example arrangement, only a first or last integrated circuit in the chain directly connects to the host or otherwise controlling circuit (e.g., by way of a shared or common communication bus or interface).

In embodiments, identification assigning or programming for an integrated circuit may precede normal integrated circuit function (e.g., operation of a functional circuit or functional circuitry of the integrated circuit). Accordingly, an identification assigning or programming procedure may be considered an extended reset procedure for a target or integrated circuit. That is, identification assigning or programming may be enabled by way of a power on reset or by disabling a reset pin of the integrated circuit (e.g., as opposed to a series of affirmative programming commands).

Figure 3A:
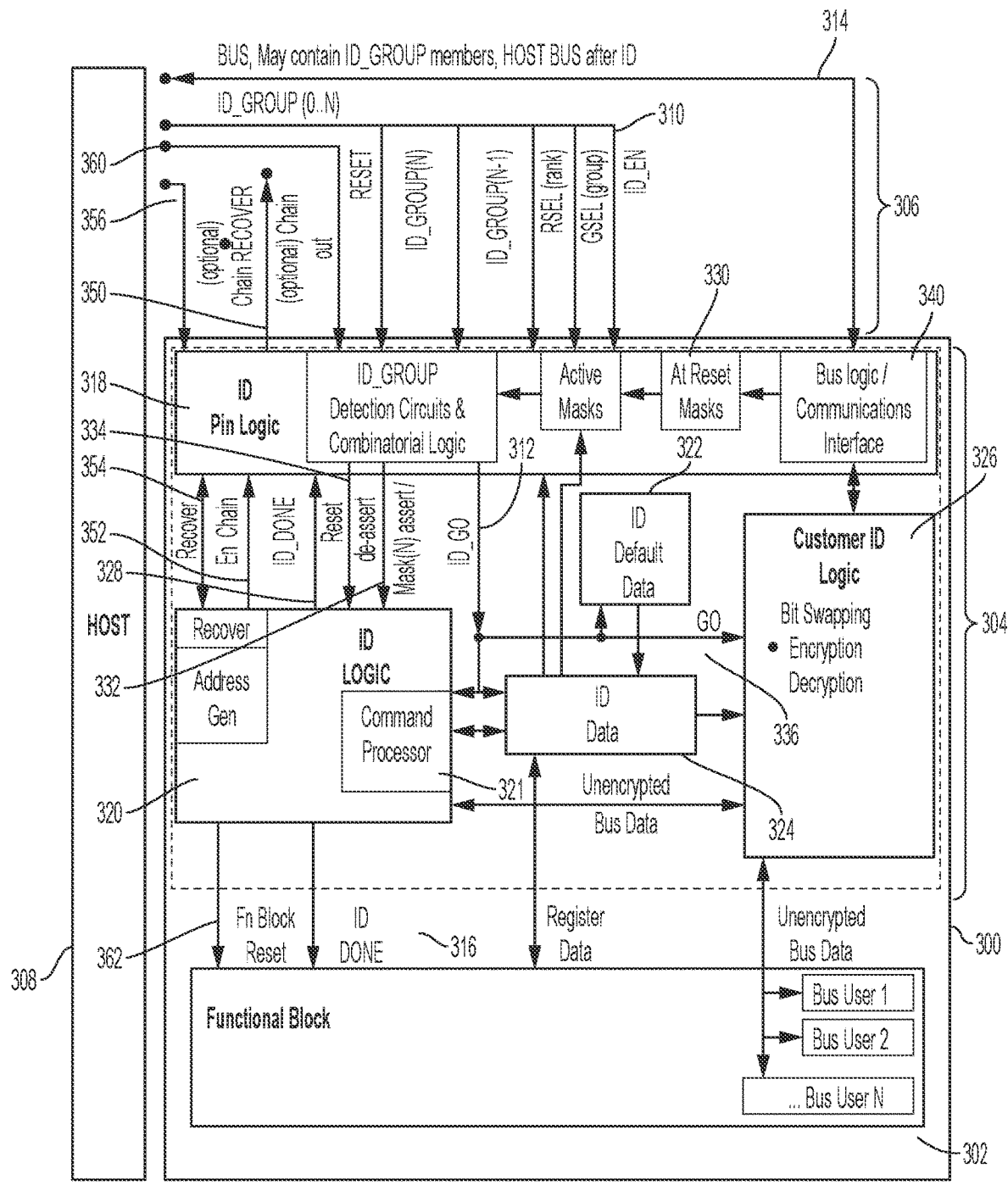

FIG. 3A illustrates an example integrated circuit with an example identification circuit, according to embodiments of the present disclosure. An example integrated circuit 300, in various embodiments, may include a functional block or functional circuitry 302, as well as an identification circuit 304. The integrated circuit 300 may communicate via a communication bus (e.g., 314) and/or one or more signals (e.g., 356, 360, 310, collectively 306) with a host controller, host circuit, or otherwise master circuit 308.

As shown in FIG. 3A and used herein, "ID_GO" 312 refers to a signal that, when received by a target integrated circuit that has an identification circuit, initiates a procedure by which an identification of the target integrated circuit may be dynamically programmed (e.g., an identification assigning procedure is initiated).

As shown in FIG. 3A and used herein, "ID_DONE" or "DONE" 352 refer to a signal associated with an identification circuit of an integrated circuit, where the signal provides for enabling of functional circuitry of the integrated circuit (e.g., an identification assigning procedure has completed).

As shown in FIG. 3A and used herein, "functional block" or "functional circuitry" or "functional circuit" (e.g., 302) refers to functionality to be provided by an integrated circuit.

As shown in FIG. 3A and used herein, "ID_GROUP" 310 refers to a group of signals (e.g., or "identification programming input signals") which, though combinatorial logic, generate the aforementioned "ID_GO" 312 signal and are used as an address in commands Any number of signals or logic may be used for the "ID_GROUP" 310. Signals of the "ID_GROUP" 310 (e.g., ID_GROUP(N), ID_GROUP (N−1), . . . RSEL, GSEL, ID_EN) may be detected by the integrated circuit (e.g., target) 300 such as the presence of a supply to enable a member (e.g., a signal) of the ID_GROUP 310. There may be several ID_GROUP 310 signals each with several instances controlled by the host circuit or controller 308, allowing for segmented control of many integrated circuits (e.g., targets).

An example of a member or signal of an ID_GROUP 310 may be "ID_EN," which is a last member of the ID_GROUP to be enabled when a plurality of integrated circuits is arranged in a chain arrangement. Another example of a member of a signal of an ID_GROUP 310, according to various embodiments, may be "RSEL," which is a rank select. Another example of a member of a signal of an ID_GROUP 310, according to various embodiments, may be "GSEL," which is a group select.

As used herein, "CHIP_ID" refers to a unique integrated circuit identifier (e.g., within a register by the same name) which is programmed for an integrated circuit (e.g., 300) by a host controller, a host circuit, a master circuit, or otherwise external entity (e.g., 308) via a communication bus (e.g., 314). The unique integrated circuit identifier may be subsequently used by the host controller, host circuit, master circuit, or otherwise external entity (e.g., 308) to communicate with or address the integrated circuit (e.g., 300) via the communication bus (e.g., 314). A given integrated circuit (e.g., 300) may be assigned several CHIP_IDs (e.g., unique integrated circuit identifiers) over its lifetime as part of a given topology comprising a plurality of integrated circuits. That is, the given integrated circuit (e.g., 300) may be programmed using a first integrated circuit identifier by a host controller (e.g., 308). Subsequently, the given integrated circuit (e.g., 300) may be programmed using a second, or otherwise replacement integrated circuit identifier by the host controller (e.g., 308). In embodiments, the number of times a new or replacement unique integrated circuit identifier may be assigned to any given integrated circuit is unlimited. In various embodiments, a unique integrated circuit identifier (e.g., a CHIP_ID) may be stored in an identification register (e.g., also referred to herein as a CHIP_ID register) of the integrated circuit.

As used herein, "CUSTOMER ID DATA," "customer ID data," or "customer data" refer to unique data which is programmed to an integrated circuit (e.g., 300) by a host or other circuit (e.g., 308) during an identification assigning or programming procedure as described here. The customer ID data may be subsequently used by the host or other circuit (e.g., 308) for communications. In some embodiments, customer ID data may comprise bus obfuscation data and/or customer unique data. In some embodiments, customer ID data may comprise one or more customer identifiers. A customer identifier may be one or more items of data by which a customer (e.g., or other entity) may be uniquely identified. For example, a customer identifier may comprise a series of one or more characters or bit strings.

As shown in FIG. 3A and used herein, "RECOVER" or "recover" 354 refers to a signal or command used in embodiments described herein to enable a recovery sequence (e.g., within a chain arrangement of a plurality of integrated circuits).

As shown in FIG. 3A and used herein, "ID Pin Logic" 318 refers to circuitry and/or digital logic components configured to manage bus communications, the ID_GROUP 314, optional chain recover 356 and chain output 350 signals, as well as an integrated circuit reset signal 334. In embodiments, combinatorial logic may apply masks from the data blocks (e.g., of the integrated circuit 300) to the signals in ID_GROUP 310 to generate ID_GO 312, reset 334, and recover signals. ID_GROUP 310 members may include repurposed pins from the communication bus 314 and may be detected signals (e.g., as opposed to logic signals).

In various embodiments, the use of assert and de-assert masks enables repurposing of existing signals or pins. For example, the internal reset assert can be part of the mask set and disconnected from the external reset assert during an ID assigning/programming procedure, and the mask set can be re-programmed on completion to allow normal external reset pin function. By way of further example, different embodiments may involve the use of 4 members of ID_GROUP[ ] and another only 3—the mask set allows both to be realized with only an additional broadcast command to reprogram the masks needed.

During integrated circuit 300 reset, masks contained in active masks (e.g., a register) 330 are applied to the ID_GROUP 310 set of signals to generate a reset de-assert signal 332. When RESET 360 is asserted, the entire target IC 300 may be in a state of reset (e.g., depending upon the masks). Separate masks in active masks 330 are used to generate mask assert and de-assert 332, for the internal reset signal 334, ID_GO 312, GO 336, and the MASK(N) 332 signals.

In embodiments, a GO signal 336 is asserted to start other blocks in the ID assigning or programming procedure other than the functional block 302. GO 336 may further enable broadcast and recovery commands to be processed (e.g., when the integrated circuit 300 is arranged in a chain arrangement among a plurality of other integrated circuits).

When the host 308 programs the target IC 300, the target IC enables the corresponding mask to assert ID_GO 312. With ID_GO 312 asserted, the target IC 300 begins listening (e.g., via bus 314) to commands sent to its default in band address which may be shared by all target ICs. The host 308 then programs a unique chip ID and any other desired data to the target IC 300. When ID programming is considered complete, ID logic 320 enables the functional block 302 by asserting ID_DONE 316, which also enables the host bus logic of the bus logic and communications interface 340 (e.g., the communications bus 314 may be used for normal bus communication with the host 308).

In embodiments, pins from the host bus 314 may be repurposed for use as ID_GROUP 310 pins during an identification assigning procedure. Accordingly, the function of the pins may shift back to normal host use after ID_DONE 316 is asserted. In addition to ID_GROUP 310 using repurposed pins, signal members of the ID_GROUP 310 may be obtained through detection of other power supplies on the target or other signals on the target.

As shown in FIG. 3A and used herein, bus logic and/or communications interface 340 refers to circuitry and/or logic components configured to manage communications via the bus 314 (during ID assigning) and the host bus 314 (e.g., which is active when ID_DONE 316 is asserted). The bus protocol and host bus protocol may be the same or the bus may be simplified. An example minimum configuration for the bus 314 may include a clock and a serial data in line (e.g., although if clock recovery can be performed only one data line may be necessary).

In embodiments, assertion of the GO signal 336 can be masked to be enabled from a single ID_GROUP 310 signal if using direct addressing or when the target 300 is powered on (ID supply detection is enabled).

In embodiments involving a chain configuration (discussed in more detail below), a chain output signal 350 is asserted based on a state of an EN chain signal 352 from ID logic 320. An optional recover input 354 is asserted to cause the IC 300 to enter a chain recovery state. An external recover signal 356 is optional as the recover signal may also be generated by a message in the IDassigning procedure.

In embodiments, using ID_GROUP 310 with its associated mask definitions enables changing the ID assigning procedure with broadcast commands after GO 336 is enabled (e.g., asserted). In this way, an example default behavior of a design might be to simply operate an integrated circuit 300 as though it were a singleton in a system, using its default ID. However, using a broadcast command to change the ID_GROUP 310 and associated RESET 360, GO 336, and ID_GO 312 masks allows the host 308 to change the behavior of the target ensembles (e.g., the plurality of integrated circuits) to allow different operating/functional schemes for the same designs. In this manner, embodiments of the present disclosure support multiple of the examples described herein, and more, without requiring changes to the target design.

Embodiments of the present disclosure further enable programming of customer specific data before normal use of a target IC. This data may be distinguishable from normal use customer programming. Customer data can be used to enable or disable features, modify features, or allow the host bus to be encrypted. Customer data may be provided by a vendor in secure form to allow the target vendor to customize features of the target without using non-volatile memory or making custom targets. Programmed ID registers (e.g., described herein) may be available for use during normal functionality (e.g., for use by functional circuitry) by the target IC. Programming customer specific data before normal use is desirable because it allows the vendor to control features and allows for encryption or data obfuscation so that one customer cannot easily copy from another customer software or settings. Conventionally, customer specific data is programmed during an initialization phase or is stored in non-volatile memory accessible by the target. For the vendor to be able to provide customer specific data in a firmware module separate from the software used in normal operation is desirable.

As shown in FIG. 3A and used herein, "Customer ID logic" or "customer ID logic" 326 refers to circuitry and/or digital logic components configured to perform bit swapping, and encryption and/or decryption of bus data. In embodiments, the customer ID logic block 326 may implement one or more of pass through, bit swapping of data or address, shifting of data or address, encryption and decryption schemes, or more complex logic, and can be configured to provide secure access. In embodiments, the customer ID logic block 326 may pass data to and from the ID logic 320 block and the functional block 302. During an example ID assigning process, the customer ID logic block 326 may pass bus 314 data and when an example ID assigning process is completed, the customer ID logic block 326 passes host bus 314 data. The customer ID logic block 326 uses customer ID data stored in the ID data 324 block to perform encryption and decryption of transferred data. The encryption and decryption can support schemes in which clocking takes place during bus transactions.

In embodiments, a key preferably matches at ID assigning with default customer ID data, and/or a key preferably matches at runtime with a customer provided key. The customer ID logic block 326 can be used to enable or disable features and is readable and writeable by the ID logic block 320 and the functional block 302 of the IC 300. The customer ID logic block 326 can be used to program topologically specific data for use by other blocks in the IC 300 (e.g., a JTAG ID for non-chained JTAG configurations of identical, or topologically indistinguishable, ICs).

As used herein, "DIS" refers to a signal intended to disable a reset on an integrated circuit. It will be appreciated that the DIS signal may be an inverted logic of a reset signal 360 and may be a member of ID_GROUP 310 (e.g., in FIG. 3A).

As shown in FIG. 3A and used herein, ID logic 320 refers to circuitry and/or digital or combinatorial logic components configured to control a state machine associated with an identification assigning or programming procedure. The ID logic 320 circuitry may also be configured to receive messages (e.g., commands) and generate responses (e.g., assert signals), to control a recovery state machine (e.g., associated with a chain arrangement of integrated circuits), and/or to generate one or more recovery addresses (e.g., associated with a chain arrangement of integrated circuits).

As shown in FIG. 3A and used herein, "ID Default Data" 322 and/or "ID data" 324 refer to data registers of the integrated circuit 300 which may be modified from defaults by using commands issued by the host or other master or controlling circuit 308. It will be appreciated that the ID default data 322 and/or ID data 324 registers may be accessed and utilized by any of the logic blocks that are part of the integrated circuit 300.

In embodiments, ID logic block 320 is enabled when GO is asserted by the ID pin logic block 318. Bus data is passed to and from the customer ID logic block 326 to the ID logic (e.g., 320) command processor 321. An example command involves programming the CHIP_ID, which may be embodied by a register (not shown) in the ID data 324 block. It will be appreciated that, in certain embodiments, if ID_GO is set/asserted, GO is also set/asserted.

Commands can be targeted to a particular CHIP_ID (e.g., a particular integrated circuit), or commands can be broadcast to all listeners (e.g., all integrated circuits listening for commands via the communication bus). Example commands and associated registers are depicted in Table 1 below.

TABLE 1

Example Commands

| Write register in ID data block | Read register in ID data block | Send ACK - send acknowledgement of register programming | Set state, reset state |
|---|---|---|---|
| Write masked ID | Assert/De-assert Enable Chain signal | Program data to fuse in "reset id default data" Measure Chain | End ID and run functional block |

Example Registers

| CHIP_ID | ID[0 to N] (Including CHIP_ID at 0) | Control | ID programming counter[ ] |
|---|---|---|---|
| Assert Mask[0 to N] | De-assert Mask[0 to N] | Status | ID_GROUP pin mask |
| ID_GROUP | ID_GROUP status | Version | Functional Config[ ] |
| Functional Feature En[ ] | Encrypt Data[ ] | # in ID_GROUP | |

During an example ID assigning procedure, encryption can be enabled in the customer ID logic block 326 for example by writing encrypt data and then enabling the programmed encryption/decryption. Subsequent data sent via the bus 314 would then be encrypted/decrypted using the customer ID logic block 326.

When an example ID assigning procedure is considered complete, either through an automatic state machine or through the host writing registers such as the Signal Enable[ ] register (not shown), the ID logic block 320 asserts ID_DONE 316 to fully enable the functional block 302 and convert the sense of the bus 314 to the host bus which the functional block expects. The functional block reset 362 signal may be de-asserted at this time as well or earlier.

In embodiments, the ID logic block 320 can be provisioned to receive commands after ID_DONE 328 is asserted by including ID_DONE 328 as a sub-ID in the in band addressing scheme.

Examples of registers for use with embodiments of the present disclosure are listed in Table 1 above. The examples of registers are further explained below.

ID[N] and CHIP_ID are each registers of an integrated circuit that may contain a CHIP_ID being programmed to the integrated circuit. In embodiments, ID[0] may be the CHIP_ID, while ID[1] may be the recover address.

ID programming counter[N] is a register that contains a number of times ID[N] has been updated. In embodiments, the ID programming counter is incremented upon each write to ID[N]. The ID programming counter can also be written, in some embodiments.

ID_GROUP[N] is a bitfield of the ID_GROUP register (not shown) which is used. Each bitfield of ID_GROUP register can be written, in some embodiments.

ID_GROUP_STATUS [N] is a bitfield representative of the ID_GROUP 310 pin status. ID_GROUP_STATUS [N] is read only, in some embodiments.

ID_GROUP_PIN_MASK[N] is a bitfield of the ID_GROUP register. A 0 at bitfield X indicates that the ID_GROUP[X] is equal to ID_GROUP_STATUS [X]. The ID_GROUP_PIN_MASK[N] bitfield can be written, in some embodiments.

Example bits of the ID_GROUP register are shown in Table 2 below. In various embodiments, the user bits can be defined by the user and may be attached to some external pin or a detection circuit attached to a pin. In various embodiments, the Done bit can be in every configuration, while the Head of recovery chain and Recover bits can be in chain configurations. In embodiments, the output bit can be in chain configurations where the chain output can be configured as an input.

TABLE 2

| Bit | 7 | 6 | 5 | 4 | 3 | 2 | 1 | 0 |
|---|---|---|---|---|---|---|---|---|
| ID_GROUP | Done | Head | Recover | Output | User | User | User | User |

Example control register contents are shown in Table 3 below.

TABLE 3

Control Register

| Bit | 0 | When set, target IC will propagate its input signal to its chain output |
|---|---|---|
| | 1 | Set chain output on |
| | 2 | Tri state chain output or set as input if available |
| | 3 | Enable encryption block |
| | 4 | Assert Reset to functional block |
| | 5 | Enable address randomizer for address ID 1 |
| | 6 | |
| | 7-8 | Auto program clock count |

In embodiments, identification circuitry may be simplified such that integrated circuits may be addressed based on their IDs, their ID programming state, and their ID_GROUP status singly or in combination.

Commands for use with embodiments of the present disclosure may have what are referred to herein as common parameters, including one or more of:
  GROUP MASK: A mask for ID_GROUP members;
  GROUP VALUE: A value for ID_GROUP members;
  ID_INDEX: A value specifying the ID to compare against the counter value to see if the command applies;
  ID_COUNTER_VAL: A value to compare against each IC prior ID programming count;
  EQUAL: A Boolean value to state whether the COUNTER_VAL should be equal;
  ID_MASK: A mask for to be applied to the ID referred to in ID_INDEX; or
  ID_VALUE: A value to be compared to the ID referred to in ID_INDEX.

In embodiments, when the ID_logic 320 receives a command, for the ID_INDEX in question, the ID logic 320 performs one or more of the following tests:

Is (ID_GROUP & GROUP_MASK) not equal to ID_GROUP_VALUE?
Is the local ID programming counter for the ID_INDEX less than ID_COUNTER_VAL?
Is EQUAL set and the local ID programming counter not equal to ID_COUNTER_VAL?
Is (ID[ID_INDEX] & ID_MASK) not equal to ID_VALUE?

If any of the above tests are true, the ID logic 320 does nothing. Otherwise the command is executed by the integrated circuit (e.g., 300).

Accordingly, group mask and group value allow the host 308 to address any combination of bits in the ID_GROUP 310. Setting a mask and value both to 0 ignores that category. Setting ID_INDEX to 0 and Equal to OFF ignores the ID_INDEX. Individually addressed commands can be made using ID_MASK equal to the desired ID_VALUE.

In embodiments, the "write register" command uses common command parameters plus ADDRESS (e.g., address of register), VALUE (e.g., starting value), and MASK. If the common command parameters allow execution, REGISTER [ADDRESS]=(REGISTER[ADDRESS] & MASK)| VALUE.

In embodiments, the "auto assign chain address" command uses common command parameters plus ADDRESS (e.g., address of register), VALUE (e.g., starting value), and MASK. If the common command parameters allow execution, the integrated circuit executing the command clears its done flag. If chain in is ON or the chain head bit is set and its done flag is clear, the IC programs its copy of VALUE to the register pointed to by ADDRESS as the write register command does. The IC will then set its done flag. The IC will wait an auto program clock count and then enable the chain propagation to the next IC (e.g., in the chain configuration) by setting bit 1 of CONTROL to 1. On auto program clock counts, the IC 300 increments its copy of VALUE by one. The host 308 preferably continues to clock the SPI clock after the command is fully sent for a number of clocks equal to N times the value of auto program clock count to program N ICs.

In embodiments, the "read register" command uses common command parameters plus ADDRESS (e.g., address of register), NUMBER (e.g., to read), STARTING ID, and TRAVERSE ICs. If the common command parameters allow execution, then:
If TRAVERSE ICs is off, the IC will return NUMBER of registers starting from ADDRESS;
If TRAVERSE ICs is on, each IC will return the register at ADDRESS in turn (e.g., the first IC is at STARTING ID, each IC will count the number of clocks to determine its turn).
The host preferably clocks the bus for the number of reads it expects to receive.

Accordingly, in order to read out all CHIP_ID's for 1024 ICs, for example, the host would send a read register command with parameters: ADDRESS=CHIP_ID register address, NUMBER=1024, STARTING ID=0, TRAVERSE ICs=TRUE. The host would also send common parameters set to allow for any respondent IC: ID_INDEX: 0, GROUP MASK and GROUP VALUE: 0, ID_COUNTER_VAL: 0, EQUAL: OFF, ID_MASK and ID_VALUE: 0.

In embodiments, because a read register command can traverse different respondents and may have gaps in respondents, an example serial interface definition may preferably make sure the last bit written is a 0, so that only a very weak pull down can keep the bus at 0 when all the attached ICs have their slave outputs tri-stated.

The command "set head of chain bit" or "head of chain" uses common command parameters plus VALUE=on or off. If the common command parameters allow execution, then this command causes the target IC to set the head of chain bit if its chain input is equal to value (on or off).

In FIG. 3A, an example identification assigning or programming procedure may begin when combinational logic associated with the ID_GROUP 310 is true, enabling ID_GO 312. In embodiments, the host 308 may control the state of the ID_GROUP 310 and therefore enable each integrated circuit in turn, knowing a-priori a topology of a design (within which the integrated circuit 300 is arranged) relative to the connections of the ID_GROUP 310.

Once the ID_GO 312 signal is enabled, the host 308 may program, by way of issuing commands over the bus 314, unique data to the selected target (e.g., integrated circuit 300). When the programming of the integrated circuit 300 is completed, the host 308 moves on to the next target IC (not shown). After programming all target ICs, the host 308 may enable normal chip function (e.g., functional block 302) using a broadcast command or an enable pin (e.g., which may lead to assertion of ID_DONE 316).

In various embodiments, programming is achieved over the communication bus (e.g., 314) attached to a target (e.g., 300). The programming may use the bus (e.g., 314) protocol or a simplified protocol repurposing pins of the bus (e.g., 314).

In embodiments, one or multiple signals that make up the ID_GROUP 310 may be used in combinatorial logic. This allows many devices (e.g., integrated circuits) to be enabled in turn with a minimal or reduced number of ID_GROUP 310 members (e.g., signals).

Since an example ID assigning procedure precedes otherwise functionality of an integrated circuit (e.g., 300), the ID_GROUP 310 may be thought of, in some examples, as equivalent to a multi-pin reset disable. For example, if the ID_GROUP 310 consisted of 3 signals each with 4 instances, 4*4*4=64 devices could be supported. By way of further example, if the ID_GROUP 310 consisted of 3 signals each with 11 instances, 11*11*11=1331 devices could be supported.

Once an ID assigning procedure has been entered or initiated, it is possible for a design to allow all or part of the ID_GROUP 310 to be disabled. This allows signal re-use for selection. As an example, if there were 3 signals each with several instances, two of the signals could represent the x and y coordinates in a group selected by the third signal (e.g., a group signal). Thus, addressing could occur by enabling a group, then enabling each x and y instance in turn, then disabling the x and y instances, enabling another group, and repeat enabling each x and instance in turn.

Members of the ID_GROUP 310 may be detected (e.g., measured by way of input measurement) on the target integrated circuit, saving a pin (e.g., that may otherwise be required for dedicated assertion). Members of the ID_GROUP 310 may alternatively be detected by on board circuitry, requiring no pins on the target integrated circuit. ID_GROUP detection on the target integrated circuit can be provided by a circuit that detects the presence of another supply voltage, or the presence of a signal that is under the host control which may be used for normal/intended functionality of the target IC. While conventional methods include using current measurements down the bus routed in a chain manner to trigger an event, such measurements are undesirable because routing the bus through the IC does not allow for recovery if an IC fails. Also, routing the bus through the IC may require additional output pins and can affect timing.

As an example of improvements provided by the present disclosure, 1331 target ICs attached to a host via a serial peripheral (e.g., SPI) bus can be individually powered up to full function using at most one additional pin on a target IC (e.g., assuming the target ICs have a traditional reset pin). For example, the first member (e.g., of the ID_GROUP) can be the re-purposed traditional reset pin. The second member (e.g., of the ID_GROUP) can be the chip-select line (e.g., CHIP_SEL) used on the serial peripheral bus. In such an embodiment, the normal function of the chip select line may be different during an ID assigning procedure. The third member (e.g., of the ID_GROUP) can be an additional pin on the target IC. Alternatively, the third member (e.g., of the ID_GROUP) may be a power supply detection circuit, which then uses zero additional pins on the target IC. In such an example, the host would need 11 reset instances, 11 chip-select instances, and 11 additional pin instances which can all be done with inexpensive IO expanders attached to the original serial peripheral (e.g., SPI) bus.

In various embodiments, members (e.g., signals) of the ID_GROUP 310 may be arranged in a chain arrangement. For example, a reset pin (e.g., 360) of the target IC can be chained to form one of the ID_GROUP members, requiring only one output pin per target IC. Embodiments of the present disclosure further provide for a recovery system in the case of a failure in the chain arrangement of ICs. This enables recovery of failed ICs which appear further down the chain of ICs.

Embodiments of the present disclosure further enable re-programming of an identification assigning or programming procedure. For example, 2 pins may be used in the ID_GROUP 310 in a given example, while in another example 4 pins may be used in the ID_GROUP 310. Moreover, the ID_GROUP 310, in certain embodiments, may comprise zero pins.

Figure 3B:
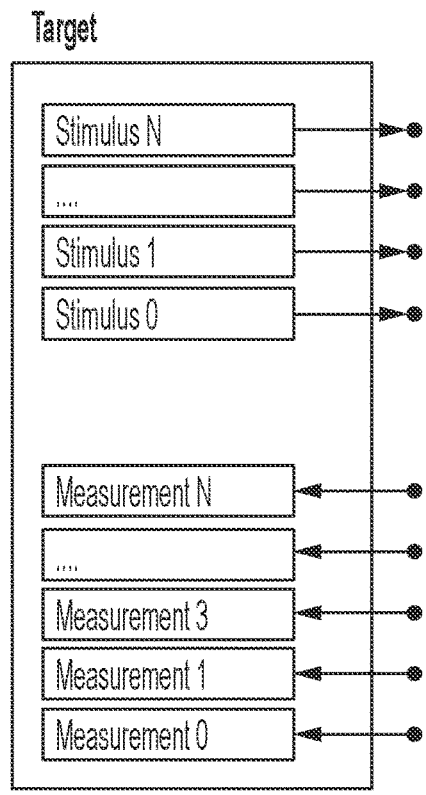
Figure 3C:
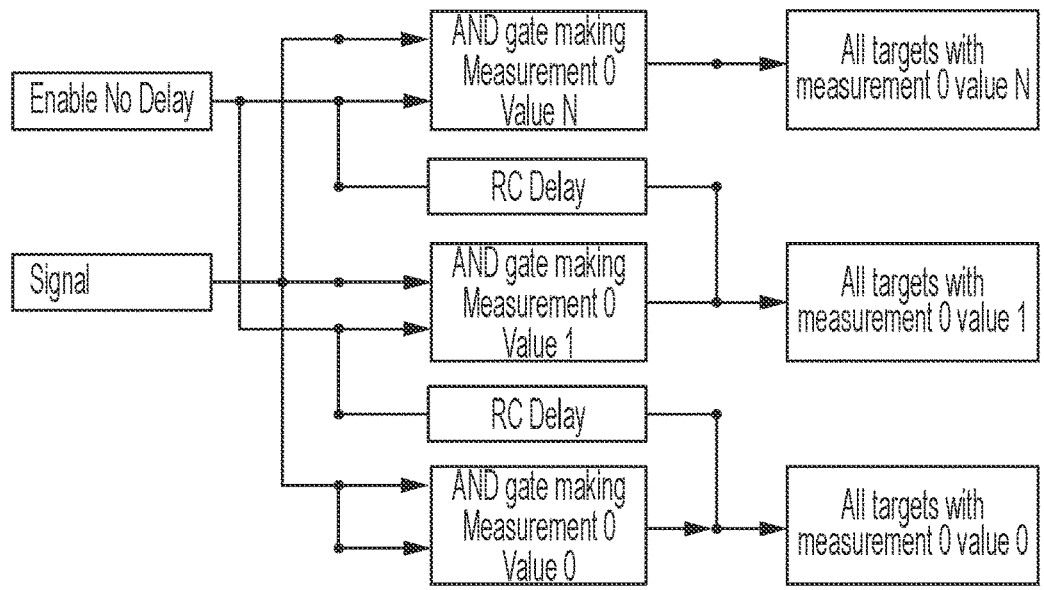

FIGS. 3B and 3C illustrate example embodiments and operations of subject matter described herein. Shown in FIG. 3B, each target device may have at least one measurement input (e.g., "Measurement 0," "Measurement 1," "Measurement 3," . . . "Measurement N") which, when measured at specific moments relative to the state of the ID assigning or programming procedure, may be used to determine a topologically unique CHIP_ID for the target device. The ID pin logic block (e.g., 318) may determine the raw state of the measurements. The ID logic (e.g., 320) may align the measurements with the state of the ID assigning or programming procedure, either automatically or via command from a host (e.g., 308).

In embodiments, the measurements may include a pin voltage, a supply voltage, a pin logic level, or the like. When combined with a state of the ID assigning or programming procedure, each measurement may provide a number of possible values to the target IC. If there are two values, the measurement may be considered a binary input measurement (e.g., or binary measurement). If there are more than two values, the measurement may be considered a non-binary input measurement (e.g., or non-binary input measurement).

As an example, 3 pins X, Y, Z may be the measurement inputs for each target. The system with which the targets are in communication has 10 different instances of each of X, Y, and Z. In such an example, each target has only a single X, Y and Z input to measure. Each instance of X, Y. and Z may be shared between 10 targets such that only one combination of each X, Y. and Z instance is attached to each target. This scheme allows the system to distinguish between 1000 possible targets. Accordingly, a number of instances per measurement may be defined as (Target count)^(1/number of measurements).

Also shown in FIG. 3B, each target device may have many or zero stimulus outputs (e.g., "Stimulus 0," "Stimulus 1," . . . "Stimulus N"). In embodiments, stimulus outputs may be used in chain arrangements to supply another target's measurement input. Examples of stimulus outputs include asserting voltages on a pin or enabling the output of a signal which is otherwise connected to another target. The ID logic (e.g., 320) may align the enablement of the stimulus output with the state of the ID assigning or programming procedure, either automatically or via command from a host (e.g., 308).

In example embodiments, a number of measurements needed when using an attached stimulus output is one. To identify isolated chains a number of "pull values" may be used and detected. The pull values can be communicated along the chain so that several measurements in sequence are learned and a unique CHIP_ID is discovered. In embodiments, a number of pull values needed may be defined as (target count)^(1/length of detectable chain). Pull values may be arranged so that there may be no repeated sequence of pull values equal to the length of the detectable chain.

Figure 3D:
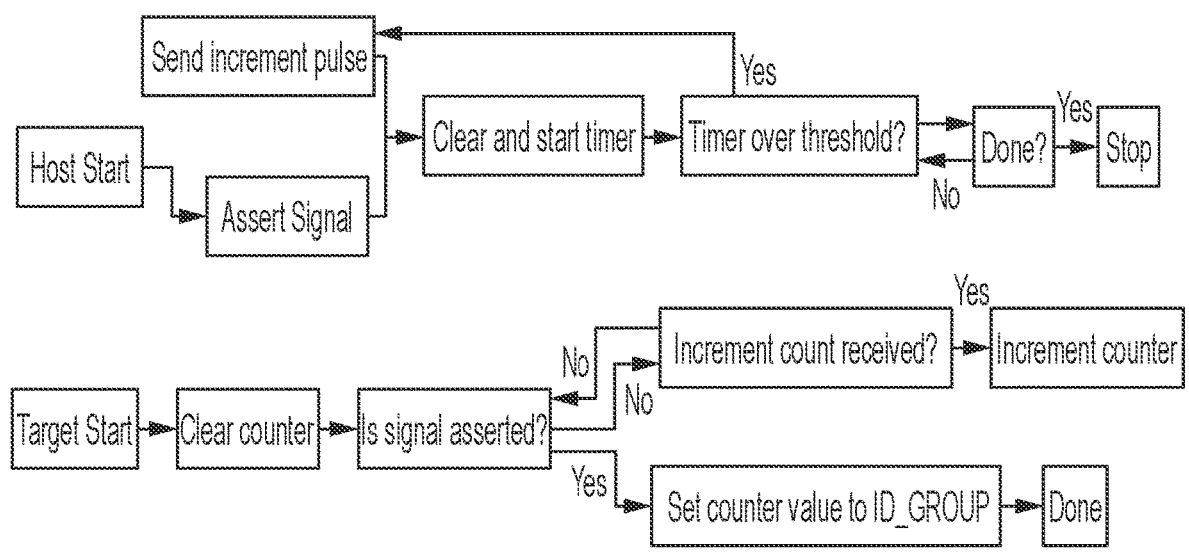

FIGS. 3C-3D illustrate example operations associated with subject matter described herein. Shown in FIGS. 3C and 3D, a given signal may be broken up into many measurements and possibly re-used.

In example embodiments, a given signal (e.g., "Signal") may be asserted. Value 0 will propagate immediately (e.g., "AND gate making Measurement 0 Value 0"), but there is an RC time delay (e.g., "RC Delay" or "input value measurement delay") between each subsequent value (e.g., "AND gate making Measurement 0 Value 1," etc.). The host (e.g., 308) monitors the time (e.g., a count of clock signals) and sends a pulse to the targets so that the targets increment their counters. When each target detects the signal, the count value is used as part of ID_GROUP 310. Using this technique for pin measurements is fast and may be performed simultaneously for all measurement types on all targets. When the measurements are completed and normal target IC functionality has started, the host (e.g., 308) can set an "Enable No Delay" signal so that the signal (e.g., "Signal") propagates to all targets with no delay (e.g., eliminating the "RC Delays") other than a possibly small delay of the AND gates/circuits. In this way the pin attached to "Measurement 0" on all targets becomes "Signal" during normal operation.

Figure 3E:
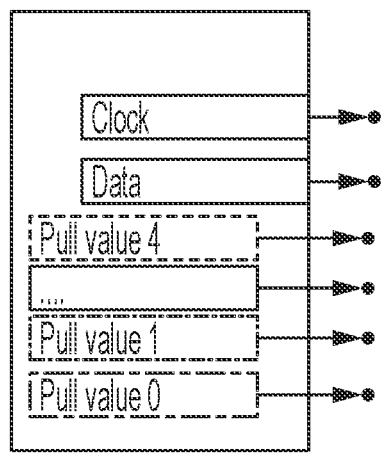
Figure 3E:
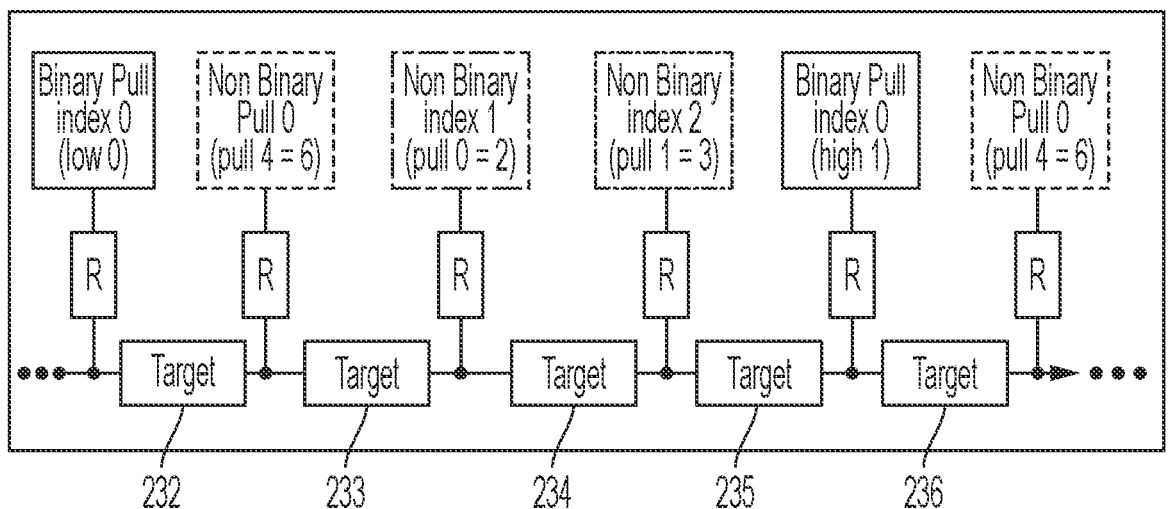

FIG. 3E illustrates an example embodiment of subject matter described herein. In FIG. 3E, a plurality of target ICs (e.g., "Target 232," "Target 233," "Target 234," "Target 235," "Target 236") is arranged according to a chain topology and is in communication with a master circuit (e.g., "Master Circuit"). In examples, the master circuit may be part of an FPGA.

In FIG. 3E, pull values (e.g., "Pull value 0," "Pull value 1," . . . "Pull value 4") are used to set the CHIP_ID. The pull values may include values sourced through a "pull" resistor, which is detected when the output of a connecting target is tri-stated. Non-binary pull values are values which can be toggled on and off relative a state of the ID assigning or programming procedure (e.g., relative to a host command, or command received from a host circuit or controller, comprising state information regarding the ID programming procedure). Binary pull values may be set to pull either high (e.g., "1" or a designated voltage level) or low (e.g., "0" or a designated voltage level).

In various embodiments, the location of every sequence of two or more (e.g., four (4)) targets may be detected. For example, starting from any target IC in the chain, the 4 pull values in sequence may not be found in any other sequence of 4 pull values either before or after the target. Each sequence of 4 pull values may consist of 1 binary pull up/down values and 3 non-binary pull values. This sequence can be used in a recovery step (described more fully below) or can be used to generate the CHIP_ID on each target.

In certain embodiments, a number of pull values may be defined as (array_length/detect_length/(2^binary_length))^(1/non_binary_length), which in this case is (1000/4/2)^(1/3)=5. Taking the integer ceiling results in 5 non-binary values.

Table 19 (below) illustrates the pull value entries for target 232 to target 236 are 0, 6, 2, 3, 1, 6, consistent with FIG. 3E. Further, Table 19 illustrates an example sequence of pull values for a chained arrangement of 1024 target ICs using pull up/down resistors. As mentioned above, starting from any target in the chain the 4 pull values in sequence are not found in any other sequence of 4 pull values. This means that, using this sequence, a location for any 4 contiguous target ICs may be detected. In alternative embodiments, if bidirectional pins are used for the outputs, then the sequence is unique for any 3 contiguous target ICs. In Table 19, the values 0 and 1 represent a standard pull down and pull up, while the values 2-6 represent pull values 0-4.

In alternative embodiments, if bidirectional pins are used, the number of contiguous target ICs required to determine location is one less than if unidirectional pins are used.

Figure 3F:
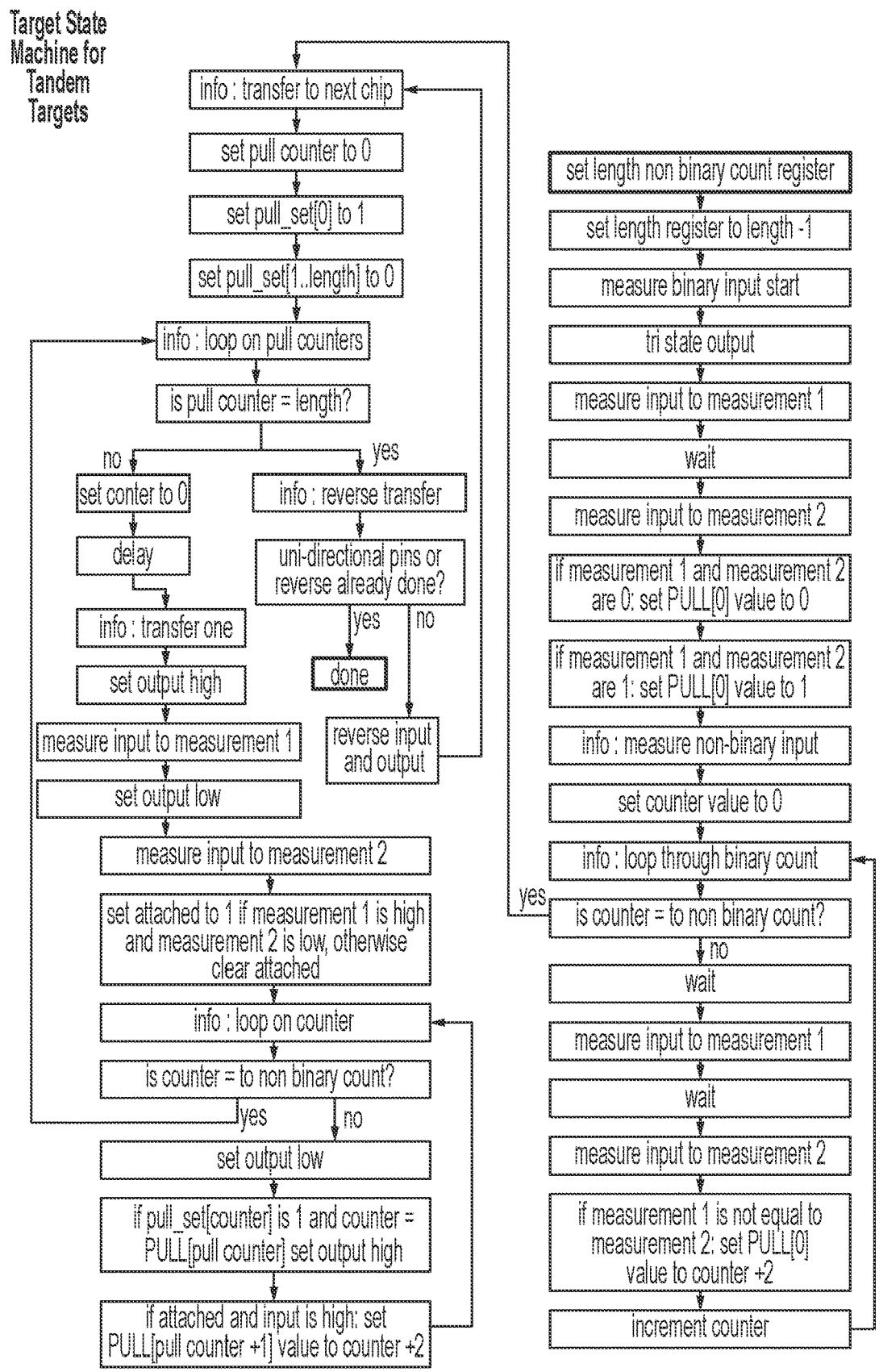
Figure 3G:
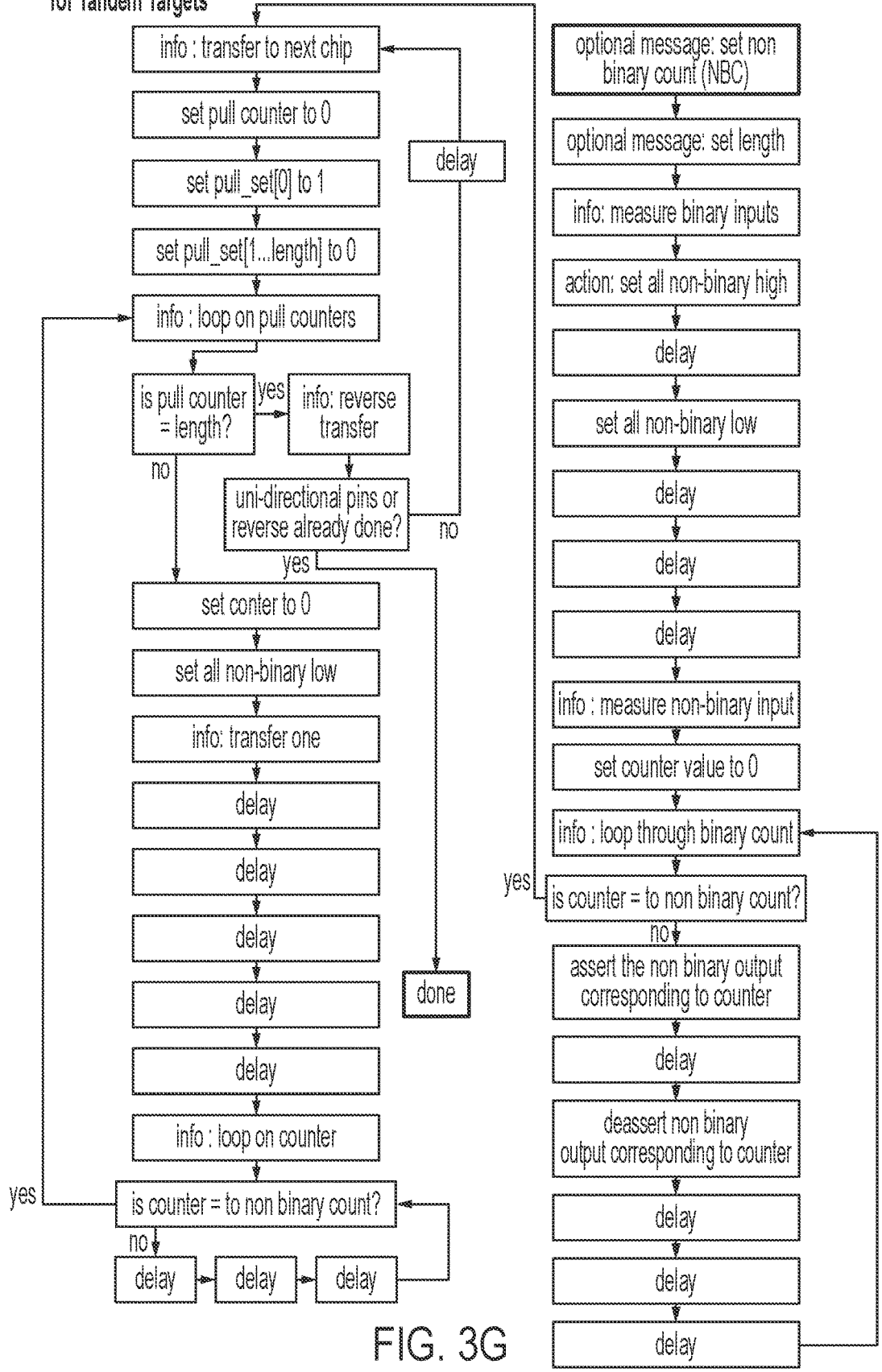
Figure 3H:
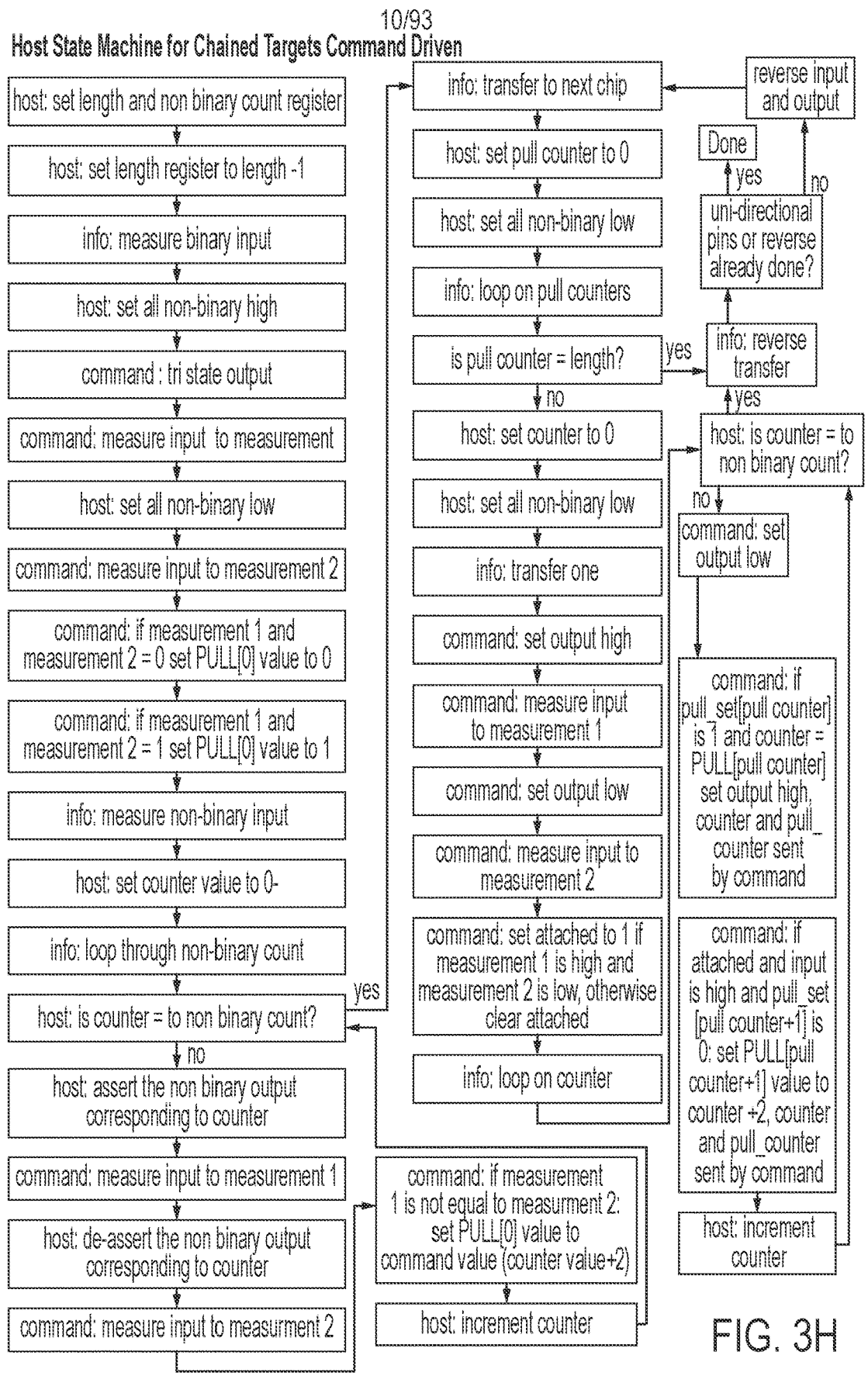

FIGS. 3F-3H illustrate example operations associated with subject matter described herein. FIG. 3F illustrates an example state machine for target ICs arranged in a chain topology. FIG. 3G illustrates an example state machine for a master, host, or otherwise controlling circuit for use with a plurality of target ICs arranged in a chain topology. FIG. 3H illustrates an example state machine for command driven programming of target ICs arranged in a chain topology using a host circuit. In FIGS. 3F-3H, a broadcast command, which may set up length parameters (e.g., number of non-binary and detect length), or synchronization pulse may enable the state machines. For example, a master circuit may provide a data pulse on the bus to indicate to an ensemble of target ICs that a state of the target IC should increment. Alternatively, the master circuit may provide a clock on the bus to deliver clocked logic to un-clocked target ICs.

FIGS. 4A and 4B illustrate example operations performed using various embodiments of the present disclosure. In FIGS. 4A and 4B, multiple ID_GROUP members and separate assert and de-assert masks are used to initiate an identification assigning procedure. In the example depicted in FIGS. 4A and 4B, each target IC has 3 ID_GROUP members: DIS[0 . . . M] is attached to the target reset signals; RSEL[0 . . . N] is attached to the target's bus chip select signal; and GSEL[0 . . . P] is attached to the target's bus latch signal. The GO signal is masked to enable when the DIS signals are asserted (target IC is out of reset). The reset signal is masked to assert when the DIS signal is de-asserted (target IC goes to reset). ID_GO is masked to assert when DIS and RSEL, and GSEL are asserted. ID_GO is masked to de-assert when RSEL or GSEL is de-asserted.

In the example shown in FIGS. 4A and 4B, the host can individually address M×N×P targets. The signals on the target IC are preferably routed to interleave the 3 signals as per FIG. 4A.

Accordingly, another dimension can easily be added to the configuration of FIGS. 4A and 4B. Using 4 pins or 3 pins and a power supply detector in this manner, with 10 instances from the host of each type, allows individual addressing of 10*10*10*10=10,000 targets. The reset pins in this example are static. Fault protection is high with this scheme since each target is individually addressable.

FIGS. 5A and 5B illustrate exemplary supply detection operations performed using various embodiments of the present disclosure. Shown in FIGS. 5A and 5B, supply detection and multiple ID_GROUP members with separate assert and de-assert masks are used to initiate an example identification assigning procedure. In FIGS. 5A and 5B, each target IC has 3 ID_GROUP members: ID_GROUP[0] is detected on each target when the AV supply comes up (e.g., A_V[0 . . . M]); RSEL[0 . . . N] is attached to the target's bus chip select signal; and GSEL[0 . . . P] is attached to the target's bus latch signal. The GO signal is masked to enable when the detected A_V signals are asserted (e.g., target IC is out of reset). The reset signal is masked to assert and de-assert with the reset pin as a normal chip reset. ID_GO is masked to assert when A_V is detected and RSEL, and GSEL are asserted. ID_GO is masked to de-assert when RSEL or GSEL is de-asserted.

Accordingly, the host can individually address M×N×P targets. The signals on the ICs are preferably routed to interleave the 3 signals as per FIG. 5A.

FIG. 6 illustrates an example array of integrated circuits for use with embodiments of the present disclosure. FIG. 6 illustrates the use of multiple identification bits repurposed from existing bus pins as well as separate assert and de-assert masks to initiate identification assigning for one or more of the integrated circuits of the array. In FIG. 6, a target integrated circuit design includes an SPI bus operating at 100 MHz using in-band addressing and at least one thousand twenty-four (1024) identical (e.g., or topologically indistinguishable) integrated circuits (ICs.) In this example, the ICs are un-clocked and use the SPI clock for logic progression. The ICs use an analog supply which can be detected to form part of the multiple identification bits.

In the example of FIG. 6, each IC includes a RESET OR DIS, SPI CHIP SELECT (e.g., repurposed from a normal SPI chip select), BRCST (e.g., a broadcast timing pin), and AVDD (e.g., analog supply detect performed on chip) signal. An example of an ID_GROUP mapping is shown below in Table 4. A signal "Done" is programmed by a host circuit (e.g., 308). The other SPI bus signals, CLK, MOSI, and MISO may be used to communicate with each integrated circuit serially during an identification assigning or programming procedure. By default, the ID_GO mask may be set to start on DIS.

TABLE 4

| Bit | 7 | 6 | 5 | 4 | 3 | 2 | 1 | 0 |
|---|---|---|---|---|---|---|---|---|
| ID_GROUP | Done | | | | AVDD | BRCST | RESET | CHIP SELECT |

The design illustrated in FIG. 6 can form part of a phased array with many identical (e.g., or topologically indistinguishable) target ICs which need to be topologically distinguished from the host perspective for reasons described herein. In this example, four ICs form an antenna, and four antennas form a beam (e.g., a beam includes 16 target ICs). Accordingly, there are 64 beams in the design shown in FIG. 7. The settings in target ICs may vary based on where they are among the topology of the design (e.g., where a given target IC is in relation to the other target ICs within the topology of the design), so in-band addressing protocols which use randomized addresses are unsuccessful in such a design.

In FIG. 7, a beam can point in a different direction from and co-operate with neighboring beams, therefore topological distinction is needed (e.g., an understanding of which beam is pointing in a given direction and how the beam is operating in relation to its neighboring beams is required for design functionality). In the example design shown in FIG. 7, each row of the beam array shares a RESET and each column of the beam array shares an AVDD voltage. As such, there are 8 resets and 8 analog supplies. To each beam the following signals are routed: 4 copies of BRCST, 4 copies of SPI chip select, 1 reset, 1 AVDD, and the rest of the SPI bus (SCLK, MOSI, and MISO).

FIG. 8 illustrates an example host circuit/controller design 901 for use with various embodiments of the present disclosure. In FIG. 8, an example host 901 may be composed of any processor or controller 902 with an SPI (e.g., or other suitable interface) bus 903. Attached to the host controller is a 16-bit IO expander 904 which can take SPI signals to independently generate 16 logic high or low signals. The 16-bit IO expander, in example embodiments, may be used to generate 8 reset signals (one for each row of beams) and 8 AVDD enable signals (one for each column of beams). The IO expander is controlled by the same SPI bus as the beam IC's but with a different out of band SPI chip select.

The example host 901 may further include an SPI controlled 8-bit high speed buffer 905 attached to the controller 902. The buffer 905 is controlled from the same SPI as the beams, but with a different chip select. The BRCST and SPI chip select for the target ICs are attached to the buffer inputs, and the buffer generates 4 separate copies of CHIP_SEL and BRCST, each of which can be independently disabled via the SPI to the buffer.

It will be appreciated that the host controller 902, the buffer 905, and the IO expander 904 are examples and, any suitable methodology for generating signals for use herein are within the scope of the present disclosure.

From the host controller 902 the following signals are routed: 4 copies of BRCST to each beam, 4 copies of SPI chip select to each beam, 1 reset to each row of beams, 1 AVDD enable to each beam column AVDD regulator. The rest of the SPI bus (SCLK, MOSI, and MISO) to all beams. The 10 bits of each IC's CHIP_ID may be formed according to Table 5.

TABLE 5

| Bit     | 9         | 8 | 7                 | 6 | 5          | 4 | 3 | 2 | 1              | 0 |
|---------|-----------|---|-------------------|---|------------|---|---|---|----------------|---|
| CHIP_ID | BRCST[0-3] |   | CHIP_SEL<br>[0-3] |   | AVDD[0...7] |   |   |   | RESET<br>[0-7] |   |

FIGS. 9A, 9B, and 9C illustrate example operations performed according to various embodiments of the present disclosure. Shown in FIG. 9A, a host circuit or controller 902 (e.g., upon power up or boot up of the host circuit or controller 902), may program a RESET 0 signal 1001 to de-assert an associated reset signal. Accordingly, targets or ICs connected to RESET 0 (e.g., 1001) are pulled out of reset (e.g., shown in bold in FIGS. 9B, 9C). An identification circuit of each target or IC detects that reset is disabled and sets its ID_GROUP[0] which matches a mask of 1. In this manner, ID_GO is set which enables the identification assigning circuit or logic. The functional blocks or circuits of each integrated circuit/IC or target remain in reset under the control of the identification circuit (e.g., ID block).

Those ICs attached to RESET 0, shown in bold, are now listening and their ID_GO is active.

At this point, shown in FIG. 9B, the bottom row of the beam array has its state indicators updated to L0, indicating they are listening for commands on the communication bus and have had 0 CHIP_ID programming events. It will be appreciated that, throughout the description herein, state indicators of target ICs (e.g., L0, L1, L2, L3, L4, and the like) refer to a number of prior programming events a target IC has been through.

Subsequently, the host circuit or controller (e.g., 902) sends a write register command to CHIP_ID address: VALUE: 0 MASK:0x3F8. Here, common parameters may include: ID_INDEX: 0, GROUP MASK and GROUP VALUE: RESET_DIS, ID_COUNTER_VAL:0, EQUAL: ON, ID_MASK and ID_VALUE:0.

The command, mask, and value will set the bottom 3 bits (e.g., least significant bits) of CHIP_ID to zero for all ICs that were listening with 0 prior ID programming commands. The chip ID programming counter is also incremented.

FIGS. 10A, 10B, and 10C illustrate example operations performed according to various embodiments of the present disclosure. In FIGS. 10A, 10B, and 10C, continuing from FIG. 9A, the host circuit or controller 902 programs or asserts a RESET 1 signal 1002 to de-assert an associated reset signal (e.g., shown in bold in FIG. 9A).

Shown in FIG. 10B, the bottom row of ICs of the beam array have their state indicators updated to L1 since their chip ID program counter had incremented to 1 as a result of the operations associated with FIGS. 9A-9C. The second row of ICs show L0 as state indicators indicating they are listening to commands and have had 0 CHIP_ID programming events. The RESET chains that are enabled are shown in bold.

In a next step, the host circuit or controller 902 sends a write register command to CHIP_ID address: VALUE: 1 MASK:0x3F8. Here, common parameters may include: ID_INDEX: 0, GROUP MASK and GROUP VALUE: DIS, ID_COUNTER_VAL:0, EQUAL: ON, and ID_MASK and ID_VALUE:0.

The command, mask, and value command will set the bottom 3 bits (e.g., least significant bits) of CHIP_ID to ID_VALUE for all ICs that were listening with 0 prior ID programming commands. The chip ID programming counter is also incremented.

The bottom row of ICs of the beam array is unaffected by the broadcast command since the COUNTER VAL is not equal to 1.

Subsequently, the preceding steps are repeated (e.g., incrementing the VALUE and the RESET pin by one each two steps) in order to achieve all ICs being pulled out of reset.

FIGS. 11A, 11B, and 11C illustrate example operations performed according to various embodiments of the present disclosure. After each of the ICs of the beam array has been pulled out of reset, as shown in FIGS. 11A, 11B, and 11C, each of the ICs has also had one CHIP_ID programming event (e.g., programming bits 0-2 of the associated CHIP_ID register). Each of the ICs also show L1. Table 6 below represents the resulting CHIP_ID programming associated with RESET 0-RESET 7.

TABLE 5

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | BRCST[0-3] | | CHIP_SEL [0-3] | | AVDD[0 ... 7] | | | | RESET [0-7] | |

TABLE 6

| | Bit | | | | | | | | | |
|---|---|---|---|---|---|---|---|---|---|---|
| CHIP_ID | 9 | 8 | 7 | 6 | 5 | 4 | 3 | 2 | 1 | 0 |
| RESET 0 | x | x | x | x | x | x | x | 0 | 0 | 0 |
| RESET 1 | x | x | x | x | x | x | x | 0 | 0 | 1 |
| RESET 2 | x | x | x | x | x | x | x | 0 | 1 | 0 |
| RESET 3 | x | x | x | x | x | x | x | 0 | 1 | 1 |
| RESET 4 | x | x | x | x | x | x | x | 1 | 0 | 0 |
| RESET 5 | x | x | x | x | x | x | x | 1 | 0 | 1 |
| RESET 6 | x | x | x | x | x | x | x | 1 | 1 | 0 |
| RESET 7 | x | x | x | x | x | x | x | 1 | 1 | 1 | x = unprogrammed

FIGS. 12A, 12B, and 12C illustrate example operations performed according to various embodiments of the present disclosure. In a next step, shown in FIG. 12A, the host controller 902 asserts (e.g., turns on) AVDD_EN 0 1003. Identification circuits (e.g., 304) of the integrated circuits detect the analog voltage AVDD and enable ID_GROUP[1]. Active AVDD and RESET chains are shown in bold in FIGS. 12A, 12B, and 12C.

Subsequently, the host controller 902 sends a write register command to CHIP_ID address: VALUE: 0 MASK: 0x3C7. Here, common parameters may include: ID_INDEX: 0, GROUP MASK and GROUP VALUE: DIS, ID_COUNTER_VAL:1, EQUAL: ON, ID_MASK and ID_VALUE: 0. The chip ID programming counter is also incremented.

FIGS. 13A, 13B, and 13C illustrate example operations performed according to various embodiments of the present disclosure. The preceding steps (e.g., described with respect to FIGS. 12A-12C whereby an AVDD_EN is asserted) are repeated for AVDD_EN 1 through 7, using the index value of AVDD_EN for the VALUE in each programming step. Once this is completed, as shown in FIGS. 13A, 13B, and 13C, the integrated circuits have been pulled out of reset, the integrated circuits now have AVDD applied, and each of the integrated circuits has now had two ID programming events (e.g., programming bits 0-5 of the CHIP_ID register). Further, each integrated circuit shows L2. Table 7 below shows the resulting CHIP_ID programming after assertion of AVDD 0-AVDD 7.

TABLE 5

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | BRCST[0-3] | | CHIP_SEL [0-3] | | AVDD[0 ... 7] | | | | RESET [0-7] | |

TABLE 7

| | Bit | | | | | | | | | |
|---|---|---|---|---|---|---|---|---|---|---|
| CHIP_ID | 9 | 8 | 7 | 6 | 5 | 4 | 3 | 2 | 1 | 0 |
| AVDD 0 | x | x | x | x | 0 | 0 | 0 | z | z | z |
| AVDD 1 | x | x | x | x | 0 | 0 | 1 | z | z | z |
| AVDD 2 | x | x | x | x | 0 | 1 | 0 | z | z | z |
| AVDD 3 | x | x | x | x | 0 | 1 | 1 | z | z | z |
| AVDD 4 | x | x | x | x | 1 | 0 | 0 | z | z | z |
| AVDD 5 | x | x | x | x | 1 | 0 | 1 | z | z | z |
| AVDD 6 | x | x | x | x | 1 | 1 | 0 | z | z | z |
| AVDD 7 | x | x | x | x | 1 | 1 | 1 | z | z | z | z = RESET[ ]
x = unprogrammed

FIGS. 14A, 14B, and 14C illustrate example operations performed according to various embodiments of the present disclosure. Shown in FIG. 14A, a host controller 902 asserts (e.g., turns on) CHIP_SEL 0 1004. Identification assigning circuits (e.g., 304) of each integrated circuit of the beam array then set ID_GROUP[2]. Accordingly, chains of integrated circuits associated with CHIP_SEL 0 are active (e.g., shown in bold in FIGS. 14B and 14C), the integrated circuits are out of reset, the integrated circuits have AVDD applied, and the integrated circuits have had two ID programming events (e.g., programming bits 0-5 of the CHIP_ID register).

Subsequently, the host controller 902 sends a write register command to CHIP_ID address: VALUE: 0 MASK: 0x33F. Here, common parameters may include: ID_INDEX: 0, GROUP MASK and GROUP VALUE: RESET_DIS, ID_COUNTER_VAL:2, EQUAL: ON, ID_MASK and ID_VALUE: 0.

The chip ID programming counter is also incremented after the programming step, setting the state to L3 as indicated in FIGS. 14B and 14C. Here, all beams of the beams array have integrated circuits which are at states L2 and L3.

FIGS. 15A, 15B, and 15C illustrate example operations performed according to various embodiments of the present disclosure. The preceding steps (e.g., whereby the host circuit asserts a CHIP_SEL signal) are repeated for CHIP_SEL 1 through 3, using the index value of CHIP_SEL for the VALUE in each programming step. As shown in FIGS. 15A, 15B, and 15C, the integrated circuits are now out of reset, the integrated circuits have AVDD applied, and the integrated circuits have now had three ID programming events (e.g., programming bits 0-7 of the CHIP_ID register). Further, the integrated circuits show a state of L3. Table 8 below illustrates the resulting CHIP_ID programming after CHIP_SEL 0-CHIP_SEL 3.

TABLE 5

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | BRCST[0-3] | | CHIP_SEL [0-3] | | AVDD[0 ... 7] | | | | RESET [0-7] | |

TABLE 8

| | Bit | | | | | | | | | |
|---|---|---|---|---|---|---|---|---|---|---|
| CHIP_ID | 9 | 8 | 7 | 6 | 5 | 4 | 3 | 2 | 1 | 0 |
| CHIP_SEL 0 | x | x | 0 | 0 | z | z | z | z | z | z |
| CHIP_SEL 1 | x | x | 0 | 1 | z | z | z | z | z | z |

TABLE 8-continued

| CHIP_ID | Bit | | | | | | | | | |
|---|---|---|---|---|---|---|---|---|---|---|
| | 9 | 8 | 7 | 6 | 5 | 4 | 3 | 2 | 1 | 0 |
| CHIP_SEL 2 | x | x | 1 | 0 | z | z | z | z | z | z |
| CHIP_SEL 3 | x | x | 1 | 1 | z | z | z | z | z | z | z = programmed
x = unprogrammed

FIGS. 16A, 16B, and 16C illustrate example operations performed according to various embodiments of the present disclosure. In FIG. 16A, the host controller 902 asserts (e.g., turns on) BRCST 0 1005. Identification assigning circuits (e.g., 304) of each integrated circuit of the beam array set ID_GROUP[3]. Chains of integrated circuits associated with BRCST 0 1005 are active (e.g., shown in bold in FIGS. 16B and 16C).

As shown in FIGS. 16B and 16C, the integrated circuits are now out of reset, the integrated circuits have AVDD applied, and the integrated circuits have now had two ID programming events (e.g., programming bits 0-5 of the CHIP_ID register).

Subsequently, the host controller 902 sends a write register command to CHIP_ID address: VALUE: 0 MASK: 0x0FF. Here, common parameters may include: ID_INDEX: 0, GROUP MASK and GROUP VALUE: DIS, ID_COUNTER_VAL:3, EQUAL: ON, ID_MASK and ID_VALUE: 0.

The mask, value, and command will set bits 6 and 7 of CHIP_ID to VALUE for those integrated circuits that were listening and that had 3 prior CHIP_ID programming commands. The chip ID programming counter is also incremented after the programming step, setting the state to L3 as indicated in FIGS. 16B and 16C. All beams have ICs which are at states L3 and L4 (also shown in FIGS. 16B and 16C).

FIGS. 17A, 17B, and 17C illustrate example operations performed according to various embodiments of the present disclosure. Shown in FIGS. 17A, the preceding steps (e.g., whereby the host controller asserts a BRCST signal) are repeated for BRCST 1 through 3, using the index value of BRCST for the VALUE in each programming step. As shown in FIGS. 17B and 17C, the integrated circuits are now out of reset, the integrated circuits have AVDD applied, and the integrated circuits have now had four ID programming events (e.g., programming bits 0-9 of the CHIP_ID register). All integrated circuits are at states L4. Table 9 below illustrates the resulting CHIP_ID programming after asserting BRCST 0-BRCST 3.

TABLE 5

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | BRCST[0-3] | | CHIP_SEL [0-3] | | AVDD[0 ... 7] | | | | RESET [0-7] | |

TABLE 9

| CHIP_ID | Bit | | | | | | | | | |
|---|---|---|---|---|---|---|---|---|---|---|
| | 9 | 8 | 7 | 6 | 5 | 4 | 3 | 2 | 1 | 0 |
| BRCST 0 | 0 | 0 | z | z | z | z | z | z | z | z |
| BRCST 1 | 0 | 1 | z | z | z | z | z | z | z | z |

TABLE 9-continued

| CHIP_ID | Bit | | | | | | | | | |
|---|---|---|---|---|---|---|---|---|---|---|
| | 9 | 8 | 7 | 6 | 5 | 4 | 3 | 2 | 1 | 0 |
| BRCST 2 | 1 | 0 | z | z | z | z | z | z | z | z |
| BRCST 3 | 1 | 1 | z | z | z | z | z | z | z | z | z = programmed
x = unprogrammed

Accordingly, all of the integrated circuits of FIGS. 17A, 17B, and 17C have fully programmed CHIP_ID registers. Thus, the host controller 902 may address (e.g., select) any integrated circuit of the beam array based on its location using its CHIP_ID in band address.

In alternative embodiments, the host controller 902 may send a broadcast command write register to program a customer ID. The host controller 902 may also alternatively send a broadcast command write register to program common customer ID data. The host controller 902 may also alternatively send specific commands (e.g., Send ACK) to an individual ICs CHIP_ID for verification. The host controller 902 may also alternatively send broadcast commands write register to enable any encryption. The host controller 902 may also alternatively send specific commands write register to individual ICs using the ICs CHIP_ID to program customer data registers before initializing the ICs. The host controller 902 may also optionally send a broadcast command to disable ID programming or assigning, which enables functional circuitry for each of the integrated circuits of the array.

FIGS. 18A, 18B, and 18C illustrate example operations performed according to various embodiments of the present disclosure. In FIG. 18A, the host controller 902 may switch modes and not use the serial mode for SPI data any longer. Accordingly, the "BUS" is now the "HOST BUS" (e.g., as opposed to a bus for purposes of identification programming or assigning) and operates in that fashion. In such an example, the host controller 902 can now use its SPI to communicate with the functional blocks (e.g., functional circuitry of each integrated circuit). Chip selection may all be in the SPI packet and the chip select is largely used for framing packets. The host controller 902 has awareness of the location corresponding to each CHIP_ID so that adjacent integrated circuits can act in concert.

In the examples depicted in FIGS. 6-18C, a total of seven (7) pins were used on the host controller. There was one IO expander and one buffer (e.g., each costing 50.50 or less). There were a 24 broadcast commands to program the CHIP_ID. An estimate for an upper bound for the time used, assuming a generous 64 bits per command and a slow 1 MHz serial clock, is less than 1.6 milliseconds. There were 1024 identical target ICs (e.g., topologically indistinguishable and all having an identification assigning circuit) which used no additional pins from their target single chip design. For a target IC to work, in certain embodiments, a design may include SPI-SPI CLK, MOSI, MISO, chip select, a broadcast pin, and reset.

FIG. 19 illustrates an example architecture with a plurality of integrated circuits in a chain arrangement, according to various embodiments of the present disclosure. In an example chain arrangement, each integrated circuit has an ID_GROUP pin connected to an ID_GROUP pin of another integrated circuit, which has an ID_GROUP pin connected to yet another integrated circuit, and so on. It will be appreciated that any bus pin can be repurposed as an input pin for the chain arrangement. In examples, a reset pin may be used as an input pin for a chain arrangement because the ID assigning circuit (e.g., 304) may include a power on reset block. ID assigning success can be verified for each target IC before continuing over the communication interface. The RECOVER signal is sent when CHIP_ID verification failures occur. The RECOVER signal is received by those ICs which can receive them and enables an alternate set of active masks. For long chains, the host can reduce the chain length being programmed by using controllable fan out buffers. When in recovery, the host may mark the location of a recovered IC (e.g., its location sense lines intersect). Using that information and prior knowledge of the system layout, the host can determine the topology of the recovered target chains.

FIG. 20 illustrates an example architecture with a plurality of integrated circuits in a chain arrangement, according to various embodiments of the present disclosure. In FIG. 20, a chain arrangement of ICs is mixed with other members of the ID_GROUP. In this example, each target IC has 2 ID_GROUP members as follows: the target ICs share the same reset, which is chained within each rank and group: RSEL[0 . . . N] is attached to the target IC's bus chip select signal, GSEL[0 . . . P] is attached to the target IC's bus latch signal, the GO signal is masked to enable when the target IC is out of reset and GSEL and RSEL are asserted.

The reset signal is masked to assert and de-assert with the reset pin as a normal chip reset. ID_GO is masked to assert when RSEL, and GSEL are asserted. ID_GO is masked to de-assert when RSEL is de-asserted. The host can individually address M×N×P target ICs by the using the flow diagram depicted in FIG. 21 (e.g., FIG. 21 illustrates example operations for use with embodiments of the present disclosure). The signals on the board are preferably routed to interleave the 2 signals.

FIG. 22 illustrates an example block diagram of a plurality of integrated circuits in a chain arrangement, according to various embodiments of the present disclosure. In the example shown in FIG. 22, recover is implemented as a message. The recover message is isolated to the block whose buffer was enabled last. Reset disable is repurposed as the sole member of ID_GROUP. Location signals isolated by buffers are used to help discover the topology in a recover sequence. GO is enabled at power on. ID_GO and Reset are both controlled by the reset pin. FIG. 23 illustrates an example flow chart depicting operations associated with the example architecture depicted in FIG. 22.

FIG. 24 illustrates an example timing diagram for programming identification for a plurality of integrated circuits (e.g., "Chip_0," "Chip_1," "Chip_2," "Chip_3," "Chip_N") in a chain arrangement, according to various embodiments of the present disclosure. In FIG. 24, serial data is sent to each IC. A host circuit or controller (e.g., by way of a state machine depicted in FIG. 23) programs the CHIP_ID and causes the subsequent disabling of reset to occur.

FIG. 25 illustrates an example cluster (e.g., sensor cluster) for use with various embodiments of the present disclosure. Shown in FIG. 25, a plurality of integrated circuits, each having an identification circuit (e.g., 304), is arranged in a chain arrangement. The design (e.g., one sensor cluster of a robot arm) depicted in FIG. 25 has an QSPI bus operating at 100 MHz using in-band addressing and at least 1024 identical ICs (e.g., or topologically indistinguishable ICs). The ICs are part of a robotic sensor array and need topological distinction. The ICs may be un-clocked and use the QSPI clock for logic progression. The ICs use a chained reset, although the ID assigning portion of each IC is a power on reset. That is, each IC (with the exception of a first IC in the chain arrangement) is connected via its RESET IN to a RESET OUT of a preceding integrated circuit in the chain arrangement. The ID_GROUP members (shown in Table 10 below) are: RESET, CS, or SPI CHIP SELECT, repurposed from the normal SPI chip select, two register settings (e.g., RECOVER—set when the device is in recovery, HEAD—set when the device is in recovery and the detected head of a chain of devices, Done—set by the host when the device ID programming is completed, and Output—set by the hardware when the chain output is configured as an input.

The other SPI bus signals, CLK, DATA 0-3 are used to communicate with the integrated circuit serially during ID assigning. By default, the ID_GO mask is set to start on power up of the digital core. Using power on reset will enable recovery if there are damaged sensors.

TABLE 10

| Bit | 7 | 6 | 5 | 4 | 3 2 | 1 | 0 |
|---|---|---|---|---|---|---|---|
| ID_GROUP | Done | Head | Recover | Output | | RESET | CHIP SELECT |

FIG. 26 illustrates an example cluster array for use with various embodiments of the present disclosure. In FIG. 26, a cluster array is illustrated, where the cluster array is made up of 64 sensor clusters (e.g., as depicted in FIG. 25). The sensor clusters comprise a plurality of integrated circuits in a chain arrangement. The design depicted in FIG. 26 forms part of a robotic arm and hand sensor harness with many identical ICs (e.g., or topologically indistinguishable ICs) which need to be topologically distinguished because each cluster and each sensor within the cluster has a specific location on the robot's arm. The ICs are mounted on a flexible circuit board and provide several sensor readings from each IC. Embodiments of the present disclosure enable the host to have knowledge of the location of each sensor even though they are identical integrated circuits (e.g., or otherwise appear indistinguishable to the host). The CHIP_ID settings in each IC may vary based on where they are within the cluster array, so conventional in-band addressing protocols which use randomized addresses are unsuccessful in such an arrangement.

In FIG. 26, there are 8 resets and 8 chip selects which use ID assigning as described herein select individual clusters. To each cluster are routed: one Reset, one CHIP SELECT (CS), the rest of the QSPI bus (SCLK, DATA[0-3]), and power.

FIG. 27 illustrates an example host/controller design for use with various embodiments of the present disclosure. In FIG. 27, an example host 2001 is composed of any processor or controller 2002 with a QSPI (e.g., or other appropriate interface) bus 2004. Attached to the host controller 2002 is an 8-bit IO expander 2003 which can take SPI signals to independently generate 16 logic high or low signals. The IO expander may be used to generate 8 reset signals (one for each row of sensor clusters). The IO expander 2003 may be controlled by the same QSPI bus 2004 as the sensor cluster IC's but with a different out of band SPI chip select.

An example host 2001 may also include an SPI controlled 8-bit high speed buffer 2005 attached to the controller 2002. The buffer 2005 may be controlled from the same SPI bus 2004 as the clusters, but with a different chip select. The SPI chip select for the target ICs may be attached to the buffer 2005 inputs and the buffer 2005 generates 8 separate copies of CHIP_SEL each of which can be independently disabled via the SPI bus 2004 to the buffer 2005. The 8 CHIP_SEL (CS) signals control a column of a cluster array during CHIP_ID programming. It will be appreciated that the host controller 2002, buffer 2005, and IO expander 2003 are examples, and methods or circuitry for generating signals for use herein are within the scope of the present disclosure.

From the host are routed one chip select to each column of sensor clusters, one reset to each row of beams, the rest of the QSPI bus (SCLK, DATA[0-3]) to the clusters.

The 10 bits of each IC's CHIP_ID register may be formed according to Table 11.

TABLE 11

| Bit | 9 | 8 | 7 | 6 | 5 | 4 | 3 | 2 | 1 | 0 |
|---|---|---|---|---|---|---|---|---|---|---|
| CHIP_ID | Chain Location [0-31] | | | CHIP SEL[0 . . . 7] | | | RESET[0-7] | | | |

FIGS. 28A, 28B, and 28C illustrate example operations performed according to various embodiments of the present disclosure. In FIG. 28A, a host controller 2002 powers up or performs a boot sequence. Upon power on of the host controller, integrated circuits in the clusters of the cluster array are listening with 0 CHIP_ID programming events (e.g., at state L0). This is due to the identification circuit of each integrated circuit being configured for power on reset (e.g., and the ID_GO mask is set to assert at power on).

The functional blocks (e.g., functional circuitry) of each IC remain in reset under the control of the ID block (e.g., identification circuit). In FIG. 28A, the host controller 2002 may de-assert RESET 0 2010, enabling the chain of integrated circuits associated with RESET 0 (shown in bold in FIGS. 28A, 28B, 28C).

Subsequently, the host controller 2002 may send a write register command to a CONTROL register address to set bit 0 to 1: VALUE: 1 MASK:0xFFFE. Here, common parameters may include: ID_INDEX: 0, GROUP MASK: 0 GROUP VALUE: 0, ID_COUNTER_VAL:0, EQUAL: OFF ID_MASK and ID_VALUE:0. Because the integrated circuits in the cluster array are in a listening mode and the common parameters select any listener, the integrated circuits in the cluster array may execute the write register command. Setting the CONTROL register address bit from 0 to 1 will cause the integrated circuits to propagate their chain inputs to their chain outputs. Since the bottom row (e.g., as shown in FIGS. 28B and 28C) has their chain input on, that row will have their chain fully enabled (e.g., shown in FIGS. 29A and 29B).

Subsequently, the host controller 2002 may send a write register command to the CHIP_ID register address: VALUE: 0 MASK:0x3F8. Here, common parameters may include: ID_INDEX: 0, GROUP MASK and GROUP VALUE: RESET_IN, ID_COUNTER_VAL:0, EQUAL: ON, ID_MASK and ID_VALUE:0. Those ICs with RESET_IN on will respond to this command. This causes the CHIP_ID register of an IC to update bits 0-2 to the value in the write register command and increment their ID programming counter.

FIGS. 30A, 30B, and 30C illustrate example operations performed according to various embodiments of the present disclosure. In FIG. 30A, the host controller 2002 de-asserts RESET 1 2011, enabling the chain of integrated circuits associated with RESET 1. The clusters of ICs attached to RESET 0 are in L1 having had their reset field programmed in the last step (e.g., shown in bold FIGS. 30B and 30C). It is noted that, since CONTROL bit 0 (propagate bit) was set to the ICs, the RESET_IN is propagated to reset out.

Subsequently, the host controller 2002 may send a write register command to the CHIP_ID register address: VALUE: 1 MASK:0x3F8. Here, common parameters ma include: ID_INDEX: 0, GROUP MASK and GROUP VALUE: RESET_IN, ID_COUNTER_VAL:0, EQUAL: ON, ID_MASK and ID_VALUE:0. Those ICs with RESET_IN on and 0 prior programming events will respond to this command. This write register command causes the CHIP_ID register to update bits 0-2 to the value in the write register command and increment their ID programming counter.

FIGS. 31A, 31B, and 31C illustrate example operations performed according to various embodiments of the present disclosure. In FIG. 31A, the preceding steps (e.g., whereby a RESET signal is asserted by the host controller) are repeated for RESET N where N is 2 through 7 using N as the value in the write register command. Subsequently, and shown in bold in FIGS. 31B and 31C, the ICs are now out of reset, the ICs have now had one ID programming event (e.g., programming bits 0-2 of the CHIP_ID register), and the ICs are in a state of L1. Table 12 below illustrates the resulting CHIP_ID programming after RESET 0-RESET 7.

TABLE 11

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | Chain Location [0-31] | | | CHIP_SEL[0 . . . 7] | | | RESET[0-7] | | | |

TABLE 12

| CHIP_ID | Bit | | | | | | | | | |
|---|---|---|---|---|---|---|---|---|---|---|
| | 9 | 8 | 7 | 6 | 5 | 4 | 3 | 2 | 1 | 0 |
| RESET 0 | x | x | x | x | x | x | x | 0 | 0 | 0 |
| RESET 1 | x | x | x | x | x | x | x | 0 | 0 | 1 |
| RESET 2 | x | x | x | x | x | x | x | 0 | 1 | 0 |
| RESET 3 | x | x | x | x | x | x | x | 0 | 1 | 1 |
| RESET 4 | x | x | x | x | x | x | x | 1 | 0 | 0 |
| RESET 5 | x | x | x | x | x | x | x | 1 | 0 | 1 |
| RESET 6 | x | x | x | x | x | x | x | 1 | 1 | 0 |
| RESET 7 | x | x | x | x | x | x | x | 1 | 1 | 1 | x = unprogrammed

FIGS. 32A, 32B, and 32C illustrate example operations performed according to various embodiments of the present disclosure. In FIG. 32A, the host controller 2002 may set (e.g., assert) CS 0 2020, enabling CHIP_SEL for each IC in a cluster of ICs attached to CS 0 2020.

The host controller 2002 may then send a write register command to the CHIP_ID register address: VALUE: 0 MASK:0x3C7. Here, common parameters may include: ID_INDEX: 0, GROUP MASK and GROUP VALUE: CHIP_SEL, ID_COUNTER_VAL:1 EQUAL: ON ID_MASK and ID_VALUE:0. Those ICs with CHIP_SEL on and 1 prior programming event will respond to this command. This write register command causes the CHIP_ID register to update bits 3-5 to the value in the write register command and increment the ID programming counter. The column of the cluster array attached to CS 0 is updated to L2 indicating they have had 2 prior programming events (e.g., shown in bold in FIGS. 32B and 32C).

FIGS. 33A, 33B, and 33C illustrate example operations performed according to various embodiments of the present disclosure. Shown in FIGS. 33A, 33B, and 33C, the preceding steps (e.g., whereby the host controller asserts a CS signal) are repeated for CS [N] where N is 1 through 7 using N as the value in the write register command.

FIGS. 34A, 34B, and 34C illustrate example operations performed according to various embodiments of the present disclosure. Shown in FIGS. 34A, 34B, and 34C, the ICs are now out of reset, the ICs have now had two ID programming events (e.g., programming bits 0-5 of the CHIP_ID register), and the ICs show L2 as a state. Table 13 below illustrates the resulting CHIP_ID programming after CS 0-CS 7.

TABLE 11

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | Chain Location [0-31] | | | | CHIP_SEL[0 . . . 7] | | | RESET[0-7] | | |

TABLE 13

| | Bit | | | | | | | | | |
|---|---|---|---|---|---|---|---|---|---|---|
| CHIP_ID | 9 | 8 | 7 | 6 | 5 | 4 | 3 | 2 | 1 | 0 |
| CS 0 | x | x | x | x | 0 | 0 | 0 | z | z | z |
| CS 1 | x | x | x | x | 0 | 0 | 1 | z | z | z |
| CS 2 | x | x | x | x | 0 | 1 | 0 | z | z | z |
| CS 3 | x | x | x | x | 0 | 1 | 1 | z | z | z |
| CS 4 | x | x | x | x | 1 | 0 | 0 | z | z | z |
| CS 5 | x | x | x | x | 1 | 0 | 1 | z | z | z |
| CS 6 | x | x | x | x | 1 | 1 | 0 | z | z | z |
| CS 7 | x | x | x | x | 1 | 1 | 1 | z | z | z | z = programmed
x = unprogrammed

Subsequently, the host controller 2002 sends a write register command to the CONTROL register address, setting bit 0 to 0: VALUE: 1 MASK:0xFFFE. Here, common parameters may include: ID_INDEX: 0, GROUP MASK: 0 GROUP VALUE: 0, ID_COUNTER_VAL:0, EQUAL: OFF ID_MASK and ID_VALUE:0. Because the ICs in the cluster array are listening and the common parameters select any listener, the ICs in the cluster array will execute this command. Setting this bit (e.g., the CONTROL register address bit 0 to 0) will cause the ICs to stop propagating their chain inputs to their chain outputs (shown as dotted lines in FIG. 34C).

FIGS. 35A, 35B, and 35C illustrate example operations performed according to various embodiments of the present disclosure. In FIG. 35A, a host controller 2002 may send an auto assign chain address command VALUE: 0 MASK: 0x03F ADDRESS: CHIP_ID address. Here, common parameters may include: ID_INDEX: 0, GROUP MASK and GROUP VALUE: CS|RESET, ID_COUNTER_VAL:2, EQUAL: ON, ID_MASK and ID_VALUE:0. ICs in the full cluster array will respond to this command. This command will cause the ICs in each cluster to auto program their ID bits from 0 to 16 and to propagate their chain input to chain output.

In the example depicted in FIGS. 35A, 35B, and 35C, each integrated circuit, in response to receiving the auto assign chain address command, clears its done flag. If the ICs chain in is ON and its done flag is clear, the IC will program its local incremented copy of VALUE to the register pointed to by ADDRESS as the write register command does. The IC will then set its done flag. The IC waits an auto program clock count and enables the chain propagation to the next IC by setting bit 1 of CONTROL to 1. On an auto program clock count, the IC will increment its copy of VALUE by one.

FIGS. 36A, 36B, and 36C illustrates example operations performed according to various embodiments of the present disclosure. Shown in FIGS. 36A, 36B, and 36C, every IC of the cluster array has its CHIP_ID programmed, and all ICs show a state of L3. Table 14 below illustrates the resulting CHIP_ID programming after chain 0-chain 15.

TABLE 11

(REPRODUCED)

| Bit | 9 | 8 | 7 | 6 | 5 | 4 | 3 | 2 | 1 | 0 |
|---|---|---|---|---|---|---|---|---|---|---|
| CHIP_ID | Chain Location [0-31] | | | | CHIP_SEL[0 . . . 7] | | | RESET[0-7] | | |

TABLE 14

| | Bit | | | | | | | | | |
|---|---|---|---|---|---|---|---|---|---|---|
| CHIP_ID | 9 | 8 | 7 | 6 | 5 | 4 | 3 | 2 | 1 | 0 |
| Chain 0 | 0 | 0 | 0 | 1 | z | z | z | z | z | z |
| Chain 1 | 0 | 0 | 1 | 0 | z | z | z | z | z | z |
| Chain 2 | 0 | 0 | 1 | 1 | z | z | z | z | z | z |
| Chain 3 | 0 | 1 | 0 | 0 | z | z | z | z | z | z |
| Chain 4 | 0 | 1 | 0 | 1 | z | z | z | z | z | z |
| Chain 5 | 0 | 1 | 1 | 0 | z | z | z | z | z | z |
| Chain 6 | 0 | 1 | 1 | 1 | z | z | z | z | z | z |
| Chain 7 | 0 | 1 | 1 | 1 | z | z | z | z | z | z |
| Chain 8 | 1 | 0 | 0 | 1 | z | z | z | z | z | z |
| Chain 9 | 1 | 0 | 1 | 0 | z | z | z | z | z | z |
| Chain 10 | 1 | 0 | 1 | 1 | z | z | z | z | z | z |
| Chain 11 | 1 | 1 | 0 | 0 | z | z | z | z | z | z |
| Chain 12 | 1 | 1 | 0 | 1 | z | z | z | z | z | z |
| Chain 13 | 1 | 1 | 1 | 0 | z | z | z | z | z | z |
| Chain 14 | 1 | 1 | 1 | 1 | z | z | z | z | z | z |
| Chain 15 | 1 | 1 | 1 | 1 | z | z | z | z | z | z | z = programmed

FIGS. 37A, 37B, and 37C illustrate example operations performed according to various embodiments of the present disclosure. Shown in FIGS. 37A, 37B, and 37C, the host controller 2002 may send a write register command to the ID_GROUP register address, setting the Done bit to 1: VALUE: 1 MASK:0x80. Here, common parameters may include: ID_INDEX: 0, GROUP MASK and GROUP VALUE: CS|RESET, ID_COUNTER_VAL: 3, EQUAL: ON, ID_MASK and ID_VALUE:0.

FIGS. 38A, 38B, and 38C illustrate example verification operations performed according to various embodiments of the present disclosure. In FIGS. 38A, 38B, and 38C, the host controller 2002 may send a read register command to read the IC version, selecting parts that are not indicated as complete (e.g., or done). The read register command may comprise: ADDRESS=VERSION register address, NUMBER=1 STARTING ID=0 TRAVERSE ICs=FALSE. Here, common parameters are set to allow L0 respondents: ID_INDEX: 0, GROUP MASK and GROUP VALUE: not Done, ID_COUNTER_VAL: 0, EQUAL: OFF, ID_MASK and ID_VALUE:0.

If the result is the expected version number, then some ICs have not been programmed, possibly due to a fault. In order to determine the location(s) of the possible fault, the host controller 2002 may send a read register command to read all 1024 targets (e.g., ICs). The command may comprise: ADDRESS=CHIP_ID register address, NUMBER=1024 STARTING ID=0 TRAVERSE ICs=TRUE. Here, common parameters are set to allow any respondent: ID_INDEX: 0, GROUP MASK and GROUP VALUE: Done, ID_COUNTER_VAL: 0, EQUAL: OFF, ID_MASK and ID_VALUE:0. All done IC's may respond with their CHIP_ID, in order. If there are failures the host knows exactly which IC's did not respond. The host can either choose not to use those IC's or it can try to recover any that are in the chain.

FIGS. 39A, 39B, and 39C illustrate example recovery operations performed according to various embodiments of the present disclosure. In the example depicted in FIGS. 39A, 39B, and 39C, there are 2 blocks of dead ICs on two clusters on CS 0 as shown. The sequence of broken ICs is identical within both clusters with broken ICs. The host did not receive an ID from all 32 ICs in the two clusters with broken ICs because the first broken IC was at the start of the programming chain.

An example recovery procedure may comprise segregating the bad ICs from the Done ICs, identifying the head of chain fragments, randomizing a recovery address for the head of chain fragments, discovering randomized addresses, adjusting addresses to ensure no overlap after chain ID programming. The recovery procedure may then comprise, for each head of chain fragment, identifying the remainder of the chain fragment, programming the chain fragment with the head of chain fragment recovery ID, programming the chain fragment with chain ID segment, determining where the chain fragment is, and programming the chain fragment with proper ID.

In embodiments, recovery addresses can be discovered using common command parameters (as described herein) by addressing the faulted ICs with the ID_GROUP signals and reading back the recovery ID using the ID mask and value settings. Searching from the MSB to the LSB noting the response received until the highest bit is of an ID is noted and repeating with subsequent LSB bits with the higher bits set, may enable determining the highest value recovery ID. Programming ID_GROUP for the identified IC (e.g., the highest value recovery ID) such that it is not addressed with the other faulted ICs and repeating the process may lead to discovery of recovery addresses.

In embodiments, a recovery address may be a member of the default data set or it can be randomized. For example, randomizing a recovery address may include building a free running ring oscillator attached to a counter which is gated by an un-clocked bus signal oscillating. Variations in detected thresholds and silicon timing allow a random number to be generated even if the target ICs are identical (e.g., or otherwise indistinguishable). If the system is clocked, a random seed and any circuit likely to detect something unique on the target IC can be used to help generate the recovery address.

One challenge associated with multiple fault recovery is detecting which targets are left alive (e.g., functional) to accurately program topologically unique data. Topological clues can be learned if the system (e.g., the host circuit or controller) employs fan-out buffers to isolate sections. The host may also monitor the chain reset enable signals periodically routing the attached sense lines through tri-stateable buffers. If the system (e.g., the host in combination with a plurality of integrated circuits) includes heterogenous target ICs which otherwise appear identical on the bus to the host, the host can monitor chip type identifiers to assist in aligning known topology to the measured recovered chain fragments.

For example, using weak pull ups and pull downs to generate a sequence of ones and zeroes interspersed with local chain signal itself may enable detection of chain fragments. Shown in Table 15 below, the location of any sequence of 3 parts in a chain of 16 can be detected. An "R" may represent a pull value as described with respect to FIG. 41 below.

TABLE 15

| Chain Index | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| Pull value 0 | 0 | 0 | R | 0 | 1 | R | 0 | R | 1 | 1 | R | 1 | 0 | R | R |

FIG. 40 illustrates an example broadcast supported architecture for use with various embodiments of the present disclosure. In FIG. 40, several integrated circuits 4001, 400N are connected via a digital interface bus 4003 to a host circuit (not shown). While the example depicted in FIG. 40 illustrates an SPI bus implementation, it will be appreciated that any appropriate bus implementation is within the scope of the present disclosure (e.g., I2C, etc.).

In FIG. 40, each of the integrated circuits 4001, 400N may include an arbitrary number of sub-digital blocks 4001A, 4001B, 4001C, 4001N, and 400NA, 400NB, 400NC, and 400NN, respectively. While in FIG. 40 the sub-digital blocks are illustrated as type SPI, it will be appreciated that any digital interface compatible blocks may be within the scope of the present disclosure. As shown in FIG. 40, the total number of addressable digital blocks is equivalent to a total number of sub-digital blocks across an arbitrary number of integrated circuits. It will be appreciated that a large digital block can be broken into sub-digital blocks while maintaining unique address space.

Further shown in FIG. 40, in order to uniquely identify each sub-digital block, each sub-digital block is preferably assigned a unique sub-digital block address. In this example, the address begins with 0h00 (e.g., the unique sub-digital block address associated with sub-digital block 4001A is 0h00) and extends to an arbitrary number 0hM (e.g., the unique sub-digital block address associated with sub-digital block 400NN is 0hM). These sub-digital block addresses can be set via hard-wiring, or they can be assigned using the identification reset procedures described herein. The unique sub-digital block address is used by a host circuit to be able to uniquely identify each integrated circuit (e.g., and each sub-digital block of each integrated circuit) regardless of a topology of the plurality of integrated circuits even if each integrated circuit is physically identical to another integrated circuit (e.g., or topologically or otherwise indistinguishable from a perspective of the host circuit.

In embodiments, there are many scenarios where it is desirable for a subset (or full set) of the integrated circuits (or sub-digital blocks) to perform the same function simultaneously (e.g., or to be issued the same command simultaneously). This, of course, may be done sequentially by individually addressing each sub-digital block and subsequently issuing the desired command to the addressed sub-digital block. However, such sequential command issuance can be very slow and may require issuing many commands if the number of integrated circuits (or sub-digital blocks) is large. That is, a command is issued per integrated circuit (or per sub-digital block) and therefore as the number of integrated circuits or sub-digital blocks grows, so does the number of commands necessary to issue for any simultaneous functionality. Accordingly, for large-scale phased arrays in particular a different method is needed.

Embodiments of the present disclosure overcome the aforementioned challenges and more by assigning an additional identifier (e.g., a broadcast command identifier, broadcast identifier, or broadcast ID) to each sub-digital block (e.g., in addition to the above described unique sub-block addresses). In some embodiments, a collection (e.g., a plurality) of sub-digital blocks may share a common broadcast identifier. Similar to the sub-digital block address, the broadcast ID can be set via hard-wire or similarly via an identification reset procedure described herein.

In FIG. 40, there are three unique broadcast identifiers assigned: 0h00, 0h01, and 0h02. In such an example, the host circuit may signal the devices in advance that it intends to send a broadcast command via either a dedicated hard-wire or with an agreed preceding digital command A host circuit may send a special command (e.g., as part of or separate from a broadcast command) instructing each sub-digital block to decode the broadcast ID of the command instead of the sub-digital block address in order to perform a desired action.

In embodiments, a broadcast message may include a combination of the broadcast ID and the broadcast command Those sub-digital blocks with the assigned broadcast ID will then execute the broadcast command There can be several broadcast commands for each broadcast ID type.

Accordingly, the host circuit may be capable of multiple modes of operation. For example, a regular communication mode of operation may be based on individually addressing sub-digital blocks using their unique address(es). By way of further example, a broadcast communication mode of operation may be based on triggering a broadcast message and issuing a broadcast command to all sub-digital blocks having broadcast identifiers matching the desired broadcast ID.

In embodiments, if a host is coordinating an identification assigning or programming procedure, broadcast commands may be preferred or required. Example broadcast commands described herein enable selection of multiple topologically based target ICs as command receivers for a single command.

In embodiments, hardware supporting identification assigning or programming can be re-used when the functional blocks are enabled. The associated register settings can be changed to allow topological selection in conjunction with user programmable selection of targets. For example, using the address mapping function of a customer data block the address spaces of multiple targets can be combined into a flat address space.

FIG. 41 illustrates example operations according to certain embodiments of the present disclosure. For example, and referring to FIG. 41, the gains of each antenna chain depicted may need to be programmed and then latched in a particular order for a gain change: one order for increasing gain and another for decreasing gain. In such an example, the host may map CHIP_ID[1] for each target IC on "Antenna 1" and another CHIP_ID[1] for each part on "Antenna 2," and refer to them as GAIN_ID_1 and GAIN_ID_2. The target ICs would still each have their original CHIP_ID address but would also have the newly assigned ID/address.

Continuing with the example depicted in FIG. 41, the host may program a customer data block for each target IC to map the virtual addresses to the actual addresses in an address mapping table. When complete, writing to GAIN_ID_1 address 0 to 5 will change the gain in one order for "Antenna 1," addresses 6 to 11 in another order. GAIN_ID_2 will do the same for "Antenna 2."

This is useful because typically serial register writes include a length field, so, for instance, address 0 is written to GAIN_ID_1 with a length of 6 and only 6 values need to follow. Without the broadcast command capability described herein, the host would need to individually address each register, using many more cycles on the bus.

Similarly, CHIP_ID[2] could be programmed for each type of part to allow all DACs to be addressed. Tables 16, 17, and 18 below depict example address space and address mapping for use with the present broadcast command capabilities.

TABLE 16

Address space of each DAC, MIXER/AMP, and PA

|  | Gain | Latch |
| --- | --- | --- |
| DAC | addr_DAC_gain | addr_DAC_L |
| MIXER/AMP | addr_AMP_gain | addr_AMP_L |
| PA | addr_PA_gain | addr_PA_L |

TABLE 17

Customer Data address mapping for CHIP_ID[1]

| Device | Virtual Address | Actual Address |
| --- | --- | --- |
| DAC | 0 and 8 | addr_DAC_gain |
| DAC | 3 and 11 | addr_DAC_L |
| AMP | 1 and 7 | addr_AMP_gain |
| AMP | 4 and 10 | addr_AMP_L |
| PA | 2 and 6 | addr_PA_gain |
| PA | 5 and 9 | addr_PA_L |

TABLE 18

CHIP_ID[1] Address map

| Virtual Addr | Gain Map |
| --- | --- |
| 0 | addr_DAC_gain |
| 1 | addr_AMP_gain |
| 2 | addr_PA_gain |
| 3 | addr_DAC_L |
| 4 | addr_AMP_L |
| 5 | addr_PA_L |
| 6 | addr_PA_gain |
| 7 | addr_AMP_gain |
| 8 | addr_DAC_gain |
| 9 | addr_PA_L |
| 10 | addr_AMP_L |
| 11 | addr_DAC_L |

TABLE 19

| index | 0 | 1 | 2 | 3 |
| --- | --- | --- | --- | --- |
| 0 | 0 | 2 | 2 | 2 |
| 4 | 1 | 2 | 2 | 2 |
| 8 | 0 | 3 | 2 | 2 |
| 12 | 1 | 3 | 2 | 2 |
| 16 | 0 | 4 | 2 | 2 |
| 20 | 1 | 4 | 2 | 2 |
| 24 | 0 | 5 | 2 | 2 |
| 28 | 1 | 5 | 2 | 2 |
| 32 | 0 | 6 | 2 | 2 |
| 36 | 1 | 6 | 2 | 2 |
| 40 | 0 | 2 | 3 | 2 |
| 44 | 1 | 2 | 3 | 2 |
| 48 | 0 | 3 | 3 | 2 |
| 52 | 1 | 3 | 3 | 2 |

TABLE 19-continued

| index | 0 | 1 | 2 | 3 |
|---|---|---|---|---|
| 56 | 0 | 4 | 3 | 2 |
| 60 | 1 | 4 | 3 | 2 |
| 64 | 0 | 5 | 3 | 2 |
| 68 | 1 | 5 | 3 | 2 |
| 72 | 0 | 6 | 3 | 2 |
| 76 | 1 | 6 | 3 | 2 |
| 80 | 0 | 2 | 4 | 2 |
| 84 | 1 | 2 | 4 | 2 |
| 88 | 0 | 3 | 4 | 2 |
| 92 | 1 | 3 | 4 | 2 |
| 96 | 0 | 4 | 4 | 2 |
| 100 | 1 | 4 | 4 | 2 |
| 104 | 0 | 5 | 4 | 2 |
| 108 | 1 | 5 | 4 | 2 |
| 112 | 0 | 6 | 4 | 2 |
| 116 | 1 | 6 | 4 | 2 |
| 120 | 0 | 2 | 5 | 2 |
| 124 | 1 | 2 | 5 | 2 |
| 128 | 0 | 3 | 5 | 2 |
| 132 | 1 | 3 | 5 | 2 |
| 136 | 0 | 4 | 5 | 2 |
| 140 | 1 | 4 | 5 | 2 |
| 144 | 0 | 5 | 5 | 2 |
| 148 | 1 | 5 | 5 | 2 |
| 152 | 0 | 6 | 5 | 2 |
| 156 | 1 | 6 | 5 | 2 |
| 160 | 0 | 2 | 6 | 2 |
| 164 | 1 | 2 | 6 | 2 |
| 168 | 0 | 3 | 6 | 2 |
| 172 | 1 | 3 | 6 | 2 |
| 176 | 0 | 4 | 6 | 2 |
| 180 | 1 | 4 | 6 | 2 |
| 184 | 0 | 5 | 6 | 2 |
| 188 | 1 | 5 | 6 | 2 |
| 192 | 0 | 6 | 6 | 2 |
| 196 | 1 | 6 | 6 | 2 |
| 200 | 0 | 2 | 2 | 3 |
| 204 | 1 | 2 | 2 | 3 |
| 208 | 0 | 3 | 2 | 3 |
| 212 | 1 | 3 | 2 | 3 |
| 216 | 0 | 4 | 2 | 3 |
| 220 | 1 | 4 | 2 | 3 |
| 224 | 0 | 5 | 2 | 3 |
| 228 | 1 | 5 | 2 | 3 |
| 232 | 0 | 6 | 2 | 3 |
| 236 | 1 | 6 | 2 | 3 |
| 240 | 0 | 2 | 3 | 3 |
| 244 | 1 | 2 | 3 | 3 |
| 248 | 0 | 3 | 3 | 3 |
| 252 | 1 | 3 | 3 | 3 |
| 256 | 0 | 4 | 3 | 3 |
| 260 | 1 | 4 | 3 | 3 |
| 264 | 0 | 5 | 3 | 3 |
| 268 | 1 | 5 | 3 | 3 |
| 272 | 0 | 6 | 3 | 3 |
| 276 | 1 | 6 | 3 | 3 |
| 280 | 0 | 2 | 4 | 3 |
| 284 | 1 | 2 | 4 | 3 |
| 288 | 0 | 3 | 4 | 3 |
| 292 | 1 | 3 | 4 | 3 |
| 296 | 0 | 4 | 4 | 3 |
| 300 | 1 | 4 | 4 | 3 |
| 304 | 0 | 5 | 4 | 3 |
| 308 | 1 | 5 | 4 | 3 |
| 312 | 0 | 6 | 4 | 3 |
| 316 | 1 | 6 | 4 | 3 |
| 320 | 0 | 2 | 5 | 3 |
| 324 | 1 | 2 | 5 | 3 |
| 328 | 0 | 3 | 5 | 3 |
| 332 | 1 | 3 | 5 | 3 |
| 336 | 0 | 4 | 5 | 3 |
| 340 | 1 | 4 | 5 | 3 |
| 344 | 0 | 5 | 5 | 3 |
| 348 | 1 | 5 | 5 | 3 |
| 352 | 0 | 6 | 5 | 3 |
| 356 | 1 | 6 | 5 | 3 |
| 360 | 0 | 2 | 6 | 3 |
| 364 | 1 | 2 | 6 | 3 |
| 368 | 0 | 3 | 6 | 3 |
| 372 | 1 | 3 | 6 | 3 |
| 376 | 0 | 4 | 6 | 3 |
| 380 | 1 | 4 | 6 | 3 |
| 384 | 0 | 5 | 6 | 3 |
| 388 | 1 | 5 | 6 | 3 |
| 392 | 0 | 6 | 6 | 3 |
| 396 | 1 | 6 | 6 | 3 |
| 400 | 0 | 2 | 2 | 4 |
| 404 | 1 | 2 | 2 | 4 |
| 408 | 0 | 3 | 2 | 4 |
| 412 | 1 | 3 | 2 | 4 |
| 416 | 0 | 4 | 2 | 4 |
| 420 | 1 | 4 | 2 | 4 |
| 424 | 0 | 5 | 2 | 4 |
| 428 | 1 | 5 | 2 | 4 |
| 432 | 0 | 6 | 2 | 4 |
| 436 | 1 | 6 | 2 | 4 |
| 440 | 0 | 2 | 3 | 4 |
| 444 | 1 | 2 | 3 | 4 |
| 448 | 0 | 3 | 3 | 4 |
| 452 | 1 | 3 | 3 | 4 |
| 456 | 0 | 4 | 3 | 4 |
| 460 | 1 | 4 | 3 | 4 |
| 464 | 0 | 5 | 3 | 4 |
| 468 | 1 | 5 | 3 | 4 |
| 472 | 0 | 6 | 3 | 4 |
| 476 | 1 | 6 | 3 | 4 |
| 480 | 0 | 2 | 4 | 4 |
| 484 | 1 | 2 | 4 | 4 |
| 488 | 0 | 3 | 4 | 4 |
| 492 | 1 | 3 | 4 | 4 |
| 496 | 0 | 4 | 4 | 4 |
| 500 | 1 | 4 | 4 | 4 |
| 504 | 0 | 5 | 4 | 4 |
| 508 | 1 | 5 | 4 | 4 |
| 512 | 0 | 6 | 4 | 4 |
| 516 | 1 | 6 | 4 | 4 |
| 520 | 0 | 2 | 5 | 4 |
| 524 | 1 | 2 | 5 | 4 |
| 528 | 0 | 3 | 5 | 4 |
| 532 | 1 | 3 | 5 | 4 |
| 536 | 0 | 4 | 5 | 4 |
| 540 | 1 | 4 | 5 | 4 |
| 544 | 0 | 5 | 5 | 4 |
| 548 | 1 | 5 | 5 | 4 |
| 552 | 0 | 6 | 5 | 4 |
| 556 | 1 | 6 | 5 | 4 |
| 560 | 0 | 2 | 6 | 4 |
| 564 | 1 | 2 | 6 | 4 |
| 568 | 0 | 3 | 6 | 4 |
| 572 | 1 | 3 | 6 | 4 |
| 576 | 0 | 4 | 6 | 4 |
| 580 | 1 | 4 | 6 | 4 |
| 584 | 0 | 5 | 6 | 4 |
| 588 | 1 | 5 | 6 | 4 |
| 592 | 0 | 6 | 6 | 4 |
| 596 | 1 | 6 | 6 | 4 |
| 600 | 0 | 2 | 2 | 5 |
| 604 | 1 | 2 | 2 | 5 |
| 608 | 0 | 3 | 2 | 5 |
| 612 | 1 | 3 | 2 | 5 |
| 616 | 0 | 4 | 2 | 5 |
| 620 | 1 | 4 | 2 | 5 |
| 624 | 0 | 5 | 2 | 5 |
| 628 | 1 | 5 | 2 | 5 |
| 632 | 0 | 6 | 2 | 5 |
| 636 | 1 | 6 | 2 | 5 |
| 640 | 0 | 2 | 3 | 5 |
| 644 | 1 | 2 | 3 | 5 |
| 648 | 0 | 3 | 3 | 5 |
| 652 | 1 | 3 | 3 | 5 |
| 656 | 0 | 4 | 3 | 5 |
| 660 | 1 | 4 | 3 | 5 |
| 664 | 0 | 5 | 3 | 5 |
| 668 | 1 | 5 | 3 | 5 |
| 672 | 0 | 6 | 3 | 5 |
| 676 | 1 | 6 | 3 | 5 |

TABLE 19-continued

| index | 0 | 1 | 2 | 3 |
|---|---|---|---|---|
| 680 | 0 | 2 | 4 | 5 |
| 684 | 1 | 2 | 4 | 5 |
| 688 | 0 | 3 | 4 | 5 |
| 692 | 1 | 3 | 4 | 5 |
| 696 | 0 | 4 | 4 | 5 |
| 700 | 1 | 4 | 4 | 5 |
| 704 | 0 | 5 | 4 | 5 |
| 708 | 1 | 5 | 4 | 5 |
| 712 | 0 | 6 | 4 | 5 |
| 716 | 1 | 6 | 4 | 5 |
| 720 | 0 | 2 | 5 | 5 |
| 724 | 1 | 2 | 5 | 5 |
| 728 | 0 | 3 | 5 | 5 |
| 732 | 1 | 3 | 5 | 5 |
| 736 | 0 | 4 | 5 | 5 |
| 740 | 1 | 4 | 5 | 5 |
| 744 | 0 | 5 | 5 | 5 |
| 748 | 1 | 5 | 5 | 5 |
| 752 | 0 | 6 | 5 | 5 |
| 756 | 1 | 6 | 5 | 5 |
| 760 | 0 | 2 | 6 | 5 |
| 764 | 1 | 2 | 6 | 5 |
| 768 | 0 | 3 | 6 | 5 |
| 772 | 1 | 3 | 6 | 5 |
| 776 | 0 | 4 | 6 | 5 |
| 780 | 1 | 4 | 6 | 5 |
| 784 | 0 | 5 | 6 | 5 |
| 788 | 1 | 5 | 6 | 5 |
| 792 | 0 | 6 | 6 | 5 |
| 796 | 1 | 6 | 6 | 5 |
| 800 | 0 | 2 | 2 | 6 |
| 804 | 1 | 2 | 2 | 6 |
| 808 | 0 | 3 | 2 | 6 |
| 812 | 1 | 3 | 2 | 6 |
| 816 | 0 | 4 | 2 | 6 |
| 820 | 1 | 4 | 2 | 6 |
| 824 | 0 | 5 | 2 | 6 |
| 828 | 1 | 5 | 2 | 6 |
| 832 | 0 | 6 | 2 | 6 |
| 836 | 1 | 6 | 2 | 6 |
| 840 | 0 | 2 | 3 | 6 |
| 844 | 1 | 2 | 3 | 6 |
| 848 | 0 | 3 | 3 | 6 |
| 852 | 1 | 3 | 3 | 6 |
| 856 | 0 | 4 | 3 | 6 |
| 860 | 1 | 4 | 3 | 6 |
| 864 | 0 | 5 | 3 | 6 |
| 868 | 1 | 5 | 3 | 6 |
| 872 | 0 | 6 | 3 | 6 |
| 876 | 1 | 6 | 3 | 6 |
| 880 | 0 | 2 | 4 | 6 |
| 884 | 1 | 2 | 4 | 6 |
| 888 | 0 | 3 | 4 | 6 |
| 892 | 1 | 3 | 4 | 6 |
| 896 | 0 | 4 | 4 | 6 |
| 900 | 1 | 4 | 4 | 6 |
| 904 | 0 | 5 | 4 | 6 |
| 908 | 1 | 5 | 4 | 6 |
| 912 | 0 | 6 | 4 | 6 |
| 916 | 1 | 6 | 4 | 6 |
| 920 | 0 | 2 | 5 | 6 |
| 924 | 1 | 2 | 5 | 6 |
| 928 | 0 | 3 | 5 | 6 |
| 932 | 1 | 3 | 5 | 6 |
| 936 | 0 | 4 | 5 | 6 |
| 940 | 1 | 4 | 5 | 6 |
| 944 | 0 | 5 | 5 | 6 |
| 948 | 1 | 5 | 5 | 6 |
| 952 | 0 | 6 | 5 | 6 |
| 956 | 1 | 6 | 5 | 6 |
| 960 | 0 | 2 | 6 | 6 |
| 964 | 1 | 2 | 6 | 6 |
| 968 | 0 | 3 | 6 | 6 |
| 972 | 1 | 3 | 6 | 6 |
| 976 | 0 | 4 | 6 | 6 |
| 980 | 1 | 4 | 6 | 6 |
| 984 | 0 | 5 | 6 | 6 |
| 988 | 1 | 5 | 6 | 6 |
| 992 | 0 | 6 | 6 | 6 |
| 996 | 1 | 6 | 6 | 6 |
| 1000 | 0 | 0 | 0 | 0 |
| 0 | 0 | 0 | 0 | 0 |

Blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An integrated circuit arranged among a plurality of integrated circuits, the integrated circuit comprising:
an identification circuit configured to derive a topologically unique identifier by performing an input measurement of a stimulus provided by a host circuit, wherein the topologically unique identifier is set using a plurality of pull values that are arranged such that no repeated sequence of pull values exists in a detectable chain of pull values associated with other integrated circuits within the plurality of integrated circuits, wherein the integrated circuit is topologically indistinguishable from at least one other integrated circuit of the plurality of integrated circuits from a perspective of the host circuit, wherein the integrated circuit and the other integrated circuits within the plurality of integrated circuits are communicably coupled with the host circuit via a shared communication bus, wherein the input measurement comprises a binary input measurement or a non-binary input measurement based on one or more values comprising one or more of a pin voltage, a supply voltage, or a pin logic level of the integrated circuit, and wherein, responsive to resetting or powering on the integrated circuit, the identification circuit is further configured to receive topologically unique data from the host circuit.

2. The integrated circuit of claim 1, wherein the plurality of integrated circuits is arranged as an array, a cluster, a single dimension cluster, a multi-dimensional cluster, or an array comprising one or more clusters.

3. The integrated circuit of claim 1, wherein the identification circuit is further configured to perform the input measurement based on a command received from the host circuit.

4. The integrated circuit of claim 1, wherein performing a non-binary input measurement comprises one or more of detecting an input measurement value relative to a host command and a prior input measurement, detecting an input measurement value relative to one or more thresholds, or detecting an input measurement value delay relative to a clock.

5. The integrated circuit of claim 1, wherein the identification circuit is further configured to assert an output based at least in part on a command received from the host circuit.

6. The integrated circuit of claim 1, wherein the plurality of integrated circuits is arranged according to a chain such that a first output pin of the integrated circuit is communicably coupled with a second input pin of a second integrated circuit and a second output pin of the second integrated circuit is communicably coupled with a third input pin of a third integrated circuit.

7. The integrated circuit of claim 6, wherein the identification circuit is further configured to:
receive, from the host circuit, a head of chain command; and
set a chain input enable bit of the identification circuit.

8. The integrated circuit of claim 7, wherein a first input pin of the integrated circuit is communicably coupled with the host circuit via the shared communication bus.

9. The integrated circuit of claim 8, wherein the identification circuit is further configured to:
detect that a chain input enable bit is set; and
propagate a value of the first input of the integrated circuit to the first output of the integrated circuit.

10. The integrated circuit of claim 6, wherein at least one stimulus is shared among two or more integrated circuits of the plurality of integrated circuits.

11. The integrated circuit of claim 10, wherein the at least one stimulus is generated uniquely in the chain such that faults in the chain are recoverable.

12. The integrated circuit of claim 1, wherein the identification circuit is further configured to receive the unique identifier via one or more pins, inputs, or outputs associated with a functional circuit of the integrated circuit.

13. The integrated circuit of claim 1, wherein the integrated circuit is addressable by the host circuit using the topologically unique identifier.

14. The integrated circuit of claim 1, wherein the identification circuit is further configured to receive a subsequent topologically unique identifier from the host circuit.

15. The integrated circuit of claim 14, wherein the integrated circuit is addressable by the host circuit using the subsequent topologically unique identifier.

16. The integrated circuit of claim 1, wherein the identification circuit is further configured to modify integrated circuit features based on a location of the integrated circuit within a topology of the plurality of integrated circuits.

17. The integrated circuit of claim 1, wherein the identification circuit is further configured to execute a broadcast command received from the host circuit or one or more other integrated circuits.

18. The integrated circuit of claim 17, wherein executing the broadcast command comprises decoding a first broadcast ID of the broadcast command.

19. The integrated circuit of claim 18, wherein executing the broadcast command further comprises executing an action associated with the command when a second broadcast ID of the integrated circuit matches the first broadcast ID of the broadcast command.

20. The integrated circuit of claim 1, wherein the topologically unique data comprises one or more of: customer identification data for programmatic customization of bus communication, customer identification data for modifying, enabling, or disabling one or more features associated with the integrated circuit, data for modifying one or more features associated with the integrated circuit based on a location of the integrated circuit within the plurality of integrated circuits, or data for modifying one or more features associated with the integrated circuit in the event that damage occurs to the host circuit.

* * * * *